(12) United States Patent
Inagaki et al.

(10) Patent No.: US 11,086,357 B2
(45) Date of Patent: Aug. 10, 2021

(54) ATTACHABLE DEVICE HAVING A FLEXIBLE ELECTRONIC COMPONENT

(71) Applicant: FLEXTERRA, INC., Skokie, IL (US)

(72) Inventors: Philippe Inagaki, Skokie, IL (US); Hjalmar Edzer Ayco Huitema, Belmont, CA (US)

(73) Assignee: FLEXTERRA, INC., Skokie, IL (US)

( * ) Notice: Subject to any disclaimer, the term of this patent is extended or adjusted under 35 U.S.C. 154(b) by 0 days.

(21) Appl. No.: 15/054,725

(22) Filed: Feb. 26, 2016

(65) Prior Publication Data

US 2016/0282899 A1 Sep. 29, 2016

Related U.S. Application Data

(63) Continuation of application No. PCT/US2014/052957, filed on Aug. 27, 2014.
(Continued)

(51) Int. Cl.
*G06F 1/16* (2006.01)
*H04B 5/00* (2006.01)
(Continued)

(52) U.S. Cl.
CPC .......... *G06F 1/163* (2013.01); *A44C 5/0053* (2013.01); *A44C 5/2071* (2013.01); *A45F 5/00* (2013.01); *G04B 37/1486* (2013.01); *G04G 9/04* (2013.01); *G04G 17/08* (2013.01); *G04G 21/04* (2013.01); *G06F 1/1652* (2013.01); *H04B 5/0037* (2013.01); *H04B 5/0062* (2013.01); *H04B 5/0075* (2013.01)

(58) Field of Classification Search
CPC .................. G06F 1/163; G06F 1/1652; G06F 2203/04102; G04G 17/083; G09F 9/301
See application file for complete search history.

(56) References Cited

U.S. PATENT DOCUMENTS 4,015,423 A 4/1977 Brunet
4,834,376 A 5/1989 Steinberg
(Continued)

FOREIGN PATENT DOCUMENTS

CN 1306636 A 8/2001
CN 101180669 A 5/2008
(Continued)

OTHER PUBLICATIONS

"3M Flexible Transparent Touchscreen Concepts" video located on the Internet at http://www.youtube.com/watch?v=kCZz4jFok_o (uploaded Jan. 6, 2011).
(Continued)

*Primary Examiner* — James Wu
(74) *Attorney, Agent, or Firm* — Marshall, Gerstein & Borun LLP

(57) ABSTRACT

A dynamically flexible, attachable article, such as a wristband or an armband, includes a flexible electronic component coupled to a flexible support in a manner that is bendable or conformable to a user's wrist or other curved surface in a manner that makes the flexible electronic component easily viewable to the user. The attachable article also includes a connection mechanism disposed proximate to one or both of first and second ends of the attachable article to connect two different portions of the article together.

13 Claims, 34 Drawing Sheets

Related U.S. Application Data

(60) Provisional application No. 61/979,499, filed on Apr. 14, 2014, provisional application No. 61/972,067, filed on Mar. 28, 2014, provisional application No. 61/969,531, filed on Mar. 24, 2014, provisional application No. 61/920,705, filed on Dec. 24, 2013, provisional application No. 61/870,781, filed on Aug. 27, 2013.

(51) Int. Cl.
*G04G 17/08* (2006.01)
*G04G 9/04* (2006.01)
*G04G 21/04* (2013.01)
*A44C 5/00* (2006.01)
*A44C 5/20* (2006.01)
*A45F 5/00* (2006.01)
*G04B 37/14* (2006.01)

(56) References Cited

U.S. PATENT DOCUMENTS

| | | |
|---|---|---|
| 5,065,376 A | 11/1991 | Choulat |
| 5,162,696 A | 11/1992 | Goodrich |
| 5,438,488 A | 8/1995 | Dion |
| 5,438,851 A | 8/1995 | Geissbuhler |
| 5,644,858 A | 7/1997 | Bemis |
| 5,707,745 A | 1/1998 | Forrest et al. |
| 5,844,363 A | 12/1998 | Gu et al. |
| 5,889,737 A * | 3/1999 | Alameh ............... G04C 10/00 368/204 |
| 5,930,026 A | 7/1999 | Jacobson et al. |
| 5,930,921 A | 8/1999 | Sorofman et al. |
| 5,931,764 A | 8/1999 | Freeman et al. |
| 5,980,409 A | 11/1999 | Blase |
| 6,011,309 A | 1/2000 | Ahn |
| 6,097,147 A | 8/2000 | Baldo et al. |
| 6,134,965 A | 10/2000 | Somville |
| 6,196,932 B1 | 3/2001 | Marsh et al. |
| 6,212,133 B1 | 4/2001 | McCoy et al. |
| 6,303,238 B1 | 10/2001 | Thompson et al. |
| 6,369,865 B2 | 4/2002 | Hinata |
| 6,503,188 B1 | 1/2003 | August |
| 6,577,496 B1 | 6/2003 | Gioscia et al. |
| 6,585,914 B2 | 7/2003 | Marks et al. |
| 6,608,323 B2 | 8/2003 | Marks et al. |
| 6,619,835 B2 * | 9/2003 | Kita ..................... A44C 5/0015 368/10 |
| 6,750,607 B2 | 6/2004 | Huitema et al. |
| 6,831,769 B2 | 12/2004 | Holman et al. |
| 6,837,590 B2 | 1/2005 | Marston |
| 6,839,158 B2 | 1/2005 | Albert et al. |
| 6,991,749 B2 | 1/2006 | Marks et al. |
| 7,170,670 B2 | 1/2007 | Webber |
| 7,180,665 B2 | 2/2007 | Daniel et al. |
| 7,209,114 B2 | 4/2007 | Radley-Smith |
| 7,278,093 B2 | 10/2007 | Jablonski et al. |
| 7,374,702 B2 | 5/2008 | Marks et al. |
| 7,384,814 B2 | 6/2008 | Huitema et al. |
| 7,446,945 B2 | 11/2008 | Kuiper et al. |
| 7,453,452 B2 | 11/2008 | Huitema et al. |
| 7,528,176 B2 | 5/2009 | Marks et al. |
| 7,564,436 B2 | 7/2009 | Huitema et al. |
| 7,569,693 B2 | 8/2009 | Marks et al. |
| 7,605,225 B2 | 10/2009 | Marks et al. |
| 7,618,260 B2 | 11/2009 | Daniel et al. |
| 7,667,962 B2 | 2/2010 | Mullen |
| 7,671,202 B2 | 3/2010 | Marks et al. |
| 7,710,370 B2 | 5/2010 | Slikkerveer et al. |
| 7,714,801 B2 | 5/2010 | Kimmel |
| 7,755,605 B2 | 7/2010 | Daniel et al. |
| 7,786,951 B2 | 8/2010 | Huitema et al. |
| 7,787,097 B2 | 8/2010 | Satoh |
| 7,787,917 B2 | 8/2010 | Aoki et al. |
| 7,816,480 B2 | 10/2010 | Marks et al. |
| 7,842,198 B2 | 11/2010 | Marks et al. |
| 7,892,454 B2 | 2/2011 | Facchetti et al. |
| 7,893,265 B2 | 2/2011 | Facchetti et al. |
| 7,902,363 B2 | 3/2011 | Facchetti et al. |
| 7,947,837 B2 | 5/2011 | Marks et al. |
| 7,956,820 B2 | 6/2011 | Huitema et al. |
| 7,965,258 B2 | 6/2011 | Aoki |
| 7,982,039 B2 | 7/2011 | Marks et al. |
| 8,017,458 B2 | 9/2011 | Marks et al. |
| 8,022,214 B2 | 9/2011 | Facchetti et al. |
| 8,077,283 B2 | 12/2011 | Van Veenendaal et al. |
| 8,097,877 B2 | 1/2012 | Marks et al. |
| 8,111,465 B2 | 2/2012 | Heikenfeld et al. |
| 8,117,903 B2 | 2/2012 | Golden et al. |
| 8,125,434 B2 | 2/2012 | Huitema et al. |
| 8,151,501 B2 | 4/2012 | Bemelmans et al. |
| 8,196,267 B2 | 6/2012 | Nalley et al. |
| 8,199,471 B2 | 6/2012 | Bemelmans et al. |
| 8,237,909 B2 | 8/2012 | Ostreko et al. |
| 8,279,166 B2 | 10/2012 | Huitema et al. |
| 8,325,143 B2 | 12/2012 | Destura et al. |
| 8,329,855 B2 | 12/2012 | Usta et al. |
| 8,334,545 B2 | 12/2012 | Levermore et al. |
| 8,358,275 B2 | 1/2013 | Huitema |
| 8,380,327 B2 | 2/2013 | Park |
| 8,395,150 B2 | 3/2013 | Marks et al. |
| 8,404,844 B2 | 3/2013 | Kastler et al. |
| 8,414,411 B2 | 4/2013 | Stites et al. |
| 8,440,828 B2 | 5/2013 | Quinn et al. |
| 8,446,549 B2 | 5/2013 | Huitema et al. |
| 8,466,851 B2 | 6/2013 | Huitema et al. |
| D686,217 S | 7/2013 | Andre |
| 8,474,146 B2 | 7/2013 | Hartford et al. |
| 8,477,250 B2 | 7/2013 | Schellingerhout et al. |
| 8,482,909 B2 | 7/2013 | Douglas |
| 8,493,714 B2 | 7/2013 | Visser et al. |
| 8,502,788 B2 | 8/2013 | Cho |
| 8,508,468 B2 | 8/2013 | Huitema |
| 8,508,920 B2 | 8/2013 | Huitema et al. |
| 8,514,213 B2 | 8/2013 | van Veenendaal et al. |
| 8,536,579 B2 | 9/2013 | Sele et al. |
| 8,537,104 B2 | 9/2013 | Markvoort et al. |
| 8,547,293 B2 | 10/2013 | Van Lieshout et al. |
| 8,547,325 B2 | 10/2013 | Huitema |
| 8,618,448 B2 | 12/2013 | Alexander |
| 9,030,419 B1 | 5/2015 | Freed |
| 9,176,530 B2 | 11/2015 | Rothkopf et al. |
| 9,223,494 B1 | 12/2015 | DeSalvo et al. |
| 9,510,470 B2 | 11/2016 | Huitema et al. |
| 9,560,751 B2 | 1/2017 | Huitema et al. |
| 9,629,120 B2 | 4/2017 | Ryu et al. |
| 9,642,241 B2 | 5/2017 | Huitema et al. |
| 2001/0004808 A1 | 6/2001 | Hurwitz |
| 2002/0019296 A1 | 2/2002 | Freeman et al. |
| 2002/0027634 A1 | 3/2002 | Kang et al. |
| 2002/0070926 A1 | 6/2002 | Kavanagh |
| 2003/0046849 A1 | 3/2003 | Lin |
| 2003/0182924 A1 | 10/2003 | Tsutsumi et al. |
| 2003/0197597 A1 | 10/2003 | Bahl et al. |
| 2004/0052044 A1 | 3/2004 | Mochizuki et al. |
| 2004/0189605 A1 | 9/2004 | Shih |
| 2004/0212968 A1 | 10/2004 | Lin |
| 2004/0266496 A1 | 12/2004 | Kauhaniemi et al. |
| 2005/0110785 A1 | 5/2005 | Ochiai et al. |
| 2006/0020469 A1 | 1/2006 | Rast |
| 2006/0055691 A1 | 3/2006 | Bursett |
| 2006/0077127 A1 | 4/2006 | Sampsell et al. |
| 2006/0096392 A1 | 5/2006 | Inkster et al. |
| 2006/0132025 A1 | 6/2006 | Gao et al. |
| 2006/0202618 A1 | 9/2006 | Ishii et al. |
| 2006/0204675 A1 | 9/2006 | Gao et al. |
| 2006/0209218 A1 | 9/2006 | Lee et al. |
| 2006/0238494 A1 | 10/2006 | Narayanaswami et al. |
| 2006/0262098 A1 | 11/2006 | Okamoto |
| 2006/0273304 A1 | 12/2006 | Cok |
| 2007/0090420 A1 | 4/2007 | Chu et al. |
| 2007/0117600 A1 | 5/2007 | Robertson et al. |
| 2007/0120813 A1 | 5/2007 | Huitema et al. |
| 2007/0195067 A1 | 8/2007 | Zotov et al. |

(56) References Cited

U.S. PATENT DOCUMENTS

| | | |
|---|---|---|
| 2007/0205997 A1 | 9/2007 | Lieshout et al. |
| 2007/0228952 A1 | 10/2007 | Kwon et al. |
| 2007/0279852 A1 | 12/2007 | Daniel et al. |
| 2008/0018631 A1 | 1/2008 | Hioki et al. |
| 2008/0037374 A1 | 2/2008 | Chu et al. |
| 2008/0094314 A1 | 4/2008 | Huitema et al. |
| 2008/0094322 A1 | 4/2008 | Sarma et al. |
| 2008/0100636 A1 | 5/2008 | Lai et al. |
| 2008/0150928 A1 | 6/2008 | Van Der Hoef et al. |
| 2008/0198184 A1 | 8/2008 | Schellingerhout et al. |
| 2008/0204367 A1 | 8/2008 | Lafarre et al. |
| 2008/0212271 A1 | 9/2008 | Misawa |
| 2008/0218369 A1 | 9/2008 | Krans et al. |
| 2008/0223708 A1 | 9/2008 | Joo |
| 2008/0223746 A1 | 9/2008 | Van Rens et al. |
| 2008/0248838 A1* | 10/2008 | Chiang .................. G04G 21/04 |
| | | 455/566 |
| 2008/0271429 A1 | 11/2008 | Komiya |
| 2008/0278472 A1 | 11/2008 | Huitema et al. |
| 2008/0291225 A1* | 11/2008 | Arneson .................. G06F 3/011 |
| | | 345/698 |
| 2008/0316580 A1 | 12/2008 | Gillies et al. |
| 2009/0067123 A1 | 3/2009 | Huitema et al. |
| 2009/0122007 A1 | 5/2009 | Tsuzaki et al. |
| 2009/0189878 A1 | 7/2009 | Goertz et al. |
| 2009/0197749 A1 | 8/2009 | Merkel et al. |
| 2009/0219225 A1 | 9/2009 | Cope |
| 2009/0251888 A1 | 10/2009 | Douglas |
| 2009/0267969 A1 | 10/2009 | Sakamoto |
| 2009/0290117 A1 | 11/2009 | Watanabe et al. |
| 2009/0296249 A1 | 12/2009 | van Lieshout et al. |
| 2010/0033435 A1 | 2/2010 | Huitema |
| 2010/0045705 A1 | 2/2010 | Vertegaal et al. |
| 2010/0050133 A1 | 2/2010 | Nishihara et al. |
| 2010/0117975 A1 | 5/2010 | Cho |
| 2010/0127965 A1 | 5/2010 | Park |
| 2010/0156868 A1 | 6/2010 | Hirayama |
| 2010/0164973 A1 | 7/2010 | Huitema et al. |
| 2010/0194785 A1 | 8/2010 | Huitema et al. |
| 2010/0231544 A1 | 9/2010 | Lu et al. |
| 2010/0238098 A1 | 9/2010 | Watanabe |
| 2010/0238612 A1 | 9/2010 | Hsiao et al. |
| 2010/0252112 A1 | 10/2010 | Watson |
| 2010/0259524 A1 | 10/2010 | Markvoort et al. |
| 2010/0283047 A1 | 11/2010 | Facchetti et al. |
| 2010/0295761 A1 | 11/2010 | van Lieshout et al. |
| 2010/0315225 A1 | 12/2010 | Teague |
| 2010/0320448 A1 | 12/2010 | Sele et al. |
| 2010/0326527 A1 | 12/2010 | Facchetti et al. |
| 2011/0003665 A1 | 1/2011 | Burton et al. |
| 2011/0043976 A1 | 2/2011 | Visser et al. |
| 2011/0048619 A1 | 3/2011 | Meinders et al. |
| 2011/0090155 A1 | 4/2011 | Caskey et al. |
| 2011/0109654 A1 | 5/2011 | Van Veenendaal et al. |
| 2011/0120558 A1 | 5/2011 | Facchetti et al. |
| 2011/0122593 A1 | 5/2011 | van Lieshout et al. |
| 2011/0124375 A1 | 5/2011 | Stuivenwold |
| 2011/0128260 A1 | 6/2011 | Huitema et al. |
| 2011/0128266 A1 | 6/2011 | Chiu et al. |
| 2011/0136333 A1 | 6/2011 | Facchetti et al. |
| 2011/0148797 A1 | 6/2011 | Huitema et al. |
| 2011/0157046 A1 | 6/2011 | Lee et al. |
| 2011/0185612 A1 | 8/2011 | Waggoner |
| 2011/0187681 A1 | 8/2011 | Kim et al. |
| 2011/0227080 A1 | 9/2011 | Roh et al. |
| 2011/0227855 A1 | 9/2011 | Kim et al. |
| 2011/0256649 A1 | 10/2011 | Huitema et al. |
| 2011/0279418 A1 | 11/2011 | Han et al. |
| 2011/0279442 A1 | 11/2011 | Hage et al. |
| 2011/0310035 A1 | 12/2011 | Kim et al. |
| 2012/0007796 A1 | 1/2012 | Jokinen et al. |
| 2012/0038861 A1 | 2/2012 | van Lieshout et al. |
| 2012/0080462 A1 | 4/2012 | Hajarian |
| 2012/0083705 A1 | 4/2012 | Yuen et al. |
| 2012/0086691 A1 | 4/2012 | van Lieshout et al. |
| 2012/0105333 A1 | 5/2012 | Maschmeyer et al. |
| 2012/0122519 A1 | 5/2012 | Jochheim |
| 2012/0162088 A1 | 6/2012 | van Lieshout et al. |
| 2012/0162876 A1 | 6/2012 | Kim |
| 2012/0182282 A1 | 7/2012 | van Veenendaal et al. |
| 2012/0182755 A1* | 7/2012 | Wildner .................. G09F 9/301 |
| | | 362/555 |
| 2012/0188750 A1 | 7/2012 | Marston |
| 2012/0194448 A1 | 8/2012 | Rothkopf |
| 2012/0194478 A1 | 8/2012 | Liu et al. |
| 2012/0212433 A1 | 8/2012 | Lee et al. |
| 2012/0223314 A1 | 9/2012 | Marks et al. |
| 2012/0242599 A1 | 9/2012 | Seo et al. |
| 2012/0264489 A1 | 10/2012 | Choi et al. |
| 2012/0283799 A1 | 11/2012 | Fan |
| 2012/0314546 A1* | 12/2012 | Brewer .................. G04G 17/04 |
| | | 368/281 |
| 2012/0327048 A1 | 12/2012 | Ramrattan et al. |
| 2013/0005404 A1 | 1/2013 | Bremer |
| 2013/0010405 A1 | 1/2013 | Rothkopf et al. |
| 2013/0025647 A1 | 1/2013 | Bouten et al. |
| 2013/0027853 A1 | 1/2013 | Chen et al. |
| 2013/0038622 A1 | 2/2013 | Yang |
| 2013/0044215 A1* | 2/2013 | Rothkopf ................ G06F 1/163 |
| | | 348/143 |
| 2013/0054997 A1 | 2/2013 | Wyatt et al. |
| 2013/0055762 A1 | 3/2013 | Leung |
| 2013/0058063 A1 | 3/2013 | O'Brien |
| 2013/0062598 A1 | 3/2013 | Usta et al. |
| 2013/0070431 A1 | 3/2013 | Fukuma et al. |
| 2013/0076612 A1 | 3/2013 | Myers |
| 2013/0076649 A1 | 3/2013 | Myers et al. |
| 2013/0083496 A1 | 4/2013 | Franklin et al. |
| 2013/0106603 A1 | 5/2013 | Weast et al. |
| 2013/0113761 A1 | 5/2013 | van Lieshout et al. |
| 2013/0120106 A1 | 5/2013 | Cauwels et al. |
| 2013/0127690 A1 | 5/2013 | Tsai |
| 2013/0127748 A1 | 5/2013 | Vertegaal et al. |
| 2013/0127765 A1 | 5/2013 | Behdasht et al. |
| 2013/0128439 A1 | 5/2013 | Walters et al. |
| 2013/0131887 A1 | 5/2013 | Park |
| 2013/0141405 A1 | 6/2013 | Huitema et al. |
| 2013/0145522 A1 | 6/2013 | da Silva |
| 2013/0145795 A1 | 6/2013 | Asami |
| 2013/0154826 A1 | 6/2013 | Ratajczyk |
| 2013/0172068 A1 | 7/2013 | Zhou et al. |
| 2013/0182382 A1 | 7/2013 | Vardi et al. |
| 2013/0191741 A1 | 7/2013 | Dickinson et al. |
| 2013/0197680 A1 | 8/2013 | Cobbett et al. |
| 2013/0219332 A1 | 8/2013 | Woley et al. |
| 2013/0222208 A1 | 8/2013 | Gorilovsky et al. |
| 2013/0222270 A1 | 8/2013 | Winkler et al. |
| 2013/0222271 A1 | 8/2013 | Alberth et al. |
| 2013/0229373 A1 | 9/2013 | Eriksson et al. |
| 2013/0235008 A1 | 9/2013 | Kwon |
| 2013/0265257 A1 | 10/2013 | Jung et al. |
| 2013/0286466 A1 | 10/2013 | Lieshout et al. |
| 2013/0300779 A1 | 11/2013 | Van Baarsen et al. |
| 2013/0326790 A1 | 12/2013 | Cauwels et al. |
| 2013/0335929 A1 | 12/2013 | Cavallaro |
| 2014/0042406 A1 | 2/2014 | Degner et al. |
| 2014/0049487 A1 | 2/2014 | Konertz et al. |
| 2014/0062892 A1* | 3/2014 | Dickinson ............ G06F 3/0412 |
| | | 345/173 |
| 2014/0123015 A1 | 5/2014 | Sako et al. |
| 2014/0123436 A1 | 5/2014 | Griffin et al. |
| 2014/0138637 A1 | 5/2014 | Yang et al. |
| 2014/0226275 A1 | 8/2014 | Ko et al. |
| 2014/0257050 A1 | 9/2014 | Kuroda et al. |
| 2015/0020081 A1 | 1/2015 | Cho et al. |
| 2015/0084892 A1 | 3/2015 | Shirota et al. |
| 2015/0089974 A1 | 4/2015 | Seo et al. |
| 2015/0124566 A1 | 5/2015 | Lake et al. |
| 2015/0162751 A1 | 6/2015 | Leabman et al. |
| 2015/0169011 A1 | 6/2015 | Bibl et al. |
| 2015/0185766 A1 | 7/2015 | Otsuka et al. |

(56) References Cited

U.S. PATENT DOCUMENTS

| | | |
|---|---|---|
| 2015/0185944 A1 | 7/2015 | Magi et al. |
| 2015/0227245 A1 | 8/2015 | Inagaki et al. |
| 2015/0333572 A1 | 11/2015 | Leabman |
| 2015/0378391 A1 | 12/2015 | Huitema et al. |
| 2015/0381793 A1 | 12/2015 | Cerda et al. |
| 2016/0014919 A1 | 1/2016 | Huitema et al. |
| 2016/0019703 A1 | 1/2016 | Tian |
| 2016/0034742 A1 | 2/2016 | Kim et al. |
| 2016/0037625 A1 | 2/2016 | Huitema et al. |
| 2016/0041581 A1 | 2/2016 | Piccionelli et al. |
| 2016/0041680 A1* | 2/2016 | Chi .............. H04B 1/385 345/173 |
| 2016/0062410 A1 | 3/2016 | Ko et al. |
| 2016/0142863 A1 | 5/2016 | Lam |
| 2016/0212837 A1 | 7/2016 | Kim |
| 2016/0277891 A1 | 9/2016 | Dvortsov et al. |
| 2016/0283086 A1 | 9/2016 | Inagaki et al. |
| 2016/0299570 A1 | 10/2016 | Davydov |
| 2016/0322745 A1 | 11/2016 | Shedletsky et al. |
| 2016/0360618 A1 | 12/2016 | Elsherbini et al. |
| 2016/0379205 A1 | 12/2016 | Margadoudakis |
| 2017/0046931 A1 | 2/2017 | Hartweg et al. |
| 2017/0052749 A1 | 2/2017 | Lee |
| 2017/0235341 A1 | 8/2017 | Huitema et al. |
| 2017/0236497 A1 | 8/2017 | Huitema et al. |

FOREIGN PATENT DOCUMENTS

| | | |
|---|---|---|
| CN | 101180864 A | 5/2008 |
| CN | 101796563 A | 8/2010 |
| CN | 102486906 A | 6/2012 |
| CN | 202311570 U | 7/2012 |
| CN | 103021277 A | 4/2013 |
| DE | 202006012076 U1 | 10/2006 |
| EP | 1599110 A1 | 11/2005 |
| EP | 2551110 A1 | 1/2013 |
| FR | 2284149 A1 | 4/1976 |
| JP | 2003-299238 A | 10/2003 |
| JP | 2008-275114 A | 11/2008 |
| JP | 2010-508557 A | 3/2010 |
| JP | 2010-159803 A | 7/2010 |
| JP | 2010-204377 A | 9/2010 |
| JP | 2013044293 A | 3/2013 |
| JP | 2013044294 A | 3/2013 |
| JP | 2013068292 A | 4/2013 |
| JP | 56-91704 B2 | 4/2015 |
| JP | 60-89448 B2 | 3/2017 |
| KR | 2011-0008118 U | 8/2011 |
| KR | 1256109 | 4/2013 |
| KR | 1278604 | 6/2013 |
| KR | 2013-0073331 A | 7/2013 |
| KR | 1301561 | 9/2013 |
| KR | 20150035232 A | 4/2015 |
| TW | 504127 U | 9/2002 |
| TW | M258364 U | 3/2005 |
| TW | M265636 U | 5/2005 |
| TW | 200815886 A | 4/2008 |
| TW | 201035934 A | 10/2010 |
| TW | 201301002 A | 1/2013 |
| TW | I383343 B | 1/2013 |
| WO | WO-00/25193 A2 | 5/2000 |
| WO | WO-01/64070 A1 | 9/2001 |
| WO | WO-2004/047059 A1 | 6/2004 |
| WO | WO-2006/027727 A1 | 3/2006 |
| WO | WO-2006/085271 A2 | 8/2006 |
| WO | WO-2007/023406 A2 | 3/2007 |
| WO | WO-2007/042987 A1 | 4/2007 |
| WO | WO-2008/054206 A2 | 5/2008 |
| WO | WO-2012/156804 A1 | 11/2012 |
| WO | WO-2012/167204 A2 | 12/2012 |
| WO | WO-2013/138003 A1 | 9/2013 |
| WO | WO-2015/023804 A1 | 2/2015 |

OTHER PUBLICATIONS

"Amazin Concept Holo Computer Elodie Delassus", Art, Concepts, Design, Gadgets, downloaded from the Internet at: http://designskings.com/amazin-concept-holo-computer-elodie-delassus/ (Jan. 18, 2012).

"Athletics and their supporters", Enlightened®: Illuminated Clothing by Janet Hansen, downloaded from the Internet at http://enlighted.com/pages/athletics.shtml (Aug. 8, 2013).

"E-Clock", Tokyoflash Japn Product Design Studio, downloaded from the Internet at http://blog.tokyoflash.com/2010/03/e-clock/ (Mar. 10, 2010).

"Features", Seg Sports Entertainment Gear, downloaded from the Internet at http://www.segshirts.com/features (Aug. 8, 2013).

"Flex Mobile, a Flexible Phone That Becomes a Bracelet, Some Other Wearable Piece of Gear", Concept Phones, downloaded from the Internet at http://www.concept-phones.com/tag/carolina-rebelo/ (Apr. 19, 2011).

"Flexible Smart Phone Fluid Presented by Philips", YouTube, downloaded from the Internet at http://www.youtube.com/watch?v=Wq9montNgbM&feature=player_detailpage (Apr. 2, 2012).

"iPING Putter App Cradle Attachment Case for iPhone 5", Carlsbad Golf Center, downloaded from the Internet at https://www.cgcgolfshop.com/p-50-iping-putter-app-cradle-attachment-case-for-iphone-5.aspx (Aug. 8, 2013).

"Moment Smartwatch: World's First Wrap Around Smart Watch," Momentum Labs LLC, 28 pp. (Jun. 24, 2014).

"outEDGE iPhone 5 External 2800 mAH Battery Extender Case w/ Flip Screen Cover", outEDGEPOWER Products, downloaded from the Internet at http://www.outedgepower.com/outedge-iphone-5-external-2800-mah-battery-extender-case-w-flip-screen-cover/ (Aug. 8, 2013).

"Philips unveils world's first 'Rollable Display' pocket e-Reader concept READIUS", PHYS.org website(Sep. 1, 2005).

"Rohm shows a flexible-OLED wristband", OLED-Info.com, downloaded from the Internet at http://www.oled-info.com/rohm-shows-flexible-oled-wristband (Oct. 5, 2009).

"Samsung concept video for wearables and phones", YouTube screenshot, downloaded from the Internet at http://www.youtube.com/watch?v=ezriwGwJGOs (Jul. 15, 2013).

"Samsung Galaxy X Concept Packs the Same Specs of teh Galaxy S II Plus a 12 MP Camera", Concept Phones website (May 15, 2011).

"Samsung Smart Watch Trademarks Filed, Wearable Internet Nearing Debut", Fox News Latino, downloaded from the Internet at http://latino.foxnews.com/latino/money/2013/08/07/samsung-smart-watch-trademarks-filed-wearable-internet-nearing-debut/ (Aug. 7, 2013).

"Sony Smartwatch 2 goes official: water-resistant, open API", phoneArena.com, downloaded from the Internet at http://www.phonearena.com/news/Sony-Smartwatch-2-goes-official-water-resistant-open-API_id44469 (Jun. 25, 2013).

"Taiwan Company to Begin Production of Large Format Flexible Electronic Paper Display Technology", Over the Wire, downloaded from the Internet at http://www.naylornetwork.com/ppi-otw/articles/?aid=219054&issueID=29119 (Aug. 8, 2013).

"Thermal Image Athletic Apparel", Trendhunter Lifestyle, downloaded from the Internet at http://www.trendhunter.com/trends/high-tech-athletic-apparel (Mar. 16, 2013).

"Wearable Concept Phone is Not Nokia 888", Concept Phones, downloaded from the Internet at http://www.concept-phones.com/tag/hyun-sung-lee/ (Jul. 18, 2008).

"What Will You Pop?", popSLATE, downloaded from the Internet at http://www.popslate.com (2012).

"Yuno Concept", TechPin, downloaded from the Internet at <http://www.techpin.com/yuno-concept/> (May 8, 2008).

Catacchio, "New OLED panel to bring bendable cell phones closer to reality?", TNW, downloaded from the Internet at http://thenextweb.com/asia/2010/10/04/new-oled-panel-to-bring-bendable-cell-phones-closer-to-reality/ (Oct. 4, 2010).

(56) References Cited

OTHER PUBLICATIONS

Cochrane et al., "Flexible displays for smart clothing: Part I-Overview", Indian Journal of Fibre & Textile Research, 36:422-8 (Dec. 2011).
Cooper, "Hands-on with Polymer Vision's e-ink Readius", engadget, downloaded from the Internet at http://www.engadget.com/2008/02/14/hands-on-with-polymer-visions-e-ink-readius/ (Feb. 14, 2008).
Crisp, "Rafael Nadal demonstrates Babolat Play & Connect interactive tennis racquet", gizmag, downloaded from the Internet at http://www.gizmag.com/rafael-nadal-demonstrates-babolat-play-connect-interactive-tennis-racquet/22699/ (May 26, 2012).
Eaton, "Nokia Morph Cellphone Rolls Up, Stretches, Cleans Itself", Gizmodo, downloaded from the Internet at http://gizmodo.com/360260/nokia-morph-cellphone-rolls-up-stretches-cleans-itself (Feb. 25, 2008).
Extended European Search Report for Application No. 14874426.1, dated Aug. 11, 2017.
Extended European Search Report for Application No. 14875486.4, dated Sep. 19, 2017.
Fingas, "Tentative Samsung smartwatch design unearthed in Korean patents", engadget, downloaded from the Internet at http://www.engadget.com/2013/08/03/tentative-samsung-smartwatch-designs-unearthed-in-korean-patents/ (Aug. 3, 2013).
First Chinese Office Action for Application No. 201480058291.8, dated Jul. 31, 2017.
Honig, "Pebble smartwatch review", engadget, downloaded from the Internet at http://www.engadget.com/2013/01/25/pebble-smartwatch-review/ (Jan. 25, 2013).
Inofuentes, "Officially announced: LG G Flex and a healing factor", ars technica, downloaded from the Internet at http://arstechnica.com/gadgets/2013/10/officially-announced-lg-g-flex-and-a-healing-factor/ (Oct. 28, 2013).
International Preliminary Report on Patentability for Application No. PCT/US2016/019729, dated Sep. 8, 2017.
International Preliminary Report on Patentability, International Application No. PCT/US14/50972, dated Jan. 19, 2016.
International Preliminary Report on Patentability, International Application No. PCT/US14/52814, dated Mar. 1, 2016.
International Preliminary Report on Patentability, International Application No. PCT/US14/52957, dated Mar. 1, 2016.
International Preliminary Report on Patentability, International Application No. PCT/US14/55043, dated Mar. 15, 2016.
International Search Report and Written Opinion for Application No. PCT/US2016/019729, dated May 17, 2016.
International Search Report and Written Opinion, International Application No. PCT/US14/50972, dated Jan. 14, 2015.
International Search Report and Written Opinion, International Application No. PCT/US14/52814, dated Dec. 11, 2014.
International Search Report and Written Opinion, International Application No. PCT/US14/52957, dated Dec. 9, 2014.
International Search Report and Written Opinion, International Application No. PCT/US14/71859, dated Mar. 20, 2015.
International Search Report and Written Opinion, International Application No. PCT/US14/72172, dated Mar. 18, 2015.
International Search Report and Written Opinion, International Application No. PCT/US2014/055043, dated Jan. 27, 2015.
International Search Report and Written Opinion, International Application No. PCT/US2014/072313, dated Apr. 22, 2015.
International Search Report and Written Opinion, International Application No. PCT/US2014/072328, dated Apr. 22, 2015.
International Search Report and Written Opinion, International Application No. PCT/US2015/014964, dated May 14, 2015.
International Search Report and Written Opinion, International Application No. PCT/US2015/022691, dated Jul. 8, 2015.
International Search Report and Written Opinion, International Application No. PCT/US2015/026163, dated Jul. 20, 2015.
International Search Report and Written Opinion, International Application No. PCT/US2015/030254, dated Aug. 10, 2015.
International Search Report and Written Opinion, International Application No. PCT/US2015/030724, dated Aug. 14, 2015.
International Search Report and Written Opinion, International Application No. PCT/US2015/032799, dated Aug. 31, 2015.
Johan, "ASUS Waveface Ultra", techfresh.net, downloaded from the Internet at http://www.techfresh.net/asus-waveface-ultra/ (Jan. 19, 2010).
Kahn, "Is Apple's iWatch a slap wrist band with a flexible display?", 9to5Mac Apple Intelligence, downloaded from the Internet at http://9to5mac.com/2013/02/21/is-apples-iwatch-a-slap-wrist-band-with-a-flexible-display/ (Feb. 21, 2013).
Kaki, "10 Beautiful Nokia Concept Phones for Future Generations", DreamsRain website, downloaded from the Internet at http://www.dreamsrain.com/2011/09/18/10-beautiful-nokia-concept-phones-for-future-genrations/ (Sep. 18, 2011).
Kelvin, "Apple iBand Envisioned by T3: Health Features, Fitness and Watch Functions (Video)", Concept Phones, downloaded from the Internet at http://www.concept-phones.com/apple/apple-iband-envisoned-t3-health-features-fitness-watch-functions-video/ (Feb. 18, 2014).
Kelvin, "Apple iWatch 2 Concept by Jermaine Smit Lets You Change the Watch Bracelet Easily (Video)", Concept Phones, downloaded from the Internet at http://www.concept-phones-com/apple/apple-iwatch-2-concept-jermaine-smit-lets-change-watch-bracelet-easily-video/ (Mar. 5, 2014).
Kelvin, "Apple iWatch Concept Goes Back to Basics, Looks Like Nike Fuelband", Concept Phones, downloaded from the Internet at http://www.concept-phones.com/apple/apple-iwatch-concept-basics-nike-duelband/ (Oct. 22, 2013).
Kelvin, "Apple iWatch Glass Hologram is an Overpowered Smartwatch (Video)", Concept Phones, downloaded from the Internet at http://www.concept-phones.com/apple/apple-iwatch-glass-hologram-overpowered-smartwatch-video/ (Apr. 19, 2014).
Kelvin, "Apple iWatch Goes Back to the Idea of an iPod Nano With a Belt", Concept Phones, downloaded from the Internet at http://www.concept-phones.com/apple/apple-iwatch-idea-ipod-nano-belt/ (Mar. 2, 2014).
Kelvin, "Finally, a HTC Smartwatch! We Needed Those!", Concept Phones, downloaded from the Internet at http://www.concept-phones.com/htc/finally-htc-smartwatch-needed/ (Feb. 4, 2014).
Kelvin, "Flexible Screen X Phone Becomes a Bracelet", Concept Phones, downloaded from the Internet at <http://www.concept-phones.com/cool-concepts/flexible-screen-phone-bracelet/> (Oct. 28, 2013).
Kelvin, "HTC One Watch Render Seems Taken out of Tron", Concept Phones, downloaded from the Internet at http://www.concept-phones.com/htc/htc-watch-render-tron/ (Oct. 14, 2013).
Kelvin, "iPhone 6 and iWatch Pro Get Designed by Dani Yako", Concept Phones, downloaded from the Internet at http://www.concept-phones.com/apple/iphone-6-iwatch-pro-designed-dani-yako/ (Jun. 6, 2014).
Kelvin, "iWatch Concept is a Curved Bracelet, Runs Flappy Bird", Concept Phones, downloaded from the Internet at http://www.concept-phones.com/apple/iwatch-concept-curved-bracelet-runs-flappy-bird/ ( Feb. 13, 2014).
Kelvin, "iWatch Goliath is a Giant on Your Wrist (Video)", Concept Phones, downloaded from the Internet at http://www.concept-phones.com/apple/iwatch-goliath-giant-wrist-video/ (May 23, 2014).
Kelvin, "iWatch Render Goes the Way of the Nike FuelBand", Concept Phones, downloaded from the Internet at http://www.concept-phones.com/apple/iwatch-render-nike-fuelband/ (Jan. 21, 2014).
Kelvin, "Meizu MWatch Render is Exactly What Smartwatches Need", Concept Phones, downloaded from the Internet at http://www.concept-phones.com/cool-concepts/meizu-mwatch-render-smartwatches/ (Feb. 12, 2014).
Kelvin, "MWC 2014: Kyocera Showcases Flexible Phone That Turns Into Bracelet", Concept Phones, downloaded from the Internet at http://www.concept-phones.com/kyocera/mwc-2014-kyocera-showcases-flexible-phone-turns-bracelet/ (Feb. 27, 2014).
Kelvin, "New Apple iWatch Render Shows us an Ultrathin Bracelet", Concept Phones, downloaded from the Internet at http://www.concept-phones.com/apple/apple-iwatch-render-shows-ultrathin-bracelet/ (Oct. 16, 2013).

(56) References Cited

OTHER PUBLICATIONS

Kelvin, "New iWatch Design Brings Us Back the Basics of a Watch", Concept Phones, downloaded from the Internet at http://www.concept-phones.com/apple/iwatch-design-brings-basics-watch/ (Apr. 29, 2014).
Kelvin, "Nokia Lumia 101 Smartwatch is a Nice Little, Elegant Bracelet", Concept Phones, downloaded from the Internet at http://www.concept-phones.com/nokia/nokia-lumia-101-smartwatch-nice-elegant-bracelet/ (Dec. 3, 2013).
Kelvin, "Superb Google Smartwatch Render Created in Cinema 4D", Concept Phones, downloaded from the Internet at http://www.concept-phones.com/google/superb-google-smartwatch-render-created-cinema-4d/ (Jan. 31, 2014).
Kim, "Analysis of iWatch-related Patents from RitFast", IHS Technology, downloaded from the Internet at http://www.displaybank.com/letter/letter_contents.php?nm=&email=prakash%40polyera.com&mail_id=8995 (Jul. 19, 2013).
Lilienthal, "Book? Accordian? Nope. Lumino is a Gorgeous LED Lamp the Goes Wherever You Do," Digital Trends, 6 pp. (Apr. 27, 2014).
Non-Final Office Action from U.S. Appl. No. 14/188,440 dated Aug. 14, 2015.
Office Action for U.S. Appl. No. 15/054,725, dated Aug. 23, 2017.
Rastogi, "Nokia Lumia 1080: The Concept Phone", 91 mobiles, downloaded from the Internet at http://www.91mobiles.com/blog/nokia-lumia-1080-the-concept-phone.html (Jun. 27, 2013).
Ridden, "Emopulse Smile SmartWatch goes up for pre-order", Gizmag, downloaded from the Internet at http://www.gizmag.com/emopulse-smile-smartwatch/27984/ (Jun. 19, 2013).
Seth, "In 2020 We Can Wear Sony Computers on Our Wrist", Yanko Design Form Beyond Function, downloaded from the Internet at http://www.yankodesign.com/2010/05/25/in-2020-we-can-wear-sony-computers-on-our-wrist/ (May 25, 2010).
Seth, "Love This iWatch!", Yanko Design Form Beyond Function, downloaded from the Internet at http://www.yankodesign.com/2013/07/26/love-this-iwatch/ (Jul. 26, 2013).
Seth, "My Latest Fashion Accessory", Yanko Design Form Beyond Function, downloaded from the Internet at http://www.yankodesign.com/2009/08/11/my-latest-fashion-accessory/ (Aug. 11, 2009).
Seth, "Super Sexy Roll", Yanko Design Form Beyond Function, downloaded from the Internet at http://www.yankodesign.com/2011/03/21/super-sexy-roll/ (Mar. 21, 2011).
Smith, "Flexi E Ink screen finds home in curved world time watch", The Register, downloaded from the Internet at http://www.theregister.co.uk/2010/10/11/phosphor_watches_world_time/ (Oct. 11, 2010).
Smith, "Samsung smartwatch concept shown in patent hints at flexible display use", Android Authority (Aug. 3, 2013).
Smith, "Samsung's curved smartphone is the Galaxy Round, launches in Korea tomorrow (video)", engadget, downloaded from the Internet at http://www.engadget.com/2013/10/08/samsung-galaxy-round/ (Oct. 8, 2013).
Thrystan, "Apple iWatch 2 Design Appears, More Elegant Than Ever", Concept Phones, downloaded from the Internet at http://www.concept-phones.com/apple/apple-iwatch-2-design-appears-elegant/ (Feb. 9, 2012).
Thrystan, "BenQ Siemens Snake Concept Phone is Yet Another Bracelet-Handset", Concept Phones, downloaded from the Internet at http://www.concept-phones.com/benq-siemens/benq-siemens-snake-concept-phone-bracelethandset/ (Feb. 9, 2009).
Thrystan, "Bracelet Phone Concept Incorporates an MP3 Player, Shines Like a Diamond", Concept Phones, downloaded from the Internet at http://www.concept-phones.com/fashion-phones/bracelet-phone-concept-incorporates-mp3-player-shines-diamond/ (Sep. 8, 2008).
Thrystan, "CEATEC 2010 Hosts TDK's Flexible OLED Displays; Hands-on Photos Here!", Concept Phones, downloaded from the Internet at http://www.concept-phones.com/news/ceatec-2010-hosts-tdks-flexible-oled-displays-handson-photos/ (Oct. 5, 2010).
Thrystan, "Dyson Concept Phone Charger Turns Temperature Differences Into Electricity", Concept Phones, downloaded from the Internet at http://www.concept-phones.com/cool-concepts/dyson-concept-phone-charger-turns-temperature-differences-electricity/ (Jul. 24, 2009).
Thrystan, "Email Beeper Watch is Hip, Restarts a Trend", Concept Phones, downloaded from the Internet http://www.concept-phones.com/cool-concepts/email-beeper-watch-hip-restarts-trend/ (Mar. 3, 2009).
Thrystan, "Flux, Portable and Wearable PC Concept", Concept Phones, downloaded from the Internet at http://www.concept-phones.com/eco-friendly/ilux-portable-and-wearable-pc-concept/ (May 5, 2008).
Thrystan, "Fujitsu Concept Phones Part 2: Judge-Dredd-Like Curvy Handset", Concept Phones, downloaded from the Internet http://www.concept-phones.com/fujitsu/fujitsu-concept-phones-part-2-judgedreddlike-curvy-handset/ (Oct. 10, 2009).
Thrystan, "iPhone 5 Bracelet Looks Out of this World", Concept Phones, downloaded from the Internet at http://www.concept-phones.com/apple/iphone-5-bracelet-world/ (Jul. 6, 2012).
Thrystan, "iPhone Holographic Display Concept is Surreal, Could Work", Concept Phones, downloaded from the Internet at http://www.concept-phones.com/apple/iphone-holographic-display-concept-surreal-work/ (Aug. 22, 2009).
Thrystan, "iWatch Design Created by James Ivaldi is All Metal", Concept Phones, downloaded from the Internet at http://www.concept-phones.com/apple/iwatch-design-created-james-ivaldi-metal/ (Jul. 29, 2013).
Thrystan, "iWatch Render in the Vision of the Ciccarese Design Team: Simply Stunning (Video)", Concept Phones, downloaded from the Internet at http://www.concept-phones.com/apple/watch-render-vision-ciccarese-design-team-simply-stunning-video/ (Aug. 21, 2013).
Thrystan, "Leaf Phone Features an Organic Structure, is Made of Eco-Friendly Plastic," Concept Phones, downloaded from the Internet at http://www.concept-phones.com/eco-friendly/leaf-phone-features-organic-structure-ecofriendly/plastic/ (Nov. 4, 2009).
Thrystan, "LG Auki Bracelet Phone Is Colorful and Elegant", Concept Phones, downloaded from the Internet at http://www.concept-phones.com/lg/lg-auki-bracelet-phone-colorful-elegant/ (Aug. 26, 2011).
Thrystan, "LG Helix Cellphone is Also a Slap Bracelet", Concept Phones, downloaded from the Internet at http://www.concept-phones.com/lg/lg-helix-cellphone-slap-bracelet/ (Oct. 9, 2009).
Thrystan, "LG Oyster, a Bracelet-Like Mobile Phone Design", Concept Phones, downloaded from the Internet at <http://www.concept-phones.com/lg/lg-oyster-braceletlike-mobile-phone-design/ > (Jul. 26, 2009).
Thrystan, "New iWatch Render by Tolga Tuncer is Fancy and Classy", Concept Phones, downloaded from the Internet at http://www.concept-phones.com/apple/iwatch-render-tolga-tuncer-fancy-classy/ (Mar. 3, 2013).
Thrystan, "Nokia Mixed Reality Concept, Future Technology Demoed at Nokia World (Video)", Concept Phones, downloaded from the Internet at http://www.concept-phones.com/nokia/nokia-mixed-reality-concept-future-technology-demoed-nokia-world-video/ (Sep. 9, 2009).
Thrystan, "Nokia Open Bracelet Shows Incoming Calls of the Ones You Love", Concept Phones, downloaded from the Internet at http://www.concept-phones.com/nokia/nokia-open-bracelet-shows-incoming-calls-love/ (Dec. 13, 2008).
Thrystan, "Nokia Smart Watch Concept Looks Interesting", Concept Phones, downloaded from the Internet at http://www.concept-phones.com/uncategorized/nokia-smart-watch-concept-interesting/ (Oct. 22, 2011).
Thrystan, "Purse Bracelet Fancy Concept Phone, Designed by Yw Li", Concept Phones, downloaded from the Internet at http://www.concept-phones.com/fashion-phones/purse-bracelet-fancy-concept-phone-designed-yw-ll/ (Oct. 19, 2008).
Thrystan, "Quartz Tele Concept Should be in a Final Fantasy Game, Because It's All About Crystals", Concept Phones, downloaded from the Internet at http://www.concept-phones.com/fashion-phones/quartz-tele-concept-final-fantasy-game-crystals/ (Sep. 8, 2008).
Thrystan, "Samsung Finger Touching Cellphone Concept Comes in Handy", Concept Phones, downloaded from the Internet at http://

(56) References Cited

OTHER PUBLICATIONS www.concept-phones.com/samsung/samsung-finger-touching-cellphone-concept-handy/ (Jan. 31, 2009).
Thrystan, "Samsung Futuristic Technology Relies on Health and Flexibility (Video)", Concept Phones, downloaded from the Internet at http://www.concept-phones.com/samsung/samsung-futuristic-technology-relies-health-flexibility-video/ (Jul. 10, 2013).
Thrystan, "Samsung S-Health Bracelet Render is Based on Tizen OS", Concept Phones, downloaded from the Internet at http://www.concept-phones.com/samsung/samsung-shealth-bracelet-render-based-tizen-os/ (Jun. 17, 2013).
Thrystan, "Sony Ericsson Bracelet Phone, a Design That Won't Make It Into Production", Concept Phones, downloaded from the Internet at http://www.concept-phones.com/sony-ericsson/sony-ericsson-bracelet-phone-design-production/ (Jun. 19, 2009).
Thrystan, "Sony Ericsson Ring Phone Concept by Tao Ma Will Always Be a Winner", Concept Phones, downloaded from the Internet at http://www.concept-phones.com/sony-ericsson/sony-ericsson-ring-phone-concept-tao-ma-winner/ (Sep. 15 2008).
Thrystan, "Speak to Me Concept Watch Phone is Hot, a Must-Have Fashion Accessory", Concept Phones, downloaded from the Internet at http://www.concept-phones.com/fashion-phones/speak-concept-watch-phone-hot-musthave-fashion-accessory/ (Jan. 27, 2009).
Thrystan, "The Hook Bracelet Phone Concept Runs Windows Phone in a New Format", Concept Phones, downloaded from the Internet at http://www.concept-phones.com/cool-concepts/hook-bracelet-phone-concept-runs-windows-phone-format/ (Jun. 21, 2013).
Thrystan, "The New iPod is iBangle . . . iLike iT", Concept Phones, downloaded from the Internet at http://www.concept-phones.com/apple/ipod-ibangle-ilike/ (Oct. 23, 2008).
Thrystan, "Xbox 720 Concept is a Pyramid With Two Kinect "Eyes"", Concept Phones, downloaded from the Internet at http://www.concept-phones.com/microsoft/xbox-720-concept-pyramid-kinect-eyes/ (Jul. 8, 2013).
Thrystan, "Yuxa is a Wearable Cellphone Made From Eco-Friendly Materials", Concept Phones, downloaded from the Internet at http://www.concept-phones.com/eco-friendly/yuxa-wearable-cellphone-ecofriendly-materials/ (Jun. 24, 2010).
Thrystan, "ZTE Cube Phone, Another Mobile World Congress Concept", Concept Phones, downloaded from the Internet at http://www.concept-phones.com/cool-concepts/zte-cube-phone-another-mobile-world-congress-concept/ (Feb. 14, 2008).
Vertegaal et al., "Organic User Interfaces have non-planar displays that may actively or passively change shape via analog physical inputs", Organic User Interfaces—Communications of the ACM (May 31, 2008).
Wei et al., Shape memory materials and hybrid composites for smart systems, Part II: Shape-memory hybrid composites, J. Mater. Sci., 33:3763-83 (1998).
First Office Action received in corresponding Chinese Application No. 2014/180076308.2 dated Jun. 29, 2018.
First Office Action received in corresponding Chinese Application No. 2014/80076314.8 dated Jun. 28, 2018.
Extended European Search Report for Application No. 14875752.9, dated Aug. 1, 2017.
Office Action for Taiwanese Application No. 103129521, dated Apr. 9, 2018.
Office Action for Taiwanese Application No. 103145225, dated Jan. 7, 2019.
Third Chinese Office Action for Application No. 201480058291.8, dated Jan. 14, 2019.
European Office Action for Application No. 14874426.1, dated Mar. 7, 2019.
Notice of Reasons for Rejection for Japanese Application No. 2016-542913, dated Feb. 27, 2019.
Second Chinese Office Action for Application No. 201480076308.2, dated Mar. 11, 2019.
Second Chinese Office Action for Application No. 201480076314.8, dated Mar. 11, 2019.
Office Action for Taiwanese Application No. 103145254, dated Mar. 18, 2019.
European Office Action for Application No. 14875486.4, dated Apr. 25, 2019.
First Chinese Office Action for Application No. 201480056371.X, dated Apr. 3, 2019.
Office Action for Taiwanese Application No. 103127788, dated Mar. 7, 2019.
European Office Action for Application No. 14875486.4, dated Mar. 25, 2020.
European Office Action for Application No. 14875752.9, dated Mar. 25, 2020.
Notice of Final Rejection for Japanese Application No. 2016-542913, dated Oct. 29, 2019.
Second Chinese Office Action for Application No. 201480056371.X, dated Apr. 2, 2020.
Notice of Reasons for Rejection for Japanese Application No. 2016-543044, dated May 29, 2019.
Office Action for Taiwanese Application No. 104109785, dated Jul. 12, 2019.
Notice of Reasons for Rejection for Japanese Application No. 2020-034700, dated Mar. 15, 2021.
Notice of Preliminary Rejection for Korean Application No. 2016-7020269, dated Apr. 6, 2021.

\* cited by examiner

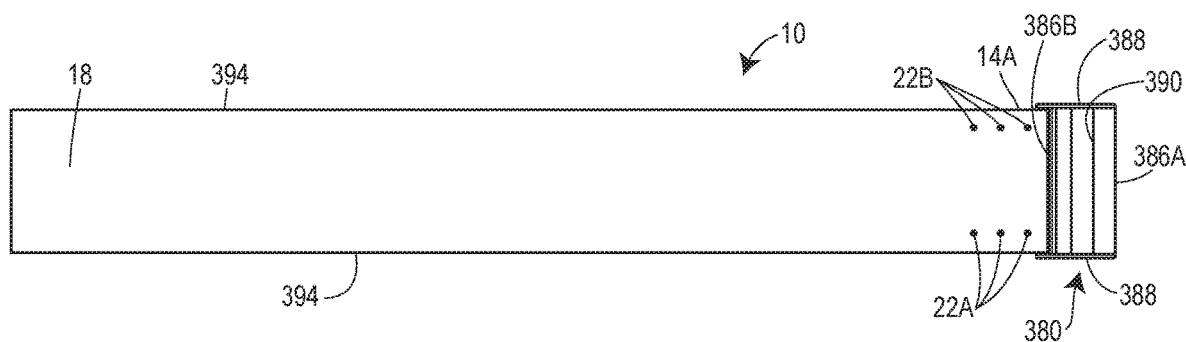
FIG. 17
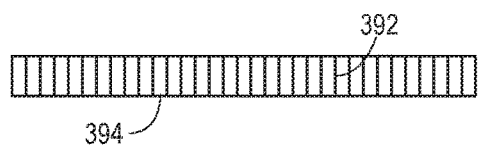
FIG. 18
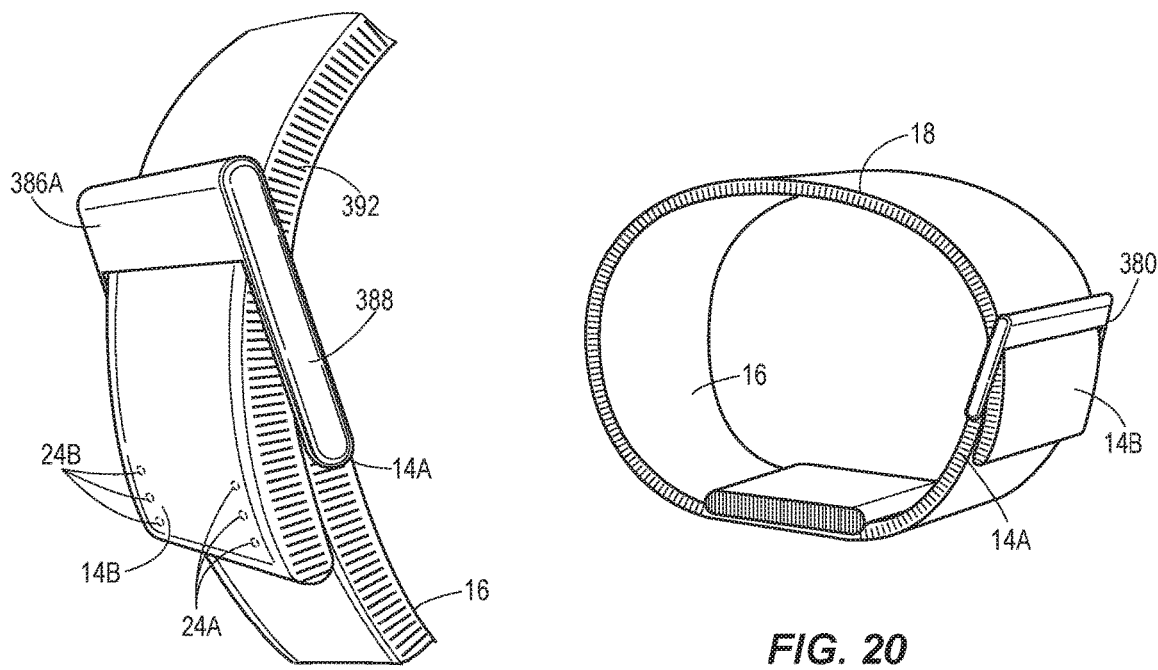
FIG. 19
FIG. 20

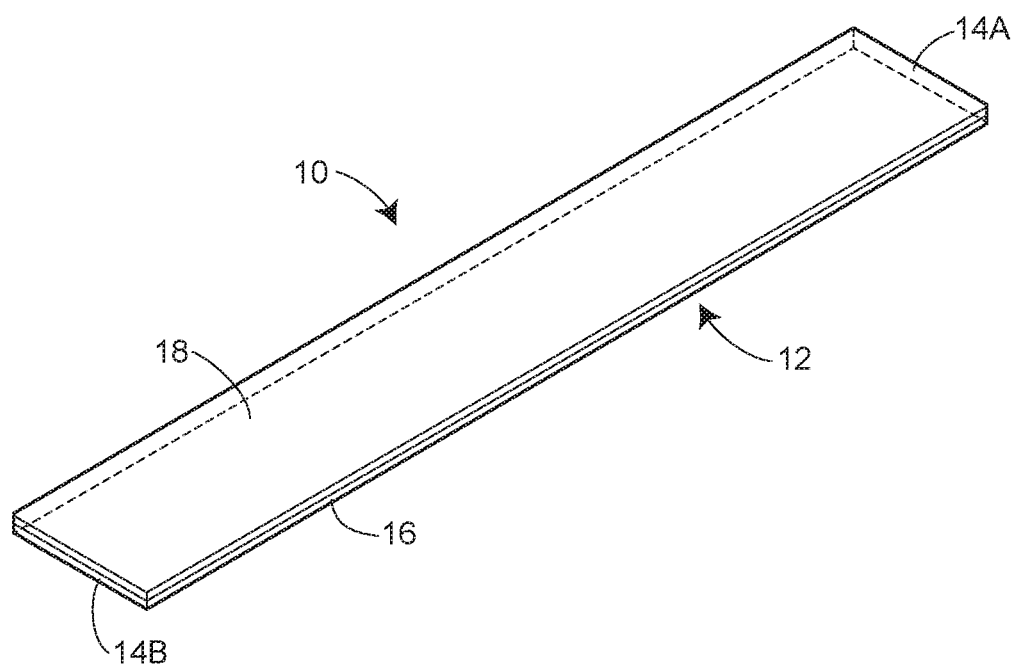
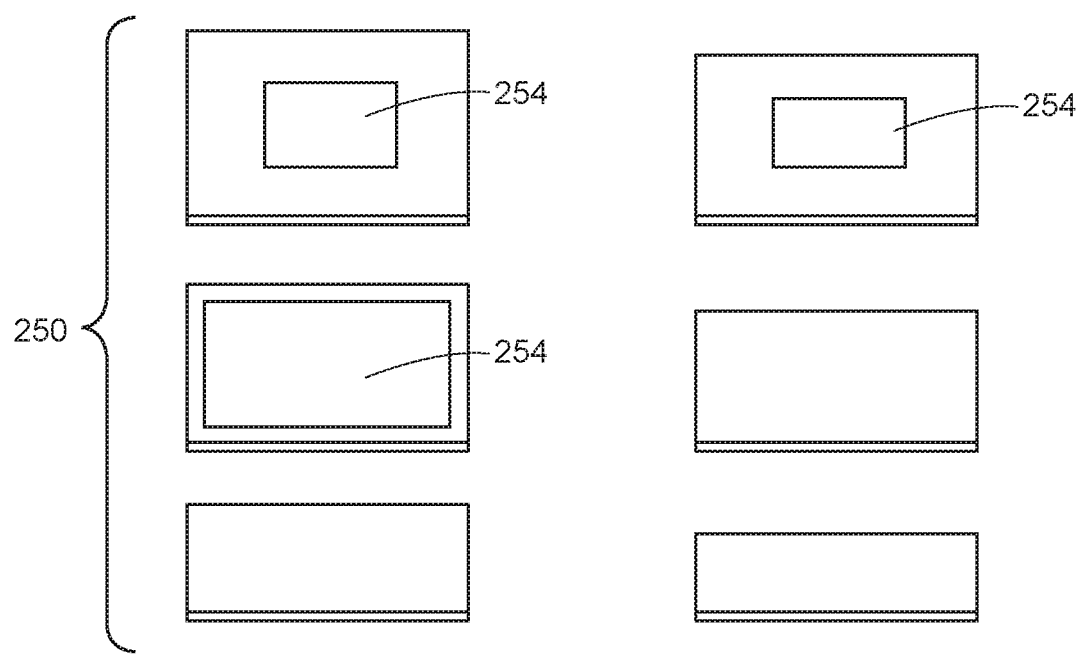
FIG. 24A

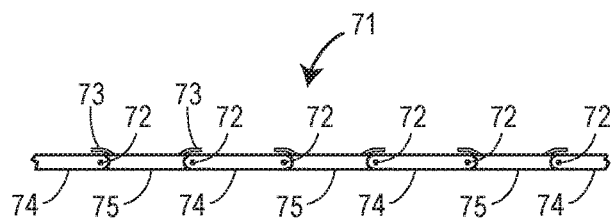
FIG. 39
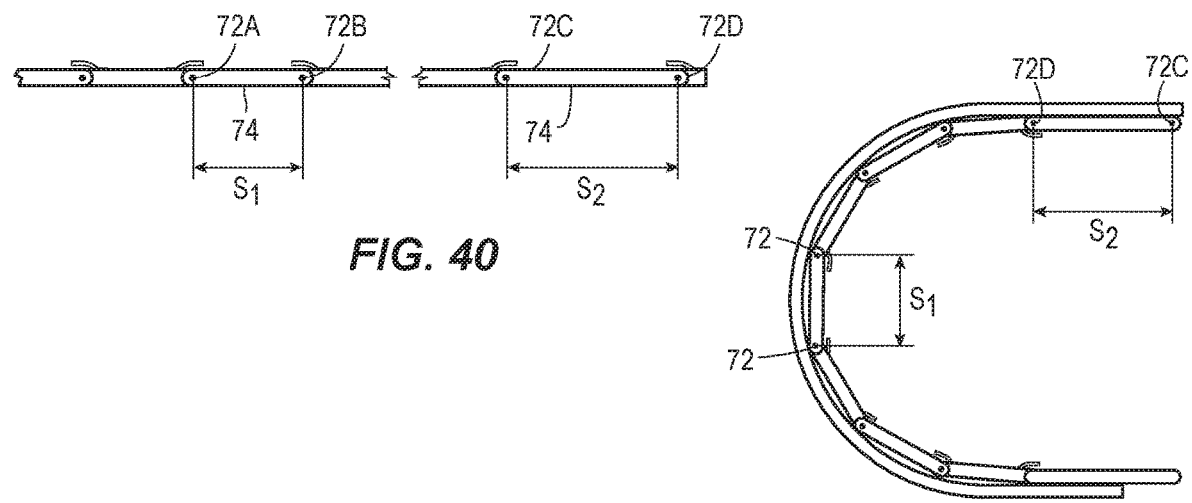
FIG. 40
FIG. 41
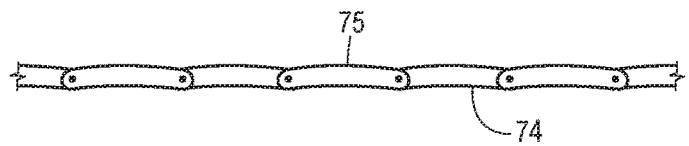
FIG. 42
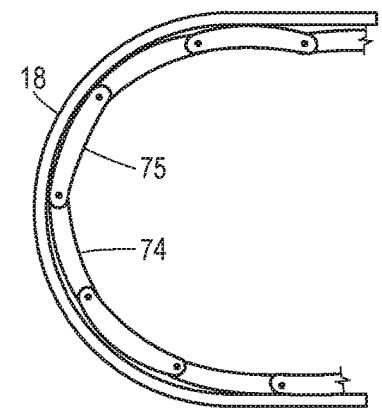
FIG. 43
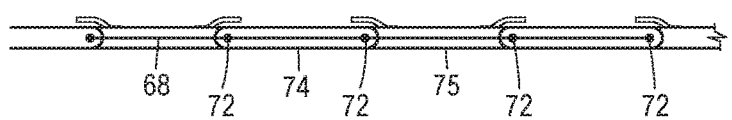
FIG. 44

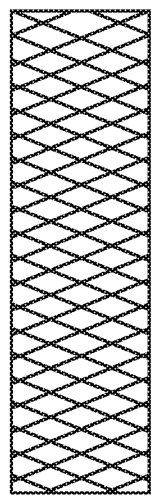    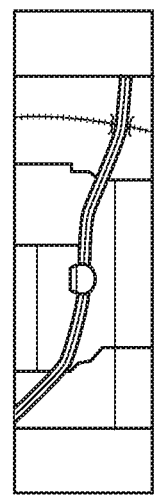
*FIG. 62A*   *FIG. 62B*   *FIG. 62C*   *FIG. 62D*   *FIG. 62E*
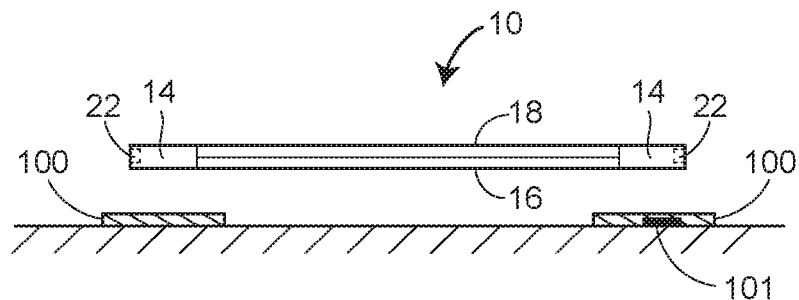
*FIG. 63A*
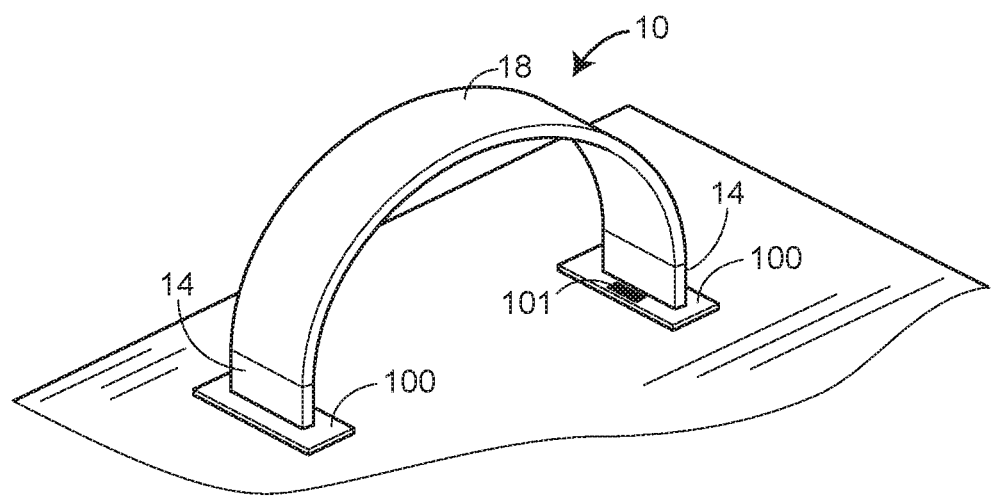
*FIG. 63B*

ATTACHABLE DEVICE HAVING A FLEXIBLE ELECTRONIC COMPONENT

RELATED APPLICATIONS

This application is a continuation application of International Patent Application No. PCT/US2014/52957 filed Aug. 27, 2014, which claims priority to and the benefit of the filing dates of: U.S. Provisional Patent Application No. 61/870,781 entitled "ATTACHABLE DEVICE WITH AN INTEGRAL FLEXIBLE DISPLAY" and filed on Aug. 27, 2013 (Ref. No.: 32187-47794P); U.S. Provisional Patent Application No. 61/920,705 entitled "DYNAMICALLY FLEXIBLE, ATTACHABLE DEVICE HAVING AN INTEGRAL FLEXIBLE DISPLAY" and filed on Dec. 24, 2013 (Ref. No.: 32187-48118P); U.S. Provisional Patent Application No. 61/969,531 entitled "DYNAMICALLY FLEXIBLE, ATTACHABLE DEVICE HAVING A FLEXIBLE ELECTRONIC DISPLAY" and filed on Mar. 24, 2014 (Ref. No.: 32187-47794P2); U.S. Provisional Patent Application No. 61/972,067 entitled "ATTACHABLE BAND DEVICE HAVING A FLEXIBLE ELECTRONIC DISPLAY WITH MAXIMAL CONTINUOUS USABLE DISPLAY," filed on Mar. 28, 2014 (Ref. No.: 32187-48476P); and U.S. Provisional Patent Application No. 61/979,499 entitled "FLEXIBLE BAND DEVICE WITH FLEXIBLE ELECTRONIC DISPLAY PROTECTION FEATURES," filed on Apr. 14, 2014 (Ref. No.: 32187-48480P). The entire disclosure of each of these applications is hereby expressly incorporated by reference herein for all uses and purposes.

TECHNICAL FIELD

This patent relates generally to flexible electronic components, and more particularly to dynamically flexible electronic displays incorporated into or disposed on articles that are easily attachable to other items, such as arms, mugs, shoes, belts, coffee cups, phones, computers, etc.

BACKGROUND

Electronic components such as electronic displays are commonly installed within flat, hard surfaces of electronic devices, such as computer screens, television sets, smart phones, tablet computers, etc., and in many cases are installed on accessories for the electronic devices, such as removable monitors. Many electronic devices having an electronic display are portable, and have thus become very useful in implementing mobile applications. This fact is particularly true with smart phones which have become ubiquitous. However, unfortunately, typical mobile devices such as smart phones have electronic displays that are rigid (and in some cases, flat) in nature. Thus, while these displays are useful in implementing many different applications, the device on which the display is present must still typically be held in a hand, or must be stored in a pocket, a purse, a briefcase or other container, which makes the electronic device less accessible in many situations, such as when a person is carrying other items, undertaking an athletic activity such as running, walking, etc. Moreover, in many cases these traditional electronic devices require two free hands to hold and operate, making these devices cumbersome or difficult to use or to view in situations in which, for example, a person has only one or no free hands or is otherwise occupied.

Flexible displays are generally known and are starting to come into more common usage, however, flexible displays have not been widely incorporated into easily portable items such as items of clothing, wristbands, jewelry, etc. or on items that are easily attached to other items, much less in a manner that makes the display more useable and visible to the user in many different scenarios.

SUMMARY

A dynamically flexible attachable article or device, such as a wristband, an armband, a belt, a mobile device with a foldable display, etc., includes a flexible electronic component (e.g., a flexible display, a flexible OLED light, a flexible electronic circuit) disposed thereon in a manner that is dynamically bendable or conformable to a user's wrist, arm or other curved or even flat surface. Dynamic bending or flexibility may, for example, refer to the ability to bend the attachable article, and more particularly the flexible electronic component, at a number of different points, if not every point, along a length of the flexible component, the ability to bend different portions of the attachable article differently (e.g., different portions can be bent at/to different angles or curvatures), the ability to bend the attachable article in a number of different directions (e.g., in a concave direction and a convex direction), or the ability to bend the attachable article in some other dynamic manner. The dynamically flexible, attachable article with such a flexible electronic component may be attached to or worn on a user's body, such as in the form of a wristband or on a shoe or a belt, and may bend to fit the various contours or body surfaces on which the electronic component is located. The dynamically flexible, attachable article is also easily attached to other items, such as mugs, cups, computers, phone covers, bike handles, automobile dashboards, stands, chargers, etc., that enable the flexible electronic component to be viewed when not being held in one's hands or on one's body. The flexible electronic component of the attachable article is thus, in many cases, easily viewable to a user and is capable of being manipulated or actuated by the user without having to be held in one or both of the user's hands, making the electronic component useable while the user is engaged in or performing other activities, such as running, biking, etc.

In some embodiments, the attachable article can include a band having a flexible support and first and second ends. The flexible electronic component can be disposed on the flexible support. The band can include a connection mechanism disposed proximate to one or both of the first and second ends of the band to connect two different portions (e.g., the first and second ends) of the band together. The connection mechanism may include one or more magnets and may further include a first set of uneven grooves disposed at one portion of the band and a corresponding second set of uneven grooves disposed at a second portion of the band for mating with the first set of uneven grooves. In another case, the connection mechanism may include a multiplicity of magnets disposed in series along at least one end of the band and the connection mechanism may be adjustable to enable the first and second ends of the band to be moved to different overlapping positions with respect to one another. If desired, the connection mechanism may include a series of magnets disposed along the first end of the band and a series of magnetically permeable material elements, such as metal or magnets, disposed along the second end of the band, or may include at least one magnet disposed at a first lateral end of the band and a magnetically permeable material disposed at a second and opposite lateral end of the band. The connection mechanism may further include a tab disposed at one of the first and second lateral ends of the band and a groove that accepts the tab disposed at the other of the first and second lateral ends of the band. In still other embodiments, the connection mechanism may include a hook and loop structure coupled to the band or a buckle connected to one end of the band that accepts the other end of the band through the buckle.

In one case, the dynamically flexible, attachable article can include one or more electronics modules electronically connected to the flexible electronic component and each including a display driver and a processor. Control and communication electronics for the article can be disposed in the electronics modules. If desired, the electronics module(s) can be rigid, and can be coupled to the flexible support at, for example, an end of the flexible support or at any point between two ends of the flexible support. For ease of reading, the one or more electronics modules are referred to herein in the singular (i.e., "electronics module"), although it is understood that a dynamically flexible, attachable electronic device may include more than one electronics module.

The electronics module includes a processor for implementing applications or programming, such as an application or program to communicate with a display driver to drive the electronic display to display fixed or changeable messages, artwork, pictures, etc. The electronic module also includes a memory for storing pictures, images, messages, videos, etc. to be displayed on the electronic display at various times, as well as for storing applications and application data, such as configuration data, to be used by applications for performing various display tasks at different times. The electronic module may also include a battery for powering the electronic display, the processor, the display driver, and other electronic elements, a battery charging device for charging the battery either in a wireless or a wired manner, and a communications module that enables other computer devices to communicate with the processor, the display driver and the memory to provide new or different images or messages to be displayed on the electronic display, to configure the operation of the electronic display of the attachable electronic device, etc.

The flexible electronic display may be fabricated using any desired flexible electronic display material, such as any of various suitable plastics. If desired, the flexible electronic display may be manufactured as a display having pixel elements disposed on separate frontplane and backplane substrates formed of the same or different flexible material. In some cases, such as in the case in which e-paper is used as a flexible display, a frontplane component may be laminated onto a backplane component, where the backplane layer includes the backplane substrate, and the frontplane component includes an adhesion layer, optoelectronic material (which may be dissolved in a fluid that is contained in microcapsules or microcups, for example), and a top or frontplane substrate. Additional protection layers, a touch screen, and/or a frontlight may be laminated in a layer on top of the frontplane component, if desired. In any case, such layers of substrates and other components may be placed together to form the flexible electronic display, which may then be disposed on or proximate to a support, such as a leather support, a bendable metal support, etc., the combination of which can be flexed or curved in various manners to conform to the shape of a portion of a wearer's body, such as a wrist, a foot, etc. or to conform to the shape of other items to which the attachable article may be attached. In another case, the attachable electronic device may include a flexible, for example, transparent, touch screen interface disposed over or on top of the flexible electronic display to enable a user to input data or take input actions with respect to the flexible electronic display. In some cases, the inputs may be in the form of gestures or other inputs that are detected by other sensors included in the dynamically flexible, attachable device, and the gestures detected by the sensors may cause the electronic device to operate in a predetermined manner, such as to change modes of operation, etc.

The electronic display device so formed may, for example, enable a user to have a single type or multiple different types of digital media depicted or displayed on the display at the same time, including, for example, photographs, digital artwork created by the user or others, messages sent to or created by the user, reminders, notes that provide instructive, educational or inspirational messages, e-cards, advertisements, personalized agendas, calendars, such as a personalized Outlook® calendar, etc.

More particularly, the display driver may be configurable to drive the electronic display by displaying thereon one or more images, messages, digital artwork, videos, etc., stored in the memory. In some cases, the display driver is connected to a set of electrodes or connectors that, in turn, are connected to the pixel elements of the flexible display, and the display driver provides respective content to each electrode or connector to produce the image displayed on the flexible display. The display driver may display a fixed image via the flexible electronic display, may change the image being displayed on the flexible electronic display from time to time, such as by accessing the memory and providing a new image to the display, may display videos, such as real time videos, and/or may display other types of digital media. Likewise, the display driver may cause various interfaces associated with many different applications at different times or in different modes of the attachable electronic device to be presented on the flexible display. For example, the display driver may be driven by various different applications executed in the processor to display a calendar interface, an e-mail in-box interface, an alarm clock interface, a keyboard interface, a step-counter interface, etc. These interfaces may be located on the same place on the flexible display and displayed at different times and may be located at different places on the flexible display and displayed at the same or at different times.

Still further, a battery charger unit may be connected to the battery and may operate to charge the battery using, for example, an inductively coupled charging technique. The battery charger unit may be a part of an inductively coupled charging system and may respond to electromagnetic waves produced by an exterior charging unit to charge the battery when the attachable article is disposed near the external charging unit. In another case, the battery charger may be a kinetic energy charger unit that converts motion of the device (such as that associated with movement of an arm when the attachable electronic device is in the form of a wristband) into electrical energy which is then used to charge the battery.

Still further, a communications module may enable the processor, the driver, the memory and/or the flexible electronic display to communicate with external sources or devices, such as a computer, a mobile phone, a tablet device, a remote control unit, etc., using, for example, wireless communications produced using a Wi-Fi network, a cellular network, a Bluetooth connection, a near-field communications (NFC) connection, an infrared communication technique, a radio frequency identification (RFID) device or tag, etc. The communications module may operate to enable the driver to receive new images or other digital media for storage in the memory and ultimate display on the flexible electronic display, new applications for execution by the driver to perform control of the electronic display in various manners and new configuration information for configuring the manner in which the display driver controls the flexible electronic display to operate to display images and other information. In this manner, a user may reprogram the attachable article via, for example, a wireless communication network to display different pictures, images, messages, etc., at different times, to execute different applications at different times or in different locations. The communications module operates to eliminate the need for the attachable device to be plugged into a computer, or otherwise to have wires connected thereto for writing information to the memory of the device.

Still further, the memory may store, and the processor may execute, one or more applications provided or downloaded to the attachable electronic device by the user. These applications may enable the user to direct or program the operational features of the attachable device with the flexible electronic display, such as the particular digital media or images to display at any given time, the order in which images are to be displayed, the speed at which images will change, display features, such as background colors, borders, visual effects, etc. Moreover, the applications may enable or perform communications via the communications module to obtain information that may be displayed on the flexible electronic display, such as e-cards, advertising or promotional information, etc. provided via, for example, a Wi-Fi connection, a cellular connection, a Bluetooth or NFC connection, or any other wireless communications network or connection.

In one case, the processor, which may be a generally purpose micro-processor type of controller or a special purpose controller, the battery, the battery charger unit, the computer readable memory and the communications module may be integrated within, for example, an endpiece or a side wall of the attachable article and these components may be sealed or otherwise protected from water, air, dirt, etc. to which the exterior of the device is exposed. Any or all of these electronic components may be encapsulated in a hermetically sealed manner to prevent any direct exposure of these components to exterior forces and environmental hazards.

Further yet, the flexible support can include or incorporate various types of structure to protect the flexible electronic component. These types of structures can include side or edge protection structures that prevent or limit damage to the flexible electronic component caused by impacts at the edge or side of the flexible electronic component. Alternatively or additionally, these types of structures can, for example, include bending limiting structure elements that operate together to limit the possible types of motion that the flexible electronic component can undergo (e.g., limit the bending radius of the flexible support to a range within a bending tolerance of the flexible electronic component). In some cases, the flexible electronic component can have a minimum critical bending radius at which the flexible electronic component can bend without impairing the flexible electronic component (e.g., cracking, breaking, or otherwise impairing one or more layers, cracking the environment or humidity barrier, impairing the electronic functionality of the component). Such a minimum critical bending radius may be the bending radius past which the flexible component becomes impaired upon a single or a low number of bendings (e.g., bending the flexible component past the minimum critical bending radius the first, second, third, etc. time results in impaired functionality), or may be the bending radius past which the flexible component (e.g., the functionality of the flexible component) is not reliable or may become impaired upon a significant number of bending motions (e.g., the minimum critical bending radius may be the minimum radius at which the electronic component may be reliably bent a significant number of times without becoming impaired).

The bending limiting structure elements can, for example, include a set of transverse bars, stays or spacers disposed in or on the flexible support to limit the torsional motion of the flexible support to thereby prevent damage to the flexible electronic component due to torsional bending of the flexible electronic component. In a similar manner one or more longitudinal members may be configured within the flexible support to limit the bending motion of the flexible support around either a longitudinal axis of the device or about a transverse axis of the device. This structure thus prevents flexing of the flexible electronic component in one or more directions so as to prevent damage to the flexible electronic component from bending motions that might delaminate the various layers of the flexible electronic component. In another case, the flexible support can have a multiplicity of interconnected pieces that each extend between first and second sides of the band and that operate together to limit the bending motion of the flexible support to a particular minimum bending radius.

In a still further embodiment, the flexible electronic component can have first and second opposing surfaces. Here, the flexible electronic component is configured to display information via the first opposing surface, wherein the flexible electronic component is disposed on the flexible support so that the first opposing surface faces away from the flexible support, and wherein the flexible electronic component includes a minimum critical bending radius when bent in a direction that that causes the first opposing surface to be convex and the second opposing surface to be concave, without impairing the flexible electronic component (e.g., impairing the functionality of the flexible electronic component). In one case, the flexible support can be bendable to allow bending that causes the first opposing surface to be convex and the second opposing surface to be concave, but that limits bending in the direction that causes the first opposing surface to be convex and the second opposing surface to be concave to a particular bending radius that is greater than or equal to the minimal critical bending radius of the flexible electronic component.

If desired, the flexible support may include a series of rigid pieces of material interconnected with hinges, wherein the hinges limit bending of the flexible electronic component when disposed on the flexible support within the bending tolerance of the flexible electronic component. The rigid pieces of material may be disposed laterally along the band and the hinges may include protrusions that interact to limit the range of bending motion of the hinge. Likewise, the flexible support may include a flexible material with rigid elements spaced laterally apart along the flexible material and the rigid elements may operate to limit bending of the flexible support in the transverse direction of the band more than in the lateral direction of the band. In a still further embodiment, the flexible support may include a pliable material having a first uninterrupted section disposed closest to the flexible electronic component and having a second section disposed adjacent the first section and having grooves disposed therein, wherein the grooves extend from one side of the flexible support to the other side of the flexible support. If desired, the second section may further include one or more lateral grooves disposed therein, wherein the lateral grooves extend at least partially from one lateral end of the flexible support to the other lateral end of the flexible support. Additionally, the flexible support may have two portions disposed laterally adjacent to one another, wherein the first portion can be bent to a minimum radius of curvature that is different than the minimum radius of curvature to which the second portion can be bent. Also, the flexible support may have a plurality of sections disposed laterally with respect to one another along the band, wherein each section can be bent to one of a multiplicity of minimum radii of curvature, and wherein at least two of the sections can be bent to a minimum radius of curvature that is less the minimum radius of curvature of one of the other sections.

The side or edge protection structures can, for example, include one or more edge pieces that extend outward of and/or at least as high as the flexible electronic component. In one case, the one or more edge pieces can extend above the flexible electronic component. The one or more edge pieces can include a first bendable piece of material disposed inside of a soft pliable material. In this case, the first bendable piece of material may be harder than the soft pliable material. Moreover, the flexible support may include an edge or ridge formed of, for example, a metal wire or other material that is disposed along the edges of the flexible component to prevent or limit damage to the flexible component by impacts at the edge or side of the flexible component. Further yet, the side or edge protection structures can, for example, include protective elements disposed on portions (e.g., edges) of the band. The protective elements can extend above the flexible electronic component to protect the flexible electronic component. In one case, the protective elements can be disposed on portions of both sides of the band that are disposed adjacent a bottom of a user's wrist.

In a further embodiment, the connection mechanism can connect the two ends of the support together in a manner that maximizes the amount of continuous display surface viewable to the user when the band is disposed on the user's wrist or arm. In particular, the connection mechanism can be located at the position of the band that lies or falls on the outside of the user's wrist or arm when the band is properly attached to the wrist or arm. In this case, the discontinuity in the display surface falls at a point next to or adjacent to the outside wrist of the wearer, which is the hardest point of the display for the user to view in a natural manner, and which thus minimizes the likelihood that the user will ever need to view a portion of the display at which the discontinuity falls. Moreover, this feature enables the user to view a continuous display along the band as the user, looking at the top of the band, turns his or her palm from a face down to a face up position, thus enabling a user to view a long continuous display screen or to view multiple different display screens without observing the portion of the display at which the discontinuity caused by the connection mechanism occurs. This feature provides for a more usable and ergonomic band, as this feature provides the maximal amount of continuous viewable display surface to the user when wearing the band.

BRIEF DESCRIPTION OF THE DRAWINGS

FIGS. 17-20 illustrate an example attachable article in the form of a wristband having a flexible electronic display and yet another connection structure that includes magnets and a buckle clasp.

FIG. 24A illustrates a plurality of extenders that can be removably coupled to an attachable article to adjust a length of the attachable article.

FIGS. 39-45 illustrate views of various bending limiting members that limit the flexing motion of a flexible support in at least one direction while allowing particular flexing motion in another or opposite direction.

FIGS. 62A-62E illustrate various example display images that can be provided on a wristband device in different operational modes of the wristband device.

FIGS. 63A and 63B illustrate the wristband device of FIG. 1 or 3 disposed adjacent to one or more location detection strips in a straight configuration and a curved configuration, respectively, to form a wristband detection system.

DETAILED DESCRIPTION

Figure 1:
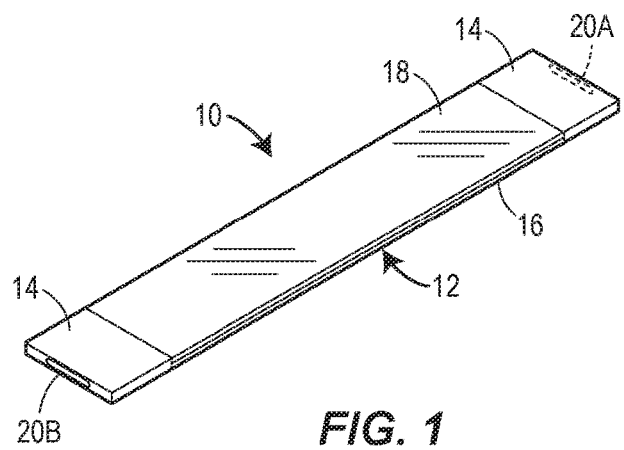
FIG. 1 is a perspective view of an example dynamically flexible, attachable article in the form of a wristband having a flexible display disposed thereon and a first type of magnetic connection mechanism.

Referring now to FIG. 1, a dynamically flexible, attachable article 10, which may be in the form of a wristband, includes a flexible band portion 12, which is generally rectangular in shape and configuration, disposed between two ends, end pieces, or fasteners 14. The band portion 12 can be configured to be stiff enough such that the band 12 can retain its shape when bent (i.e., the band 12 is not floppy). The band portion 12 includes a flexible support 16 and a flexible electronic display 18 disposed on the support 16 to be viewable from the top of the band 12, as illustrated in FIG. 1. One or more of the fasteners, end pieces, ends, or clasps 14, each of which may be made of hard plastic or other rigid material, but could instead be made of a pliable material, may include various electronic components therein for driving the flexible electronic display 18 and for providing other electronic functionality for the article 10. Additionally or alternatively, one or more various electronic components may be disposed in modules that are attached to the band 12 at locations other than with the fasteners 14.

Figure 2:
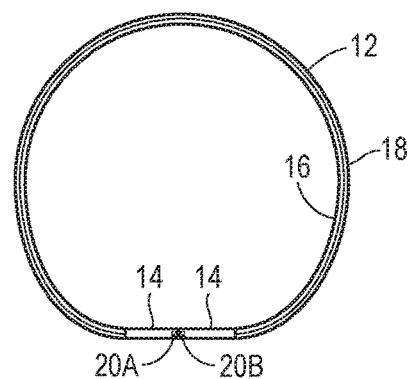
FIG. 2 is a side view of the wristband of FIG. 1 bent to form a fixed length wristband.

As illustrated in FIG. 1, one or both of the end pieces or clasps 14 may include a connection structure therein that functions to connect the end pieces 14 together when the band portion 12 is bent, as illustrated in FIG. 2, to form a circular or oval band. In one case, the connection structure may be in the form of magnetic materials 20A and 20B disposed in or on each of the clasps 14, wherein the materials 20A and 20B operate, when in close proximity to one another, to hold the end pieces or clasps 14 together. The magnetic materials 20A and 20B can each be a permanent magnet, or one of the materials 20A or 20B can be a permanent magnet while the other material 20A or 20B can be a magnetically permeable material, such as many kinds of metal. The magnetic materials 20A and 20B can be disposed at the longitudinal ends of the clasps 14 so that the clasps 14 connect end-to-end when the band 12 is bent to allow the clasps 14 to meet up with each other end-to-end, as illustrated in FIG. 2. In the case in which the materials 20A and 20B are both permanent magnets, the materials 20A and 20B may be disposed in ends of the clasps 14 so that opposite poles of the permanent magnets are facing outwardly from the clasps 14 or so that the magnets have their respective north poles facing in opposite directions when the band portion 12 is bent in the manner shown in FIG. 2 (e.g., so that a south pole of one of the magnets 20A and 20B meets or mates with a north pole of the other one of the magnets 20A and 20B). As will be understood, the configuration and placement of the materials 20A and 20B in the clasps 14 in the manner illustrated in FIG. 1 enables the device 10 to be clasped in a continuous circle with a fixed or predetermined length so that the clasps 14 meet end-to-end.

Figure 3:
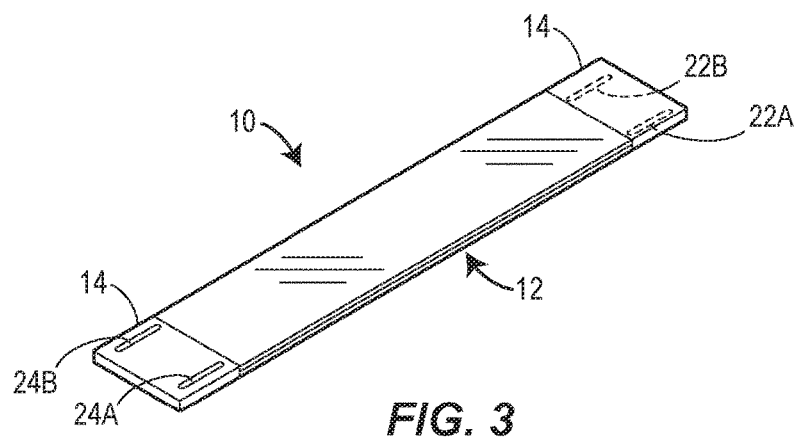
FIG. 3 is a perspective view of an example attachable article in the form of a wristband having a flexible display disposed thereon with a second type of magnetic connection mechanism.
Figure 4:
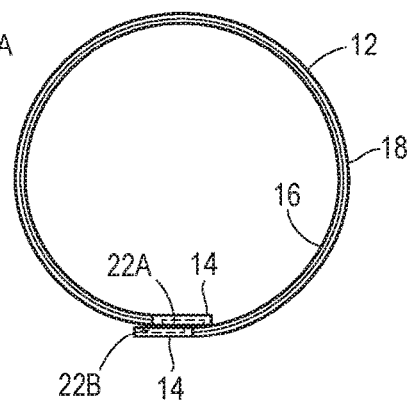
FIG. 4 is a side view of the example attachable article of FIG. 3 bent to form an adjustable length wristband.

In another embodiment illustrated in FIG. 3, the flexible attachable article 10, again illustrated in the form of a wristband, includes a similar band portion 12 and end pieces or clasps 14. However, in this case, the clasps 14 have a connection structure in the form of magnets disposed on the top or bottom sides of the clasps 14 (and possibly even a portion of the band 12) to enable the device 10 to be folded around on itself in an adjustable manner as illustrated in FIG. 4 so as to create a wristband of variable length when disposed around or connected around a wrist or other object. As illustrated in FIGS. 3 and 4, magnets or magnetic members 22A and 22B are disposed on or near a lower side of one the clasps 14, and come into contact or react with magnets or magnetic members 24A and 24B disposed on or near an upper side of the other one of the clasps 14. In some cases, the magnets or magnetically permeable elements or members 24A and 24B may be disposed within the support 16, such as in the center of the support 16, instead of on or near an upper or lower surface of the support 16. In these configurations, the clasps 14 may be disposed near or on top of one another during use and are thus connectable in various different positions with respect to one another, such as that illustrated in FIG. 4, when the flexible band 12 is bent to form a circular member to be placed around a wrist, a leg, a bicycle handle bar, etc., for example. In this manner, the dynamically flexible, attachable device 10 may be easily adjustable in size to fit various different sized mounting members. As illustrated in FIG. 4, the support or flexible material 16 of the band portion 12 is illustrated as being flexed in a manner that causes the flexible display 18 to be disposed on the exterior or outside of the band portion 12. Of course, in the configuration illustrated in FIG. 4, the magnets or metallic members 22A and 22B on the one side, and the magnets or the metallic members 24A and 24B on the other side of the band portion 12 may slide with respect to one another in the longitudinal direction of the device 10 so as to make the device 10 variable in size or circular shape to fit around different sized wrists or other mounting members. Of course, if desired, portions of the members 22A, 22B and/or 24A, 24B could be disposed in the band portion 12 in addition to or instead of in the clasps 14 and, if so disposed, would still be considered as being disposed in the end portions of the band 12. Still further, any or all of the magnetic members 22A, 22b, 24A, 24B could be a single, long piece of material, as illustrated in FIGS. 3 and 4, or could be a series of magnetic members disposed near but not contacting each other, to enable better registration of the north and south poles of the respective magnetic members in various different longitudinal locations of the band 12. This second configuration may provide for better adjustability of the length of the band 12 when both magnetic members 22 and 24 are permanent magnets.

Figure 5A:
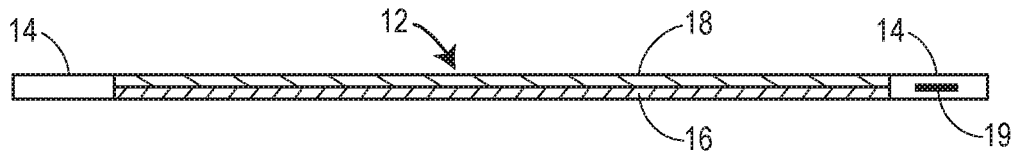
FIG. 5A is a side view of an example attachable article of FIG. 1 having a flexible display disposed on a flexible support between two clasps.

Of course, the dynamically flexible, attachable device 10 could take on many different configurations besides those illustrated in FIGS. 1-4. For example, as a reference, FIG. 5A illustrates a side view of the device 10 of FIGS. 1-4 in more detail. In this case, the band portion 12 is illustrated as including a flexible base or a support portion 16 that may be made of any suitable flexible material such as, for example, cloth, leather, plastic or other material, while the flexible display 18 is disposed on the support 16. In other cases, the support portion 16 can be made of a rigid or semi-rigid material (e.g., hard plastic) and/or can be coupled to the flexible display 18 in a different manner. For example, the support portion 16 and the flexible display 18 can be movably (e.g., slidably) coupled to one another, such that the support 16 and the flexible display 18 can move relative to one another when the device 10 is bent. In another example, the support portion 16 can be integrally formed with the display 18.

The clasps 14 may be the same size as each other and may be the same height as the flexible display 18 and the support 16 together. In another case, the clasps 14 may be larger in height than the flexible display 18 and the support 16 and, in this case, may stick out above surface of the flexible display 18 and/or below the bottom surface of the support 16. As noted above, one or both of the clasps 14 may be or include an electronics module 19 that holds electronics, such as processors, memories, sensors, batteries, etc. that are used to power and drive the flexible display 18 and to provide other communication functionality for the device 10. In some embodiments, the electronics module 19 is not included in the clasps or fasteners 14, but is attached to the band 12 in a location separate from the fasteners 14. If desired, the components of the electronics module 19 may be sealed or otherwise protected from water, air, dirt, etc. to which the exterior of the device 10 is exposed. For example, any or all of these electronic components may be encapsulated in a hermetically sealed manner to prevent any direct exposure of these components to exterior forces and environmental hazards.

Figure 5B:
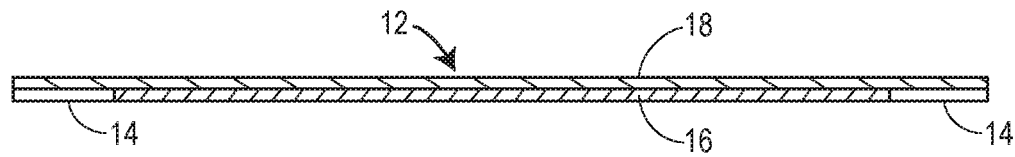
FIG. 5B is a side view of an example attachable article in the form of a wristband having a flexible display disposed over an entire length of a support.

In another embodiment, as illustrated in FIG. 5B, a dynamically flexible, attachable article in the form of a device 10 has the flexible display 18 disposed over the entire length of the support 16 and end portions 14, which may be part of the support 16. In this case, the flexible display 18 spans the entire length of the band portion 12 and of the device 10 and thus extends from end to end of the device 10. The connection structure, in the form of, for example, magnets (not shown in FIG. 5B) may be disposed in the end pieces 14 and/or, if desired, in portions of the flexible support 16.

Figure 5C:
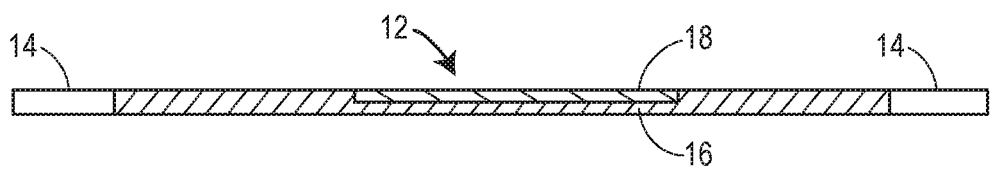
FIG. 5C is a side view of an example attachable article in the form of a wristband having a flexible display disposed on a center portion of a flexible support.

In yet another configuration, as illustrated in FIG. 5C, a dynamically, flexible attachable article 10 has a flexible display 18 disposed on a limited portion of the flexible support 16 so that the flexible display 18 is only disposed, in this case, in the center portion of the band 12. Of course, while not shown, the flexible display 18 could be disposed on any other portion of the band 12, including in portions offset from the center of the band 12 and the flexible display 18 could cover any desired amount or portion of uppers surface of the band 12. Here again, any desired connection structure could be provided in the ends of the support 16, including in the clasps 14, to connect the two ends of the band 12 together.

Figure 5D:
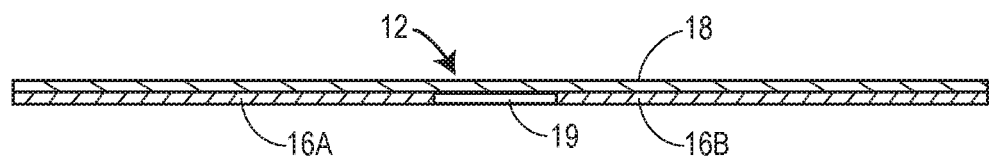
FIG. 5D is a side view of an example attachable article in the form of a wristband having a flexible display disposed over a support having two flexible end pieces connected by an electronics module.

In a still further case, as illustrated in FIG. 5D, a dynamically flexible, attachable article 10 has a flexible display 18 disposed over a support 16 having two flexible end pieces 16A and 16B connected by an electronics module 19 which, in this case, is illustrated is being disposed in the center of the flexible support 16. The electronics module 19 may or may not be made of a flexible material and in either case is still part of the flexible support 16. Moreover, while being illustrated in the center of the support 16, the electronics module 19 could be disposed at any other location along the support 16 including at any position offset from the center of the support 16. Again, any desired connection structure could be attached to or disposed in or on the end portions of the device 10, including the ends of the support 16.

Figure 5E:
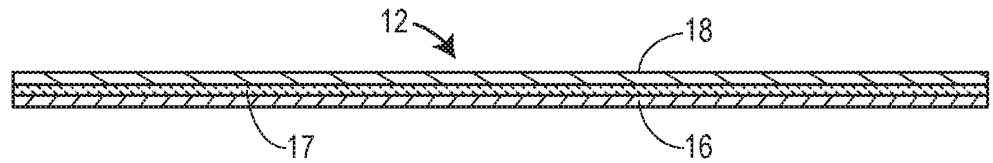
FIG. 5E is a side view of an example attachable article in the form of a wristband having a flexible display coupled to a flexible support via an interlayer disposed therebetween.

In a still further case, as illustrated in FIG. 5E, a dynamically flexible, attachable article 10 has a flexible display 18 disposed over a support 16 and coupled to the support 16 via an interlayer 17 disposed therebetween. In some cases, the interlayer 17 only serves to couple portions or segments of the display 18 to corresponding portions or segments of the flexible support 16. The interlayer 17 can be or include one or more un-patterned and/or patterned layers, such as, for example, one or more layers of foam, rubber, visco-elastic, adhesive, co-elastic material, stretchable material, other suitable material(s), or combinations thereof.

It will be appreciated from FIGS. 1-5 that the flexible display 18 can continuously span (i.e., extend) the entire length of the band 12 or can instead continuously span only a portion of the length of the band 12. In instances in which the flexible display 18 only spans a portion of the band 12, the flexible display 18 may, for example, continuously span only ¼, ⅓, ½, ⅔, ¾, more than ¼ but less than ⅓ or ½, more than ⅓ but less than ½, more than ½ but less than ⅔ or ¾, more than ⅔ but less than ¾, more than ¾ but less than the entirety, or some other portion or fraction, of the length of the band portion 12. Other ranges are of course possible as well.

Figure 6:
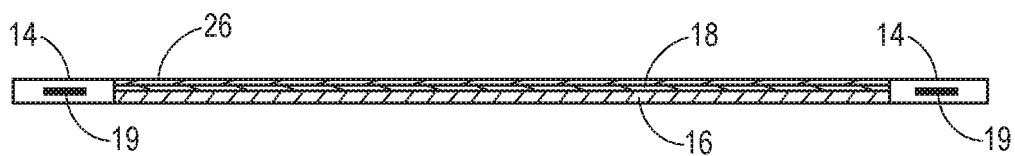
FIG. 6 is a side view of an example attachable article in the form of a wristband having a flexible touch screen disposed on a flexible display and a flexible support which are disposed between two clasps.

In another embodiment, as illustrated in FIG. 6, the dynamically flexible, attachable article 10 may be configured similarly to that of FIGS. 1-5D, but may also include a touch screen interface 26 disposed over the flexible display 18. In particular, in this case, the touch screen interface 26 can be a capacitive touch screen or any other type of touch screen interface that is transparent in nature, and thus can be laid over top of the flexible display 18 to allow the flexible display 18 to be viewable there-through. In other cases, the touch screen 26 can be disposed else (e.g., under the display 18) or can be integrated with the flexible display 18. Further yet, the touch screen interface 26 can take the form of any other suitable touch screen terminology. As will be understood, the touch screen interface 26 of FIG. 6 is powered by and controlled by the electronics disposed within one or more electronics modules 19 illustrated as being disposed, in this case, in both of the clasps 14 to perform various different types of touch detection functionality associated with a typical touch screen display. Of course, the touch screen interface 26 could be added to any of the configurations of FIGS. 5A-5D or to any of the other attachable article embodiments described herein.

Figure 7A:
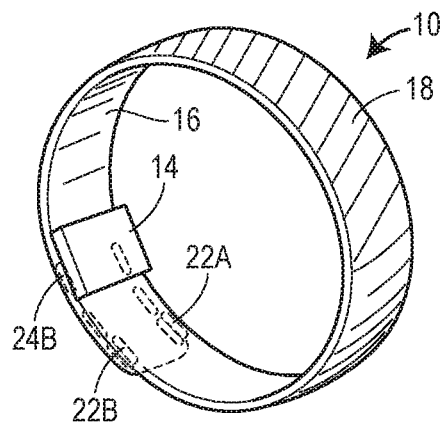
FIGS. 7A and 7B illustrate perspective and top views, respectively, of an example attachable article in the form of a wristband having magnetic members disposed on one or both ends or sides of the wristband to form an adjustable connection or clasping structure.
Figure 7B:
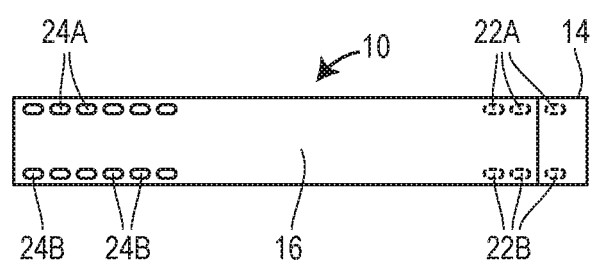

While the device 10 of FIGS. 1-6 is generally illustrated as having a flexible display and a flexible support disposed between or including two magnetically coupled clasps 14, with at least one of the clasps 14 containing or operating as an electronics module 19, other manners of disposing connection structure on the device 10 and of locating the electronics module 19 could be used instead. For example, FIGS. 7A and 7B illustrate an example dynamically, flexible attachable article 10 in the form of a wristband having a single clasp member 14, such as one of clasps members 14 of FIGS. 1-6, disposed at one end of the flexible display 18 and a set of magnets 22 and 24 or other magnetically permeable material disposed on or in an end piece or end portion attached to or formed as part of the other end of the flexible support 16. In this case, individual magnets 22A and 22B are disposed in a spaced apart manner within the end piece 14 or are disposed in the flexible support 16 next to the end piece 14 and operate in conjunction with the individual magnetic materials 24 which are spaced apart and disposed on the other end piece of the band 12 to form a secure magnetic connection when the band portion 12 is wrapped around a user's wrist, for example. The spaced apart nature of the individual magnetic members 22 and 24 enable the band to be adjustable in length so that a pair of magnetic members 22A and 22B (on opposite sides of one end of the band 12 or support 16) may meet up with any of a number of different pairs of magnets 24A and 24B (on opposite sides of the other end of the band 12 or support 16) to enable the length of the band, when connected, to be adjustable. Of course, the magnetic members 22 and 24 may each be permanent magnets, or one may be made of permanent magnets while the other is formed of magnetically permeable material. Of course, the spaced apart magnetic material configuration of FIGS. 7A and 7B may be used in any of the embodiments illustrated in FIGS. 1-6.

Figure 7C:
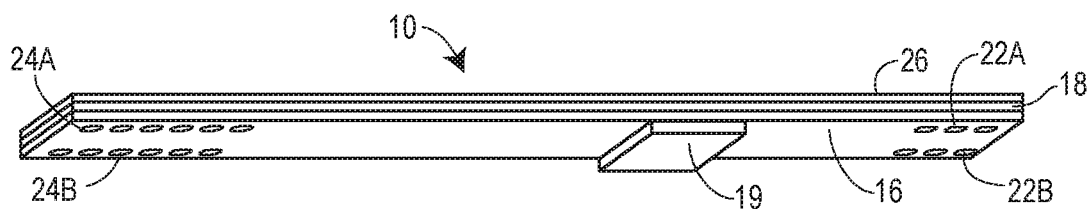
FIGS. 7C-7E illustrate various sensors disposed on a wristband device similar to that of FIGS. 7A and 7B.
Figure 7D:
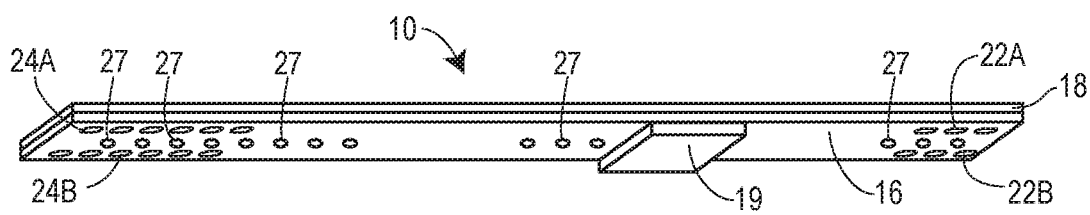
Figure 7E:
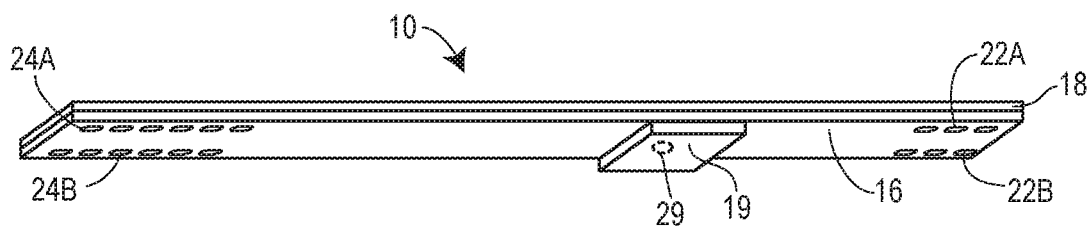

FIGS. 7C-7E illustrate attachable articles similar to that of FIGS. 7A and 7B but including various different types of sensors that may be used for various purposes, including in detecting the orientation of the band, such as whether the band is wrapped around a user's wrist or other element. In particular, FIGS. 7C-7E illustrate various examples of an attachable article in the form of a wristband device 10 that includes an adjustable clamp or connection mechanism for enabling the ends of the band of the device 10 to overlap one another by different distances when worn so as to enable the wristband device 10 to be used on wrists of different sizes. In addition, however, each of the various devices in FIGS. 7C-7E include mechanisms for determining or enabling the electronics module 19 of the device 10 to determine the orientation of the band with respect to the user's wrist when being worn to enable better operation of the display features of the device 10. While a magnetic connection or clamping structure is illustrated in each of the devices 10 in FIGS. 7C-7E, other types of adjustable clamping or connection structure could be used instead and allow the electronics module 19 to be able to determine the orientation or positioning of the band or the display 18 when on the arm or wrist of a user.

More particularly, FIG. 7C illustrates an example attachable article in the form of a wristband device 10 having an adjustable clasping mechanism in the form of one or more magnets 22A, 22B, 24A, 24B such as that illustrated with respect to FIGS. 7A and 7B and an electronics module 19 disposed or centered on the flexible substrate or band support 16 at approximately one third of the length of the band 16 from one end of the band 16 and two-thirds of the length of the band 16 from the other end of the band 16. In addition, the device 10 of FIG. 7C includes a flexible touchscreen interface 26 disposed over the flexible electronic display 18.

FIG. 7D illustrates another example attachable article in the form of a wristband device 10 having an adjustable clasping mechanism in the form of one or more magnets 22A, 22B, 24A, 24B such as that illustrated with respect to FIGS. 7A and 7B and an electronics module 19 disposed or centered on the flexible band support 16 at approximately one third of the length of the band support 16 from one end of the band 16 and two-thirds of the length of the band 16 from the other end of the band support 16. However, in this case, one or more pressure sensors 27 are disposed in or on the band support 16 and are electronically connected to the electronics module 19 to provide signals to the module 19 indicative of pressure, strain, or force applied to those locations of the band 16. While the pressure sensors 27 are indicated to be disposed at various points along the length on the band support 16 on both sides of the band support 16 near the ends of the support 16, these sensors may be disposed along the entire band support 16, only on one side of the support 16, or on any suitable portion of the support 16 for the purpose of detecting pressure or force applied to the band support 16 or display screen 18. Still further, the pressure sensors 27 may be any desired or suitable pressure sensors including piezoelectric sensors, strain gauges, etc. Additionally, any desired number of sensors 27 may be used and these sensors 27 may be spaced apart from one another any suitable distance along the length of the band support 16. Likewise, the sensors 27 may be disposed in the center of the band support 16 (from side to side) or offset from the center. Also, more than one sensor 27 may be located at any longitudinal location along the band support 16. Alternatively, the sensors 27 of FIG. 7D could be magnetic sensors which sense magnetic field strength, for example. In this case, the magnetic sensors 27 may detect whether one or more magnets on one end of the band (used a part of the coupling mechanism) are near to or are interacting with magnets or magnetic material on the other end of the band. Here, the magnetic sensors 27 may be used to detect the amount of overlap of the ends of the band.

FIG. 7E illustrates another example attachable article in the form of a wristband device 10 having an adjustable clasping mechanism in the form of one or more magnets 22A, 22B, 24A, 24B such as that illustrated with respect to FIGS. 7A and 7B and an electronics module 19 disposed or centered on the flexible band support 16 at approximately one third of the length of the band support 16 from one end of the band 16 and two-thirds of the length of the band 16 from the other end of the band support 16. However, in this case, a gyroscopic detection element 29 is dispose in the electronic module 19 and operates to detect the orientation of the band (or at least the electronics module 19 or other location at which the gyroscopic element 29 is disposed). The gyroscopic element 29 operates to detect the orientation of the band with respect to gravity or other acceleration force to which the element 29 is subjected. While a single gyroscopic element 29 is illustrated as being disposed in the electronics module 19 of FIG. 7E, this or similar elements could be disposed at other locations along the band (e.g., within the support 16 of the band) and/or multiple gyroscopic elements 29 could be disposed at various locations along the support 16.

Generally speaking, the embodiments of FIGS. 7C-7E include structure or elements, such as a touchscreen interface 26, pressure or magnetic sensors 27 or gyroscopic elements 29 that can be used to assist the electronics module 19 in determining the orientation or positioning of the wristband support 16 or the display 18 with respect to one or more fixed locations on a user's wrist when the device 10 is wrapped around the user's wrist. This operation enables the module 19 to then calibrate the display 18 to place or center display information such as display screens at particular locations with respect to the user's wrist, such as being centered on the top of the wrist, on the bottom of the wrist, on the inner side of the wrist, on the outer side of the wrist, etc. Likewise, these elements or sensors may be used to detect user inputs and band orientation or location.

Moreover, while FIGS. 1-7 illustrate magnetic based connection structures, other connection structures, such as one or more mechanical connectors (e.g., buckles, snap components, etc.), any desired hook and loop connection material, like Velcro, or some other connection means, etc. could be used instead of or in addition to any of the above-described magnetically coupled connection structures. In the embodiments in which the article 10 includes a connection structure that utilizes one or more mechanical connectors in combination with one any of the above-described magnetically coupled connection structures, the connection structure can provide both a magnetic connection and a mechanical connection, and, thus, the connection structure provides a stronger and more durable connection between the ends 14 of the article 10 or between the various portions of the band or support 16. In these cases, the magnetic connectors can, but need not, be disposed near or proximate to the mechanical connectors.

Figure 8:
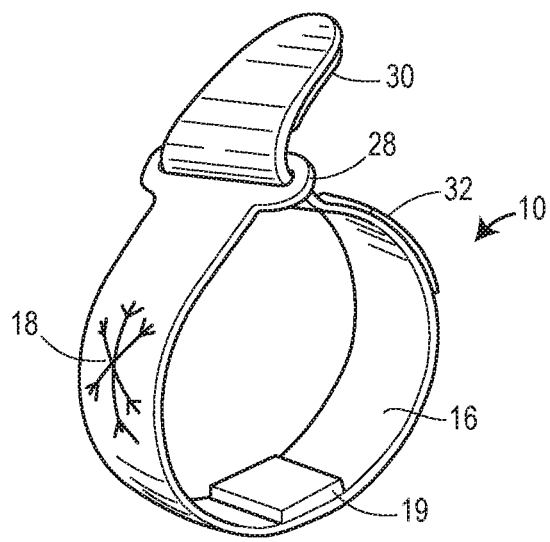
FIG. 8 illustrates an example attachable article in the form of a wristband having an electronics module disposed in the center of the article with a mechanical-based connection structure used at the ends of the flexible support to secure the article in a loop.

As an example, FIG. 8 illustrates an example dynamically flexible, attachable article 10 in the form of a wristband having an electronics module 19 disposed in the center of the band 12 with a mechanical-based connection arrangement (i.e., a non-magnetic clasp arrangement) used at the ends of the flexible support 16 to secure the article 10 to a wrist of a user or other mounting member, such as a bike handle. In this case, a loop or buckle member 30 is attached to one end of the flexible support 16 and hook and loop pads 30 and 32 (one being hook material and the other being loop material) are attached to the end portions of the band 12. Here, one end of the band portions 12 may be looped through the buckle 28 and bent back to enable the hook and loop material pads 30 and 32 to contact each other and thus secure the band 12 to a user's wrist or other structure. Of course, while the electronics module 19 is illustrated as being located in the center of the band portion 12, the module 26 could be located on one of the ends as well, such as near the buckle 28. Moreover, use of the buckle 28 in FIG. 8 is not necessary, and instead hook and loop pads may be placed at opposite ends of the band 12 to enable a connection between the two ends of the band 12.

Figure 9A:
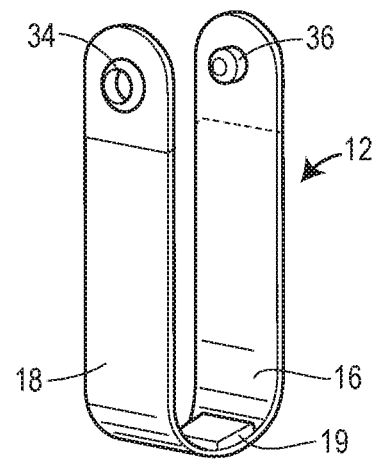
FIGS. 9A-9C illustrate an example attachable article in the form of a wristband having a flexible display and another type of mechanical-based connection structure in the form of a snap-on connector.
Figure 9B:
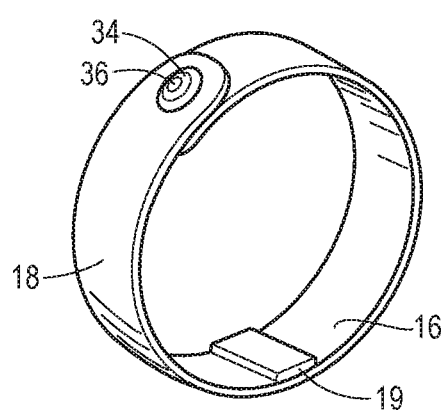
Figure 9C:
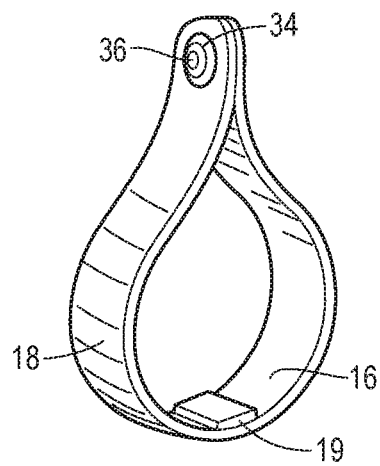

FIGS. 9A-9C illustrate a dynamically flexible, attachable article or device 10 having yet another type of mechanical connection structure in the form of a button based or snap-type connection structure. As illustrated in FIG. 9A, the device 10 includes a band 12 having a flexible display 18 disposed on a flexible support 16. In this case a hole member 34 forming one side of a snap-fit connector and a snap member 36 forming the other side of a snap fit connector are disposed on opposite ends of the band portion 12. The snap member 36 snaps or slides into the hole member 34, which may have flexible material such as rubber disposed around a center hole to better interact with the snap member 36 and retain the snap member 36 therein. As illustrated in FIGS. 9B and 9C, the band 12 may be bent to enable the snap member 36 to side into either side of the hole member 34 to thereby create a circular band as illustrated in FIG. 9B or a tear-drop shaped band as illustrated in FIG. 9C. In this case, the electronics module 19 that drives the display 18 could be located near one of the ends or in the center of the band portion 12 of FIGS. 9A-9C or at any other desired location on the band 12. As will be understood, the embodiments of FIGS. 7-9 are provided to illustrate that other connection structure, besides or in addition to a magnetic based connection structure, can be used on the ends of the band 12 to enable connection of the ends of the band 12 around a wrist or other mounting member, if so desired, as well as to illustrate that the electronics module 19 can be located in any desired position on the band 12. Of course, other connection structure could be used as well including, for example, a slide in snap-fit buckle.

Figure 10A:
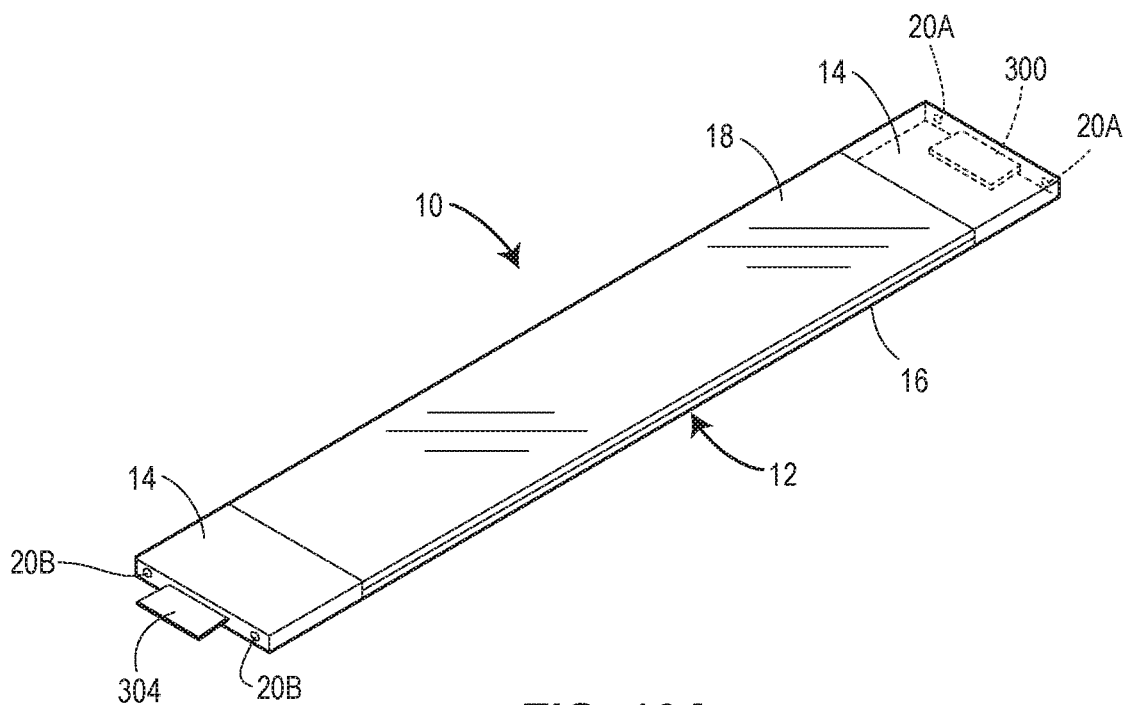
FIGS. 10A and 10B illustrate an example attachable article in the form of a wristband device having a flexible display and a connection structure that includes magnets and a tab and recess arrangement.
Figure 10B:
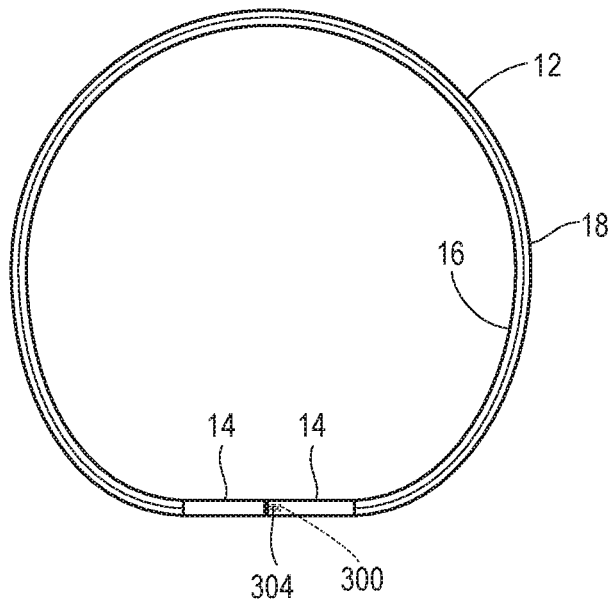

As another example, FIGS. 10A and 10B illustrate a set of magnetic connectors used in conjunction with a mechanical connector to effect a clasping structure in a fixed length band. In the embodiment illustrated in FIG. 10A, the flexible attachable article 10, again illustrated in the form of a wristband, includes a similar band portion 12 and end pieces or clasps 14. However, in this embodiment, the article 10 has a connection structure that not only includes magnets 20A, and 20B disposed at the lateral ends of the band portion 12, as described above in connection with FIGS. 1 and 2, but also includes mechanical connectors that can effectuate a mechanical connection between the end pieces or clasps 14, such that the clasps 14 can be mechanically and magnetically connected to one another when the device 10 is bent, as illustrated in FIG. 10B, to form a circular or oval band. In FIGS. 10A and 10B, the mechanical connectors take the form of a recess 300 that is formed or defined in the longitudinal or lateral end of one of the clasps 14 and a tab 304 that is formed or defined on, and extends laterally outward from, the longitudinal or lateral end of the other one of the clasps 14. The tab 304 can be disposed or inserted into the recess 300 to mechanically connect the longitudinal ends of the opposing clasps 14 to one another when the flexible band 12 is bent to be disposed around or on a wrist, an arm, etc., for example. At the same time, the magnets 20A and 20B, by virtue of being in proximity to one another as shown in FIG. 10B, create or provide a magnetic force that also serves to hold the clasps 14 together. In this manner, the connection structure described in connection with FIGS. 10A and 10B can provide a stronger, more durable connection when the clasps 14 are connected in an end-to-end arrangement so that the device 10 is clasped in a continuous circle or oval with a fixed or predetermined length.

In another embodiment illustrated in FIGS. 11-14, the flexible attachable article 10, which is again illustrated in the form of a wristband, includes a similar band portion 12 having a pair of ends 14, and an electronics module 19 disposed at or on one of the ends 14. In this embodiment, the article 10 also includes the magnets 22A, 22B, 24A, and 24B described above, but includes different mechanical connectors than the article 10 illustrated in connection with FIGS. 10A and 10B. In the band device of FIGS. 11-14, the mechanical connectors take the form of a plurality of grooves or notches 320 formed on the band 12 and a plurality of projections (also called grooves or notches) 324 formed on the module 19 which are configured to, mate with, engage and/or retain the corresponding grooves or notches 320 therein when one end of the band 12 is bent to overlap with the other end of the band.

Figure 12:
Figure 13:
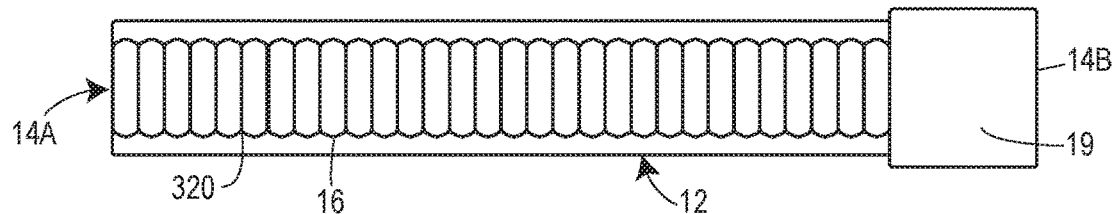
Figure 14:
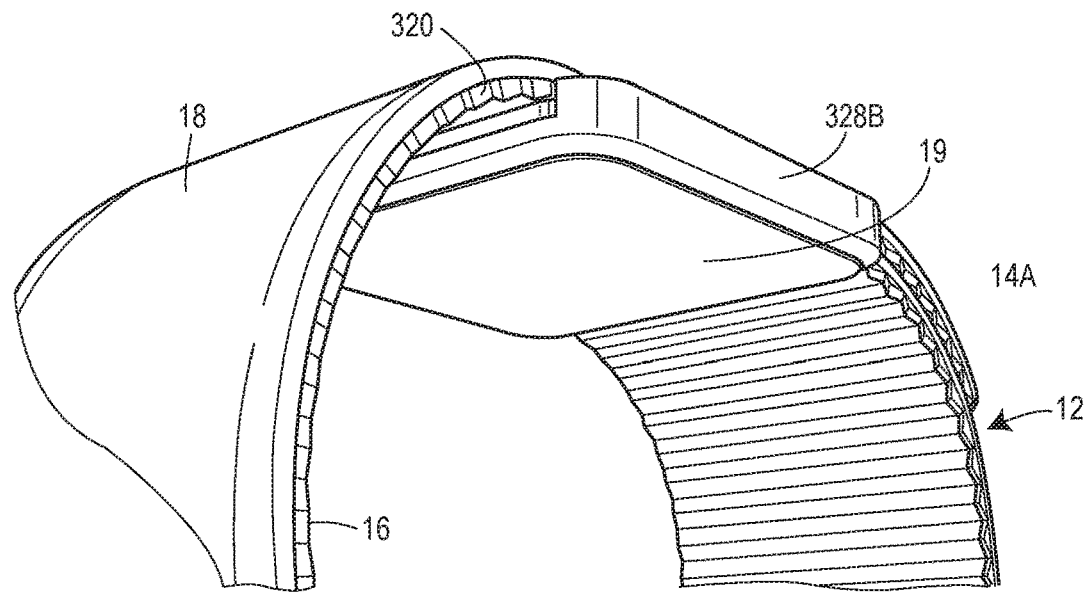

More particularly, as depicted in FIG. 12, which illustrates a side view of the flexible attachable article 10, and FIG. 13, which illustrates a bottom view of the article 10, the grooves 320 (or notches) may be formed in a side of a portion of the band 12 that extends below the flexible electronic display 18. The grooves or notches 320 illustrated herein may also be formed in the transverse edges of the bottom portion of the band 12 and may extend from one end of the band 12 to the other end of the band 12 or may extend along only a portion of the band 12 and need not extend from end to end. As illustrated in FIG. 13, there may be a gap or a space 333 between the outer or transverse edges of the grooves or notches 320 and the outer or transverse edges of the rest of the band 12 or the flexible electronic display 18. In other words, the outer edges of the grooves 320 may be positioned inwardly of the greatest transverse edges of the band 12 or the display 18. In other embodiments, this gap can be reduced or eliminated (i.e., the edges of the grooves 320 can be commensurate with the transverse edges of the band 12) or this gap can be increased. In further embodiments, the grooves 320 can extend outward of the transverse edges of the support 16, in which case the grooves 320 can engage and connect with a complementary structure disposed on an interior of the electronics module 19 or another portion of the band 12. In still a further embodiment, the grooves 320 can, alternatively or additionally, be formed in the bottom side of the band 12. As briefly noted above, in other embodiments, the grooves 320 can be formed in the bottom side along the entire length of the support 16 or along only a partial length of the support 16. For example, the grooves 320 may only be formed in the bottom side of the support 16 near or at the end portions of the band 12. As also illustrated in FIGS. 12-14, the grooves or notches 320 each have a generally triangular shape, but, in other examples, the grooves 320 can be differently shaped grooves or notches (e.g., they can be rectangular, semi-circular, etc.)

Figure 11:
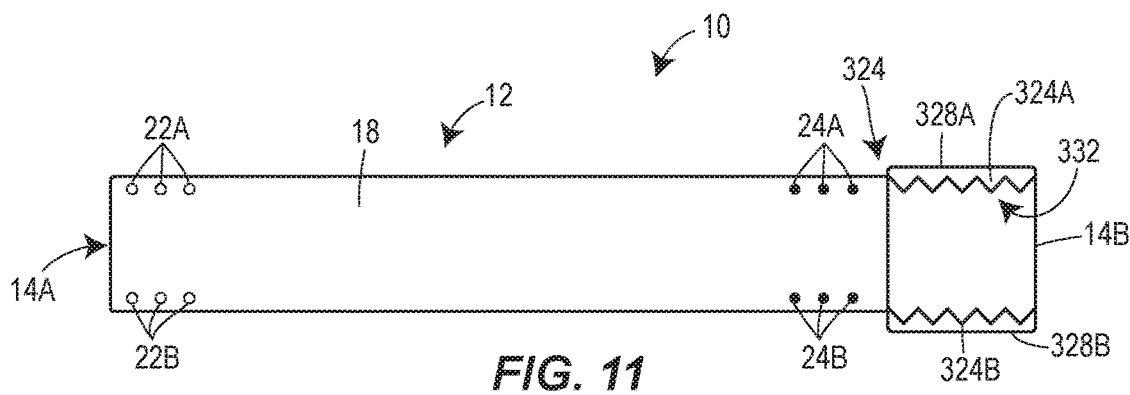
FIGS. 11-14 illustrate an example attachable article in the form of a wristband having a flexible display and a different connection structure that includes magnets and interlocking grooves.

As illustrated in FIGS. 11 and 12, the electronics module 19 may include first and second opposing sidewalls 328A and 328B that border and extend above (at least with reference to FIG. 9) the band portion 12. A first set of inwardly facing projections 324A is formed or defined by the first sidewall 328A, while a second set of inwardly facing projections 324B is formed or defined by the second sidewall 328B. As illustrated in FIG. 11, the projections 324A and the projections 324B are aligned with and extend inward toward one another. When, however, the gap 333 between the edges of the grooves 320 and the edges of the band 12 is decreased, the projections 324A and 324B can be modified so as not to extend quite as far inwardly. On the other hand, when the gap 333 is increased, the projections 324A and 324B can be modified so as to extend further inwardly. In any event, the projections 324A and 324B are configured to accept or mate with the grooves or notches 320 when one end of the band 12 is disposed so that the lower portion of the band 12 including the grooves 320 is disposed in the space between the projections 324A and 324B. As such, the projections 324A and 324 are spaced apart a distance that is the same as or slightly larger than the distance between corresponding grooves 320 on either side of the band 12. In some cases, the distance between the projections 324A and 324B may be slightly smaller than the distance between the corresponding groove 320 on either side of the band 12, in which case the material forming the grooves 320 may be flexible or compressible.

When the flexible band 12 is bent to be disposed on or around an object (e.g., a wrist, an arm, etc.), such that one of the ends 14 is disposed on or near an upper side of the other one of the ends 14, a portion of the device 10 (e.g., one of the ends 14) can be disposed or seated in a receiving area 332 (FIG. 11) defined by the bottom of the electronics module 19 at the other end 14, the receiving area 332 including the projections 324, and the sidewalls 328A and 328B. In this manner, as illustrated in FIG. 14, one or more of the grooves 320 will be disposed or seated in the receiving area 332 between one or more of the projections 324A and 324B, such that one or more of the projections 324A and 324B, which extend inwardly, engage and serve to mate with and retain respective ends of the grooves 320. As such, a mechanical connection may be formed between one or more of the grooves 320 and one or more respective projections 324A and 324B. At the same time, the magnets 22A, 22B, 24A, and 24B, if present, by virtue of being in proximity to one another, create or provide a magnetic force that also serves to help hold the ends 14 together. So configured, the end pieces 14 are mechanically and magnetically connectable in various different positions with respect to one another, such as that illustrated in FIG. 14, when the device 10 is bent or curved to be placed around a wrist, a leg, a bicycle handle bar, etc., for example. As a result, the attachable device 10 may be easily adjustable in size to fit various differently-sized mounting members or wrists while still providing for a strong connectivity between the ends 14 of the band 12. As one of ordinary skill in the art will appreciate, the grooves 320 disposed or seated in the receiving area 332 can be repositioned, relative to the projections 324A and 324B, to adjust the attachable device 10 to fit a differently sized mounting members (e.g., different sized wrists). It will be understood that, while the band construction and clasping concepts discussed with respect to FIGS. 1-14 are provided in the context of specific examples, any of these concepts or techniques can be applied to any of the other embodiments described herein in any combination.

Figure 15:
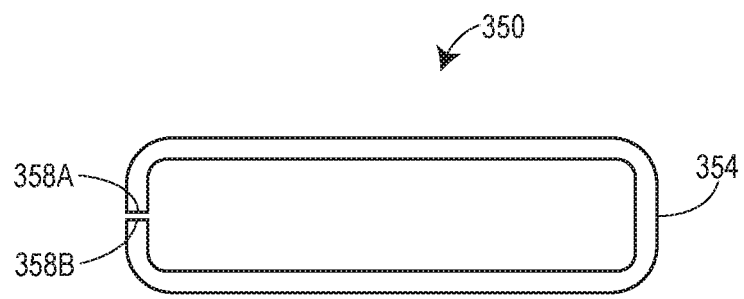
FIGS. 15 and 16 illustrate an example attachable article in the form of a wristband having a flexible display and another connection structure that includes magnets and a clasp loop.
Figure 16:
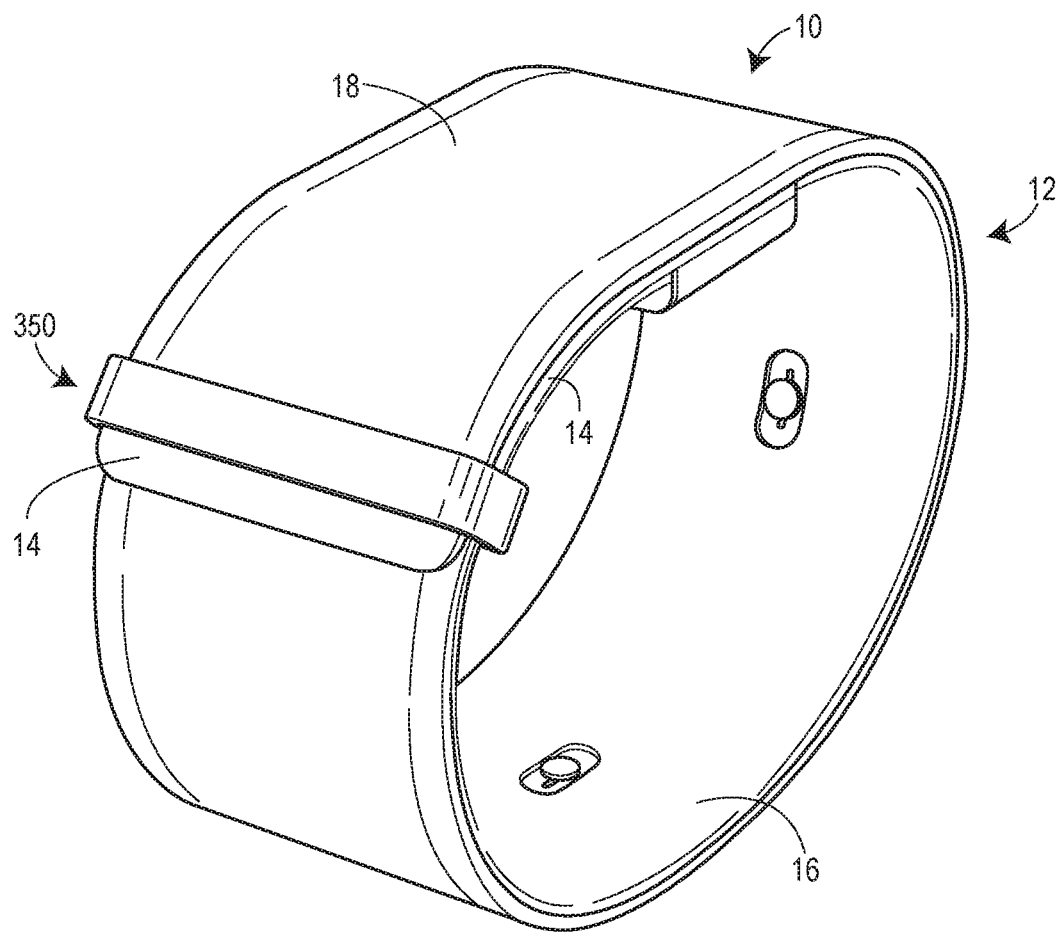

In another embodiment illustrated in FIGS. 15 and 16, the flexible attachable article 10 is similar to the article 10 described above in connection with FIGS. 11-14. In this embodiment, however, the article 10 includes a mechanical connector 350 instead of the mechanical connectors 320 and 324 described above in connection with FIGS. 11-14. As shown in FIG. 15, the mechanical connector 350 is or takes the form of a clasping structure. The clasp 350 has a flexible body 354 that has an oval-shaped cross-section and two opposing end portions 358A and 358B spaced apart from but closely adjacent one another.

When the flexible band 12 is bent to be disposed on or around an object (e.g., a wrist, a leg, etc.), and after portions of the device 10 are magnetically connected to one another (e.g., via the magnets 22A, 22B, 24A, and 24B), the clasp 350 can be installed on the device 10 to mechanically connect two overlapping portions of the device 10, as illustrated in FIG. 16. Specifically, the flexible body 354 of the clasp 350 can be manipulated such that the clasp 350 can be slid or positioned over the two overlapping portions of the article 10. For example, the opposing end portions 358 of the clasp 350 can be pulled apart from one another, after which the clasp 350 can be slid or positioned over the two overlapping portions. The clasp 350 can, in some cases, be positioned over overlapping ends 14 (e.g., proximate to the magnets 22A, 22B, 24A, 24B), while, in other cases, the clasp 350 can be positioned over overlapping portions of the band 12. In any event, because the body 354 is flexible, the body 354 can be restored to its original shape after being manipulated and positioned over the two overlapping portions of the device 10. The clasp 350 can be retained in the installed position by virtue of the shape of the body 354 and the thickness of the overlapping portions of the device 10.

Of course, the clasp 350 can be constructed differently and yet still perform the intended function. In other embodiments, the clasp 350 can have a differently-shaped body 354. The body 354 can, for example, have more of a circular shape, more of a rectangular shape, or have some sort of other suitable shape. In other embodiments, the body 354 can be formed of two or more discrete sections that can be removably coupled to one another to facilitate the installation or removal of the clasp 350. These sections could, for example, be snapped or hooked to one another. Depending on the construction of the clasp 350, the clasp 350 can, in other embodiments, also be installed differently and yet still perform the intended function. When, for example, the body 354 is formed of two or more sections that can be removably coupled to one another, one or more of the sections could be removed from the other section(s) to allow the clasp 350 to be installed on the device 10. Once the clasp 350 is positioned properly, the sections could be again coupled together to install the clasp 350 thereon. In still another embodiment, the clasp 350 could be rigid or semi-rigid and form a member that encircles (partially or completely) one portion of the band 12 and that slides over the other end portion of the band 12 when the band 12 is folded over on itself as illustrated in FIG. 16.

In another embodiment illustrated in FIGS. 17-20, the flexible attachable article 10, again illustrated in the form of a wristband, includes a similar band portion 12 and ends 14A and 14B. However, in this embodiment, the article 10 has a connection structure that includes the magnets 22A, 22B, 24A, and 24B described above, but also includes a buckle clasp 380 that can effectuate a mechanical connection between the ends, such that the ends can be mechanically and magnetically connected to one another when the device 10 is bent, as illustrated in FIG. 19, to form a circular or oval band with the display 18 on the outside of the band. As shown in FIG. 17, the buckle clasp 380 is connected to end 14A (though it can be connected to end 14B in other embodiments) and has a frame 384. The frame 384 includes a first frame portion 386*a*, a second frame portion 386*b*, a pair of sides 388 that each connect the first frame portion and the second frame portion 386*b*. The buckle clasp 380 further includes an opening 390 defined between the first and second frame portions 386*a*, 386*b*. As shown in FIG. 18, the article 10 in this embodiment includes a plurality of grooves 392 defined in each of the opposing sides 394 of the article 10 which may cooperate with similar grooved structure on the inside surfaces of the sides 388.

When the flexible band 12 is bent to be disposed on or around an object (e.g., a wrist, a leg, etc.), the end 14B can be inserted or fed through the opening 390 in the buckle clasp 380, as shown in FIG. 19, and manipulated (e.g., pushed, pulled, etc.) to the desired position (which is based on the desired size of the article 10). In turn, the buckle clasp 380 and the magnets 22A, 22B, 24A, and 24B serve to connect the ends in the desired position while mechanical interactions between the frame portions 386*a* and 386*b* and the upper and lower sides of the band 12, as well as mechanical interactions between the sides 388 and the sides 394 of the band 12 limit movement of the band 12. Specifically, the first frame portion 386*a* applies a resistive force on a top or upper side of the device 10, which prevents movement of the ends 14A and 14B relative to one another. In addition, as shown in FIG. 19, an interior portion of each of the sides 388 (which may be grooved or otherwise provided with a rough surface treatment) engages or contacts a respective plurality of corresponding grooves 392, which also serves to prevent movement of the ends 14A and 14B relative to one another. At the same time, the magnets 22A, 22B, 24A, and 24B, by virtue of being in proximity to one another, create or provide a magnetic force that also serves to hold the ends 14 together. In this manner, the ends 14A and 14B can be both mechanically and magnetically connected to one another when the device 10 is disposed on or around the desired object, as shown in FIG. 20.

Figure 21:
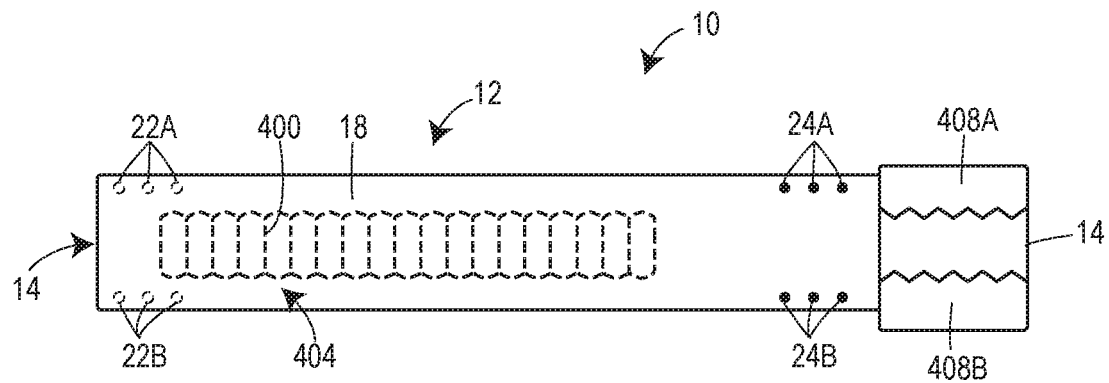
FIGS. 21-23 illustrate an example attachable article in the form of a wristband having a flexible electronic display and another connection structure that includes magnets and interlocking grooves.
Figure 22:
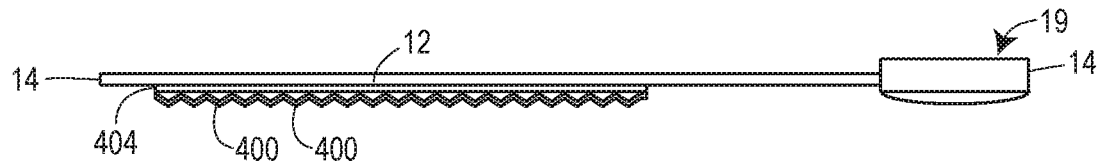
Figure 23:
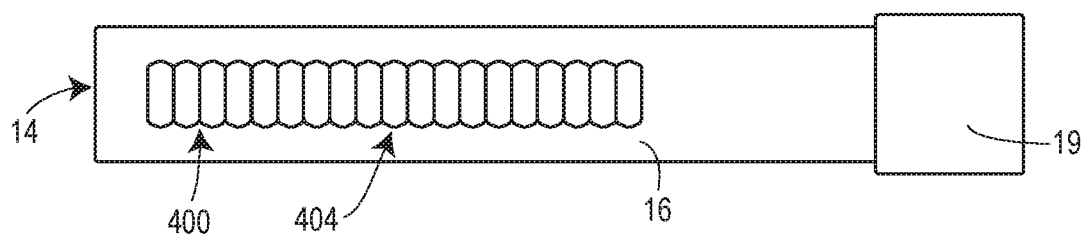

In another embodiment illustrated in FIGS. 21-23, the flexible attachable article 10 is similar to the article 10 described above in connection with FIGS. 11-14. The flexible attachable article 10 includes a similar band portion 12, ends 14A and 14B, an electronics module 19 disposed at or on one of the ends 14, and the magnets 22A, 22B, 24A, and 24B described above. However, instead of grooves 320 formed in the bottom side of the support 16, as described with respect to FIGS. 11-14, the article 10 in this embodiment includes grooves 400 formed or defined in a bottom portion of the edges of a connecting element 404 that extends downward from the bottom side of the support 16, as shown in FIGS. 21-23. Like the grooves 320, the grooves 400 each have a generally triangular cross-section but, in other examples, the grooves 400 can have a differently shaped cross-section (e.g., a rectangular cross-section, a semi-circular cross-section). As used herein, a groove is any structure that includes a lower surface disposed between two higher surfaces (which may be flat surfaces or ridges, for example), and that is connected to the higher services via straight, sloped or even curved sides. As shown in FIG. 23, the edges of the grooves 400 are positioned inward of the edges of the connecting element 404. In other embodiments, the grooves 400 can extend outward of the edges of the connecting element 404, in which case the grooves 400 can engage and mechanically connect with a complementary structure disposed on an interior of the electronics module 19 or another portion of the band 12. In still a further embodiment, the grooves 400 can, alternatively or additionally, be formed in the bottom side of the connecting element 404.

Like the article 10 described in FIGS. 11-14, the end portion 14A (electronics module) of the article 10 illustrated in FIGS. 21-23 includes a plurality of projections 408 configured to engage and retain corresponding grooves 400 therein. As shown in FIG. 21, however, the projections 408 extend further inward than the projections 324.

When the flexible band 12 is bent to be disposed on or around an object (e.g., a wrist, a leg, etc.), such that one of the ends 14 is disposed on or near an upper side of the other one of the ends 14, one or more of the grooves 400 can be disposed or seated between one or more of the projections 408A and 408B, such that the projections 408A and 408B, which extend inward, engage and serve to retain a respective one of the grooves 400. In this manner, a mechanical connection may be formed between one or more of the grooves 400 and the respective projections 408*a* and 408*b*. At the same time, the magnets 22A, 22B, 24A, and 24B, by virtue of being in proximity to one another, create or provide a magnetic force that also serves to hold the ends 14 together. So configured, the ends 14 are mechanically and magnetically connectable in various different positions with respect to one another when the device 10 is bent or curved to be placed around a wrist, a leg, a bicycle handle bar, etc., for example. As a result, the attachable device 10 may be easily adjustable in size to fit various differently-sized mounting members. As one of ordinary skill in the art will appreciate, the grooves 400 disposed or seated between the projections 408*a* and 408*b* can be repositioned, relative to those projections, to adjust the attachable device 10 to fit a differently sized mounting member (e.g., a leg instead of an arm).

In other embodiments, the connection structure can include any of the above-described mechanical connectors in combination with a different configuration of magnets. For example, the connection structure can include the clasp 350 in combination with the magnetic materials 20A and 20B described in connection with FIGS. 1 and 2. Moreover, in other embodiments, the connection structure can utilize one or more of the above-described mechanical connectors and/or other mechanical connectors in combination. For example, the connection structure could alternatively include the recess 300 and the tab 304 as well as the clasp 350. Such a connection structure would provide an even stronger and more durable connection between the end pieces 14 of the device 10. In further alternative embodiments, different mechanical connectors, other than those described above in connection with FIGS. 8, 9A-9C, 10A, 10B and 11-23, can be used. For example, the connection structure can include a recess formed on a top or bottom side of one of the clasps 14 and a cooperating tab that extends upward from one of the clasps 14 and can be inserted into the recess.

In some instances, it may be desirable to adjust (e.g., expand, reduce) the length of the band 12 to accommodate or fit differently-sized mounting members (e.g., a leg instead of an arm). It may also or instead be desirable to add or increase functionality, such as battery capacity, charging capability, sensing capability, connectivity, and/or display capability, to the device 10. Accordingly, one or more extenders 250 can be removably coupled to one or both of the first and second ends 14A, 14B of the band 12 to adjust the length of the band 12 and/or to add or increase functionality to the device 10. It will be understood that any number of extenders 250 can be used, depending on the desired length of the band 12 and/or the desired functionality.

FIG. 24A illustrates a number of different extenders 250 that can be removably coupled to one or both of the ends 14A, 14B of the band 12. The extenders 250 illustrated in FIG. 24A have the same shape but have slightly different sizes. In other examples, the extenders 250 can have different shapes (than one another and/or the extenders 250 in FIG. 24A) and/or different sizes (than one another and/or the extenders 250 in FIG. 24A). The extenders 250 can have the same radius of curvature or can have different radii of curvature, such that the device 10 can accommodate different radii of curvature due to different sized mounting members (e.g., different sized wrists). Likewise, the extenders 250 can have the same arc length or can have different arc lengths, such that the device 10 need not include an excessively large number of extenders to accommodate larger mounting members (e.g., larger wrists). The extenders 250 can be made of a same or different flexible material (e.g., cloth, leather, plastic), a same or different rigid or semi-rigid material (e.g., hard plastic, metal), or various combinations of different flexible, rigid, and semi-rigid materials. As an example, two extenders 250 can be made of a flexible material while two other extenders 250 can be made of a rigid or semi-rigid material.

To provide additional or increased functionality to the device 10, one or more of the extenders 250 can include an electronics module 19 that is disposed on or within the extender 250 and that holds electronics, such as one or more batteries, one or more chargers, one or more sensors, one or more memories, one or more processors, one or more communication modules, or combinations thereof. In addition to powering the other electronics in the electronics module 19, the one or more batteries can power other electronics in the device 10. In this manner, the one or more extenders 250 can provide battery capacity or functionality, or additional battery capacity or functionality, to the device 10. The one or more chargers can be connected to the one or more batteries and/or one or more other batteries of the device 10 and enable charging or recharging of any of these batteries using any known or desired recharging circuitry or methodology. As an example, the one or more chargers can use any desired energy harvesting technology to derive energy from a solar source, a kinetic energy source (e.g., motion of the device 10), a heat energy source, or some other external energy source. In this manner, the extenders 250 can provide charging capability or functionality to the device 10, or, when the device 10 already includes some charging capability, can provide additional charging capability or functionality to the device 10. The one or more sensors may include, for example, an impact sensor or step counter, one or more gyroscopic sensors or gyroscopes, temperature sensors (which may, for example detect the temperature of the skin of the user when the device 10 is being worn), vibration sensors, pulse rate monitors, external pressure sensors, blood pressure sensors (e.g., which may detect the blood pressure of the user wearing the device 10), heart rate sensors (e.g., which may detect the heart rate of the user wearing the device 10), accelerometers, strain gauges, gyroscopes, accelerometers, compression sensors, tensional strain sensors, positional sensors (e.g., GPS sensors), light sensors, piezoelectric sensors, or any other desired sensors. In this manner, the extenders 250 can provide sensing capability or functionality, or additional sensing capability or functionality, to the device 10. The one or more processors, which may, for example, include programmable, general purpose processors and/or specially programmed processors, can implement operation of any of the electronics of the extenders 250 and/or other electronics of the device 10. In this manner, the extenders 250 can provide computational processing capability or functionality, or additional processing capability or functionality, to the device 10. The one or more memories can be, for example, one or more flash memories or other suitable types of non-transitory, tangible, data storage media. The one or more memories can store various applications to be run on the various processors and/or various data (e.g., image or video data files). In this manner, the extenders 250 can provide memory capability or functionality, or additional memory capability or functionality, to the device 10. The one or more communication modules may include or use any type of communication hardware/software/firmware that uses any desired types of communication techniques to enable the processors to communicate with other electronics in the device 10 and/or exterior devices or sources. Of course, the communication modules could include multiple different types of communication hardware/software/firmware, including any kind of hardwire-based communication module or wireless-based communication module. As examples, the communication modules may be a wired or wireless communication module that may provide wired or wireless-based protocol (e.g., WiFi, Z-Wave, ZigBee) communications between the extenders 250 and the device 10 and other devices (including other extenders 250) or a communication network such as a LAN or a WAN to which other devices are communicatively connected. Likewise, the communication modules may be a near field communication (NFC) module or a Bluetooth communication module, which may perform near field communications or Bluetooth communications in any known or desired manner with nearby NFC or Bluetooth enabled devices, thereby enabling wireless communication between the extenders 250 and the device 10 and other closely situated or closely located electronic devices. Still further, the communications modules may include a USB or other type of wired communication module for decoding and encoding USB-based communication signals to be sent out and received via the USB communication module(s). In the above-described manner, the extenders 250 can provide communication (e.g., connectivity) capability or functionality, or additional communication capability or functionality, to the device 10.

Moreover, one or more of the extenders 250 can include a display 254. The display can be similar to the flexible display 18 of the device, while in other cases the display can be a different type of display. The display can be an extension of the flexible display 18 of the device 10, while in other cases the display can be a separate display, such as, for example, an indicator display or a matrix display that, for example, reacts to certain user interactions, reacts to certain users wearing the device 10, provides different content, or performs some other desired functionality. In this manner, the extenders 250 can provide additional display capability or functionality to the device 10.

In some cases, it will be necessary for the device 10 to query the one or more extenders 250 to identify the extenders 250 and the functionalities or capabilities offered by those extenders 250. As such, the one or more extenders 250 can include a unique identifier that identifies the respective extender 250, its location, and its capabilities. Depending upon the communication capability or functionality provided by the respective extender 250, this unique identifier may be a unique NFC identifier, Bluetooth communication identifier, or some other identifier.

Finally, while not illustrated in FIG. 24A, it will be appreciated that the one or more extenders 250 can include indicia, such as, for example, engravings, branding, badges, and artwork. The indicia can be added by a user of the device 10 (e.g., for self-expressive reasons) or can be added by the manufacturer (e.g., to identify an extender 250 as corresponding to a certain device 10).

As briefly noted above, the one or more extenders 250 can be removably coupled to one or both of the ends 14A, 14B of the band 12. In some cases, one or more extenders 250 can be removably coupled to only one of the ends 14A, 14B, while in other cases one or more extenders 250 can be removably coupled to each end 14A, 14B. In the event that two or more extenders 250 are utilized, these extenders 250 will also be removably coupled to one another. The extenders 250 can be removably coupled to one another in the same manner as the extenders 250 are coupled to one or both of the ends or can be removably coupled to one another in a different manner.

Generally speaking, it is envisioned that the one or more extenders 250 can be removably coupled to one or both of the ends 14A, 14B and to one another using a number of different connection techniques or methods. If desired, one or more of the extenders 250 can be removably coupled via a mechanical connection such as, for example, a tab and a recess arrangement (e.g., similar to the tab and recess arrangement described above), a standard charging bus (e.g., 2-, 3-, or 4-wire charging bus), a snap arrangement, or some other mechanical connection that mechanically connects the extenders 250 and the device 10 but does not, on its own, facilitate electronic communication between the extender 250 and the device 10 and other extenders 250. In cases in which the extenders 250 are equipped with functionality as described above, the communication modules of the extenders 250 can facilitate the desired connection and communication once the extender(s) 250 is(are) mechanically connected. As an example, the communication modules may facilitate NFC, Bluetooth, Z-Wave, or other wireless communication. In other cases, the mechanical connection may be paired with an electronic connection (e.g., a data bus connection) that facilitates the desired communication. For example, the standard charging bus could be paired with a standard data bus (e.g., SPI, i2C) to facilitate both the desired mechanical and electronic communication. In still other cases, the mechanical connection may be sufficient; in other words, the user may only wish to adjust the length of the band 12 and may not be concerned with the functionality provided by the extenders 250.

Figure 24B:
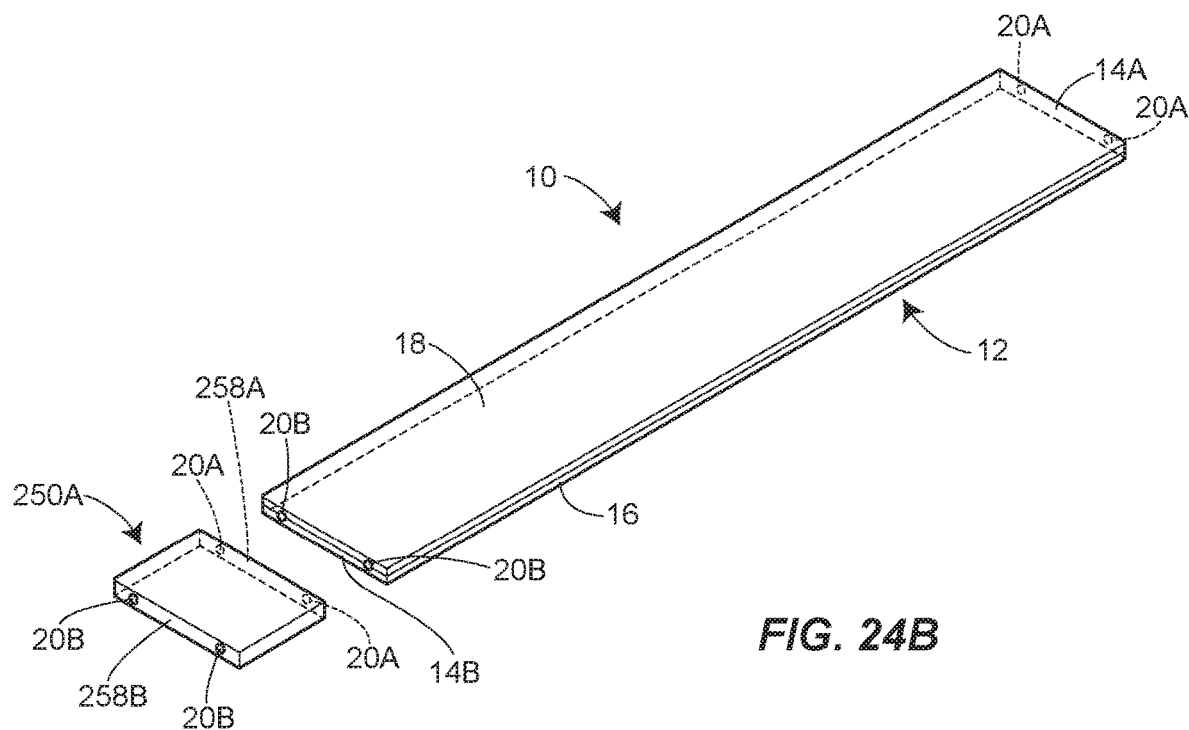
FIGS. 24B and 24C illustrate an example of an extender removably coupled to an attachable article in the form of a wristband device, via a magnetic connection, to adjust a length of the attachable article.
Figure 24C:
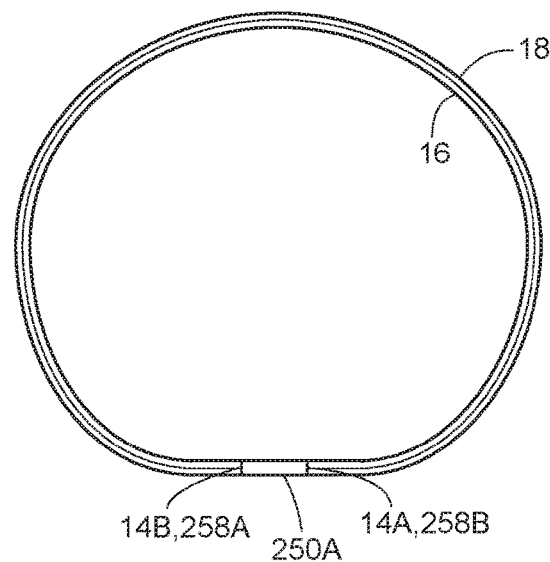

In another embodiment, one or more of the extenders 250 can be removably coupled via a magnetic connection. As illustrated in FIG. 24B, for example, magnets 20A and 20B can be disposed on the ends 14A and 14B, respectively, of the band 12 and magnets 20A and 20B can be disposed on respective ends 258A, 258B of an extender 250A. When, for example, the end 258A of the extender 250A is brought into close proximity with the end 14B of the band 12, the magnets 20A and 20B operate to connect the end 258A of the extender 250A to the end 14B of the band 12 of the device 10, thereby connecting the extender 250A to one end of the device 10. The extended device 10 can then be folded around on itself as illustrated in FIG. 24C and the end 258B of the extender 250A can be similarly connected, in an end-to-end manner, to the end 14A of the band 12. It will be appreciated that the device 10, by virtue of being extended by the extender 250A, will be longer and will therefore have a slightly different (e.g., slightly flatter or more oval) shape than the non-extended device 10 (see FIG. 10B) when in the folded position.

In cases in which the extender 250A is equipped with functionality as described above, the communication module(s) of the extender 250A can facilitate NFC, Bluetooth, Z-wave, or other wireless communication between the extender 250A and the device 10. In this way, the extender 250A can provide additional functionality or capability to the device 10.

Figure 24D:
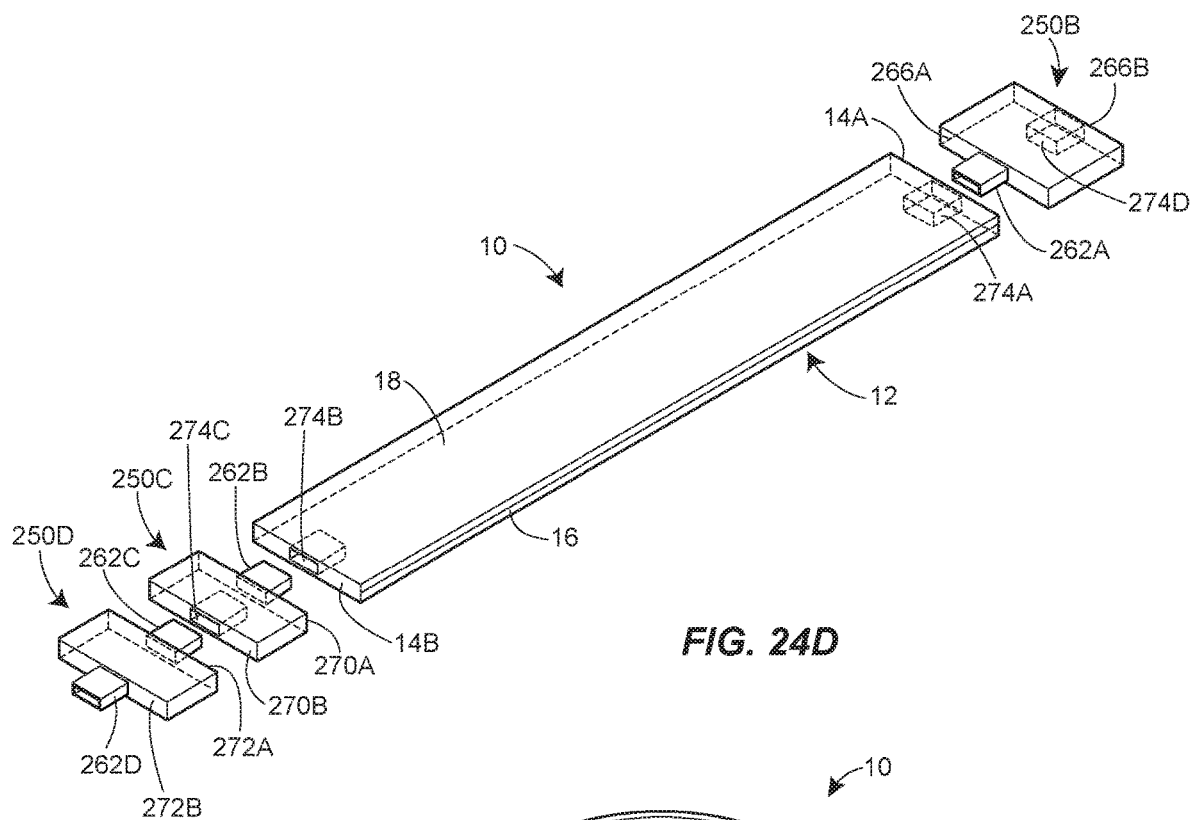
FIGS. 24D and 24E illustrate two example extenders removably coupled to an attachable article in the form of a wristband device, via a USB connection, to adjust a length of the attachable article.

In a further embodiment, one or more of the extenders 250 can be removably coupled via a dual mechanical-electronic connection that mechanically connects the one or more extenders 250 and the device 10 while simultaneously facilitating electronic communication between the extenders 250 and the device 10 and other extenders 250. For example, as illustrated in FIG. 24D, a first extender 250B can be removably coupled to the end 14A of the band 12 via a regular USB connection, and second and third extenders 250C, 250D can be removably coupled to the end 14B of the band 12 via regular USB connections. More specifically, the first extender 250B can include a regular USB plug 262A that is formed in and extends outward from a first end 266A of the first extender 250B, the second extender 250C can include a regular USB plug 262B, identical to the plug 262A, formed in and extending outward of a first end 270A of the second extender 250C, and the third extender 250D can include two regular USB plugs 262C, 262D, also identical to the plug 262A, formed in and extending outward from first and second ends 272A, 272B, respective, of the third extender 250D. To accommodate the regular USB plugs 262A, 262B, regular USB sockets 274A, 274B can be formed into the ends 14A, 14B, respectively, of the device 10. It will be understood that each of the USB plugs 262A, 262B can be inserted into either USB socket 274A, 274B. To accommodate the regular USB plugs 262C, 262D, regular USB sockets 274C, 274D can be formed into the ends 270B, 266B, respectively. In this manner, a dual mechanical-electronic connection can be facilitated between the device 10 and the three extenders 250B-250D.

Figure 24E:
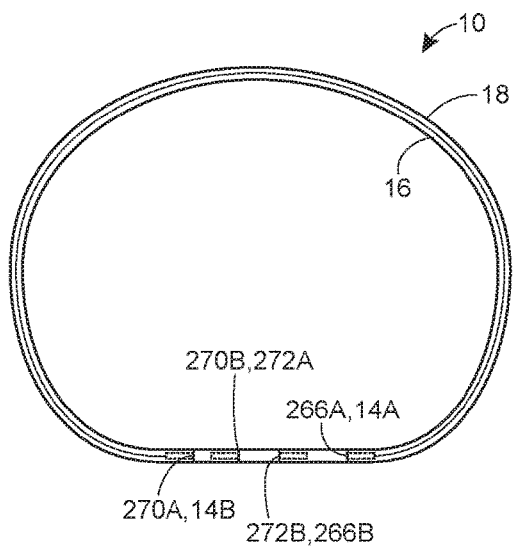

When the first end 266A of the first extender 250B is brought into proximity with the end 14A of the band 12, the USB plug 262A of the first extender 250B can be inserted into the USB socket 274A formed in the end 14A of the band 12, thereby mechanically and electronically connecting the first extender 250B to the device 10. Likewise, when the first end 270A of the second extender 250C is brought into proximity with the end 14B of the band 12, the USB plug 262B of the second extender 250C can be inserted into the USB socket 274B formed in the end 14B of the band 12, thereby mechanically and electronically connecting the second extender 250C to the device 10. Similarly, when the first end 272A of the third extender 250D is brought into proximity with the second end 270B of the second extender 250C, the USB plug 262C of the third extender 250D can be inserted into the USB socket 274C formed in the end 270B of the second extender 250C, thereby mechanically and electronically connecting the third extender 250D to the second extender 250C, and, in turn, the rest of the device 10. The extended device 10 can then be folded around on itself as illustrated in FIG. 24E. With the second end 266B of the first extender 250B in close proximity to the second end 272B of the third extender 250D, the USB plug 262D of the third extender 250D can be inserted into the USB socket 274D formed in the second end 266B of the first extender 250B to connect the second end 266B of the first extender 250B to the second end 272B of the third extender 250D in the end-to-end manner illustrated in FIG. 24E. It will be appreciated that the device 10, by virtue of being extended by the extenders 250B, 250C, will be longer and will therefore have a slightly different (e.g., slightly different or more oval) shape than the non-extended device 10 illustrated in FIG. 10B and the extended device 10 illustrated in FIG. 24C when in the folded position. Finally, in cases in which the extenders 250B, 250C, and 250D are equipped with functionality as described above, the extenders 250B, 250C, and 250D can provide additional functionality or capability to the device 10, via the USB connections.

While the connection between the extenders 250B-250D and the device 10 in FIG. 24C is described as being a standard or regular USB connection, a different type of USB connection (e.g., a micro USB connection, a mini USB connection) or another type of dual mechanical-electronic connection could be used instead. Moreover, any of the above-described connection techniques or methods could be used in combination with one another or any other desired connection technique not explicitly mentioned herein.

Of course, if desired, one or more of the extenders 250 (e.g., the extender 250A of FIGS. 24B and 24C) can be removed or detached from the device 10 in a similar manner as described herein. This might be done, for example, when it is desirable to reduce the length of the band 12 to accommodate or fit a smaller-sized mounting member (e.g., an arm instead of a leg), and/or when additional functionality provided by one or more of the extenders 250 is no longer necessary.

It may be important to limit in the manner in which the flexible support 16 can bend or flex so as to protect the flexible display 18 and/or the touch screen interface 26 of FIGS. 1-24, as well as to provide protection for the edges and/or the face(s) of those devices, which might be subject to impact if the dynamically flexible article or device 10 is hit or dropped.

Figure 25A:
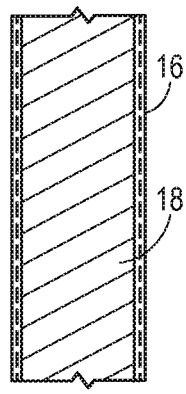
FIGS. 25A and 25B illustrate a top and a cross-sectional view of a flexible wristband device having a structure that protects the edges of a flexible electronic display disposed thereon.
Figure 25B:
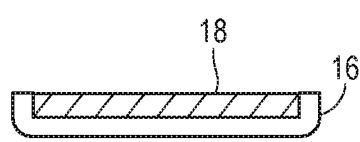
Figure 25C:
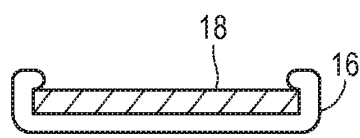
FIG. 25C illustrates a cross-sectional view of a flexible wristband device having a structure that protects the edges and a portion of a face of the flexible electronic display disposed thereon.
Figure 25D:
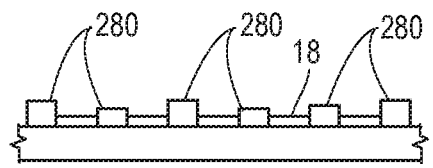
FIG. 25D illustrates a front, close-up view of a portion of flexible wristband device having a structure that protects the edges of the flexible electronic display disposed thereon.
Figure 26:
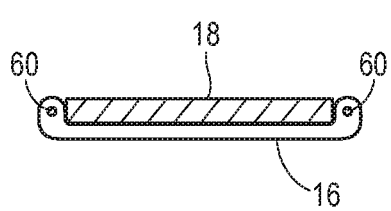
FIG. 26 illustrates a cross-sectional view of a flexible wristband device illustrating further side protection structure for protecting the edges of a flexible electronic display.

FIG. 25A illustrates a top view of the flexible support 16, showing the flexible display 18 disposed thereon. In this case, the flexible display 18 is disposed on top of the flexible support 16 over the center portion of the support 16, while the edges of the support 16 extend out transversely towards the sides of the device 10 beyond the flexible display 18 at least a little bit. This additional area of material of the support 16 may be used to protect the flexible display 18 from being bent or torn in the case of a side impact to the device 10, as this material will operate to blunt or absorb some of that impact. As illustrated in FIG. 25B, which provides a cross-sectional view of the device 10 of FIG. 25A, the flexible support 16 can be thicker in the area at the edges of the device 10 and may extend upward to be even with or disposed above the lateral or transverse sides of the flexible display 18, to provide additional side impact protection for the flexible display 18. In this case, as illustrated in FIG. 25B, the display 18 is seated in a space or crevice formed within the center of the support 16, wherein the support 16 has sidewalls that extend above or up against the edges of the flexible display 18, in order to provide side impact protection to the display 18. In some cases, the edge or sidewalls of the support 16 that extend upward to protect the edges of the flexible display 18 and/or the touch screen interface 26 (if present) may be formed with stitching when the support 16 is made of leather for example. FIG. 25C illustrates a cross-sectional view of the flexible support 16, showing the flexible display 18 disposed thereon and the edges of the support 16 extending out transversely beyond the flexible display 18, upward along the lateral or transverse sides of the flexible display 18, and around the transverse sides or edges and over a portion of the face of the display 18. In other words, in FIG. 25C the edges of the support 16 are wrapped around the edges of the face of the display 18. Such an arrangement helps to protect the sides of the flexible display 18 against a side impact to the device 10 and helps to protect the face of the flexible display 18 against an impact to the face of the device 10. In another embodiment, illustrated in FIG. 25D, the device 10 includes a plurality of segmented edges 280 disposed along the transverse edges of the flexible display 18 to provide protection to the sides of the flexible display 18 extending between the ends 14A and 14B of the band 12. The edges 280 can be edge portions that are formed separately from the support 16 or can be integrally formed with the support 16. In FIG. 25D, the edges 280 are variably spaced along the transverse edges of the flexible display 18, with the edges 280 having different heights relative to the flexible display 18. In other examples, the edges 280 can be spaced differently (e.g., uniformly spaced) and/or have different heights (e.g., the same height as one another). In any event, by providing the device 10 with segmented edges, certain portions of the display 18 can be afforded greater protection than others. In another embodiment, illustrated in FIG. 26, additional side impact protection is provided by a wire or other harder, rigid or semi-rigid material 60 (having a density greater than that of the flexible support material 16, but that is still flexible) disposed within or along the flexible support 16 along the edges of the flexible display 18 near or adjacent to the sides of the flexible display 18. As illustrated in FIG. 26, the wires 60 are provided within the flexible support material 16 and extend along the edge of the band portion 12 next to or adjacent the transverse sides of the flexible display 18 to provide superior support or edge protection for the display 18 in the case of a side impact to the device 10. Of course, other types of edge protections besides those illustrated in FIGS. 25 and 26 can be used to protect the edges of the of the flexible display 18. Here, the transverse sides are the sides extending in the lateral direction between the lateral ends of the display 18.

Figure 27A:
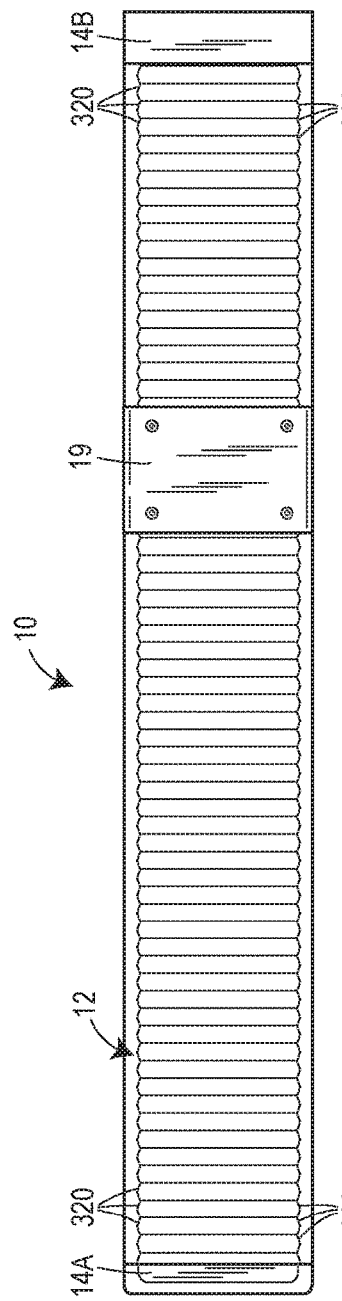
FIGS. 27A-27C depict a bottom view, a side view and a top view, respectively, of an example band device having a raised protective edge adjacent a portion of a flexible display disposed on the band device.
Figure 27B:
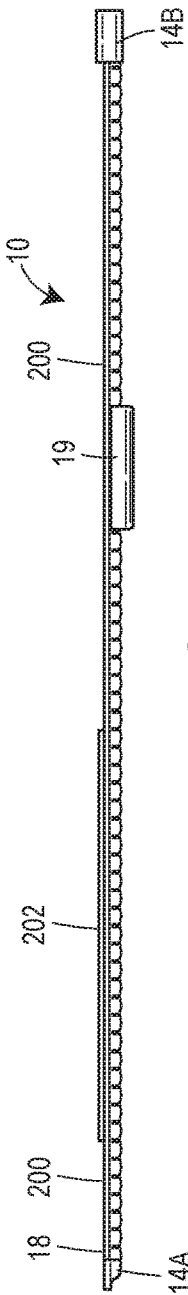
Figure 27C:
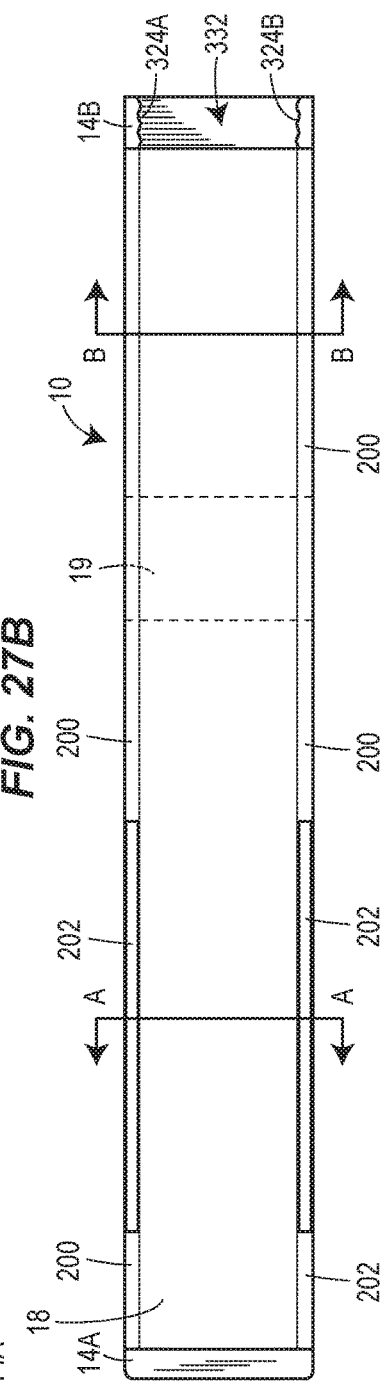
Figure 28B:
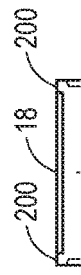
FIGS. 28A and 28B illustrate cross-sectional views along lines A-A and B-B, respectively, of FIG. 27C.
Figure 28A:

FIGS. 27A-27C depict a bottom view, a side view and a top view, respectively, of a still further embodiment of the band device 10 that is similar in nature to the band device 10 of FIGS. 11-14 but includes a raised protective edge adjacent to a portion of a flexible display 18. In particular, as best illustrated in FIGS. 27B and 27C, the band device 10 includes a flexible display 18 disposed on a flexible support 16 which can be configured in any of the manners described herein. The flexible support 16 as depicted in FIGS. 27B and 27C includes raised protective edge portions 200 which extend along the transverse edges of the flexible display 18 to provide protection to the sides of the flexible display 18 extending between the lateral edges or ends 14A and 14B of the band device 10. The raised edges 200 rise up above the middle portions of the support 16 at least as high as the top surface of the flexible display 18 along the entire length of the band 10, on both transverse sides of the band 10. Moreover, as depicted in FIGS. 27B and 27C, additional raised protective elements 202 provide further protective structure for at least a portion of the top surface of the flexible display 18 by rising above the top surface of the flexible display 18 along at least a portion of the length of the band 10. In particular, as depicted in FIG. 27C, the protective members 202 are disposed on portions of both sides of the band 10, and as depicted in FIG. 27B, are raised above the top surface of the flexible display 18. FIGS. 28A and 28B illustrate cross-sectional views along lines A-A and B-B, respectively, of FIG. 27C to illustrate the difference in the height of the protective elements 200 and 202, and to illustrate the manner in which the protective edge elements 202 rise above the top surface of the flexible display 18.

During operation, the protective members 202 provide additional protection to the flexible display 18 by reducing or minimizing touch events or contact with the upper surface of the flexible display 18 which occur, for example, when a user of the band 10 places his or her wrist down on a surface such as a flat surface like a table, a desk, etc. In particular, the raised protective elements 202 are preferably located along the portion or portions of the band 10 that are disposed adjacent to the bottom of the user's wrist when the band 10 is disposed around the user's wrist in the manner described with respect to the embodiment of FIG. 13. In particular, the raised edge portions 202 are disposed on the opposite side of the band 10 from the electronics module 19, when the electronics module 19 is used as the reference element that is to be disposed adjacent to the top of the user's wrist.

Figure 29:
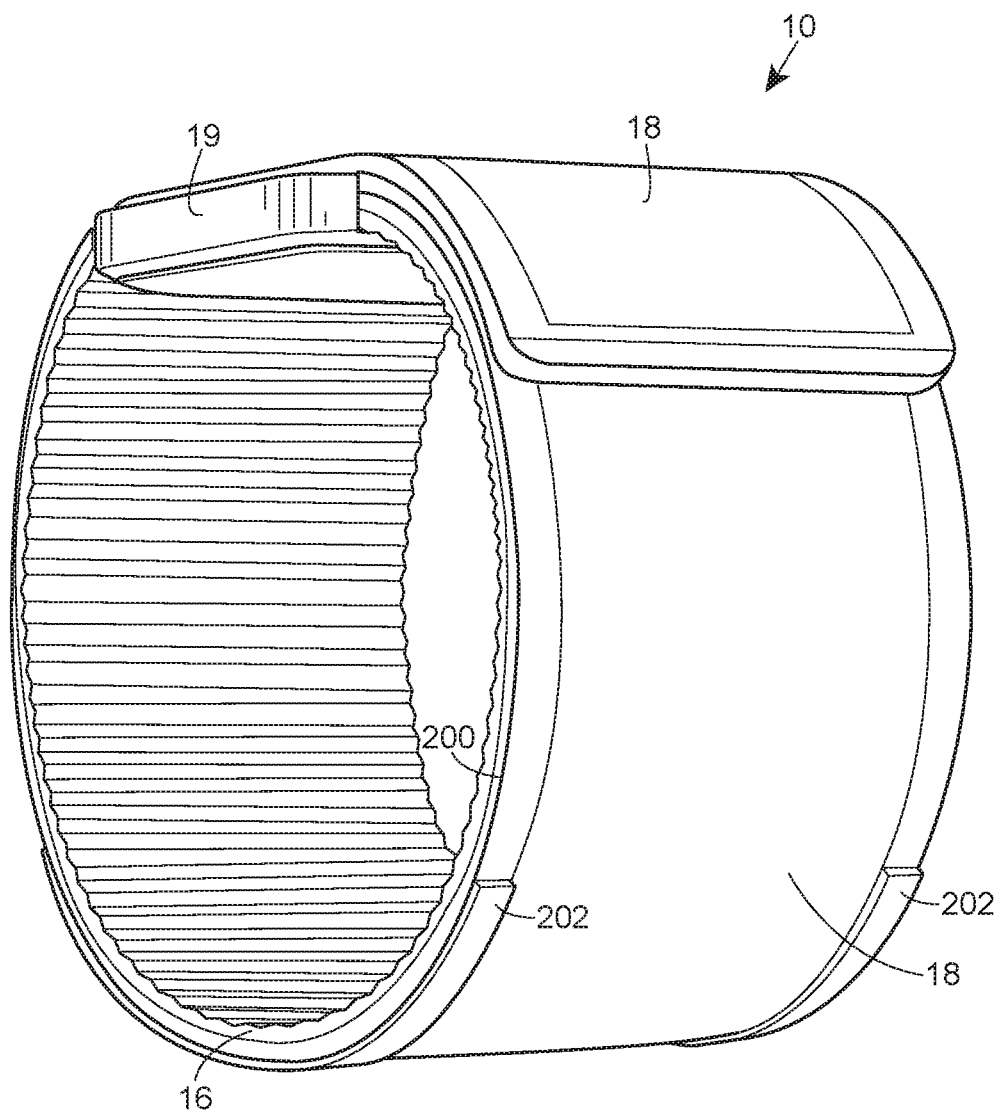
FIG. 29 depicts a perspective view of the band of FIGS. 27A-27C having ends coupled together to form a circular band.
Figure 30A:
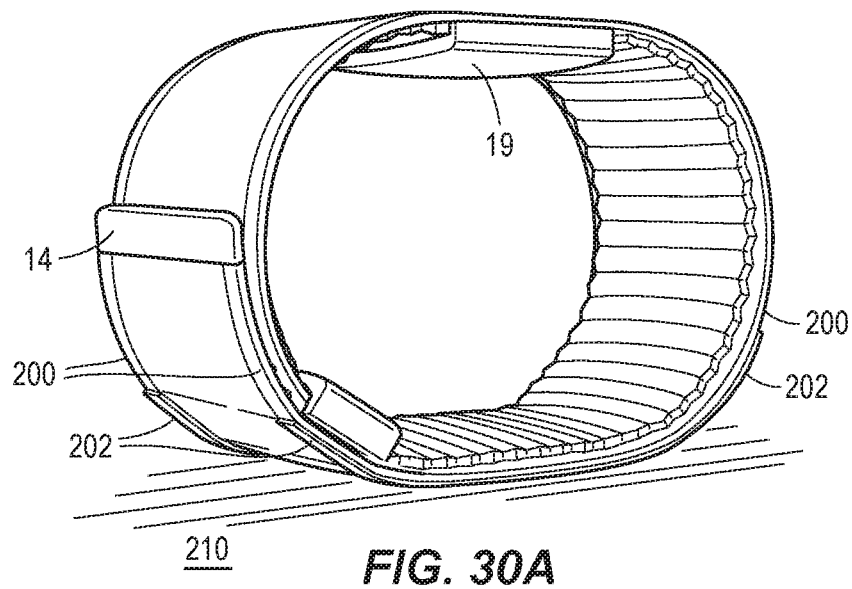
FIGS. 30A and 30B illustrate the band of FIGS. 27A-27C configured to be disposed on and actually disposed on a user's wrist, respectively, when placed on a surface.
Figure 30B:
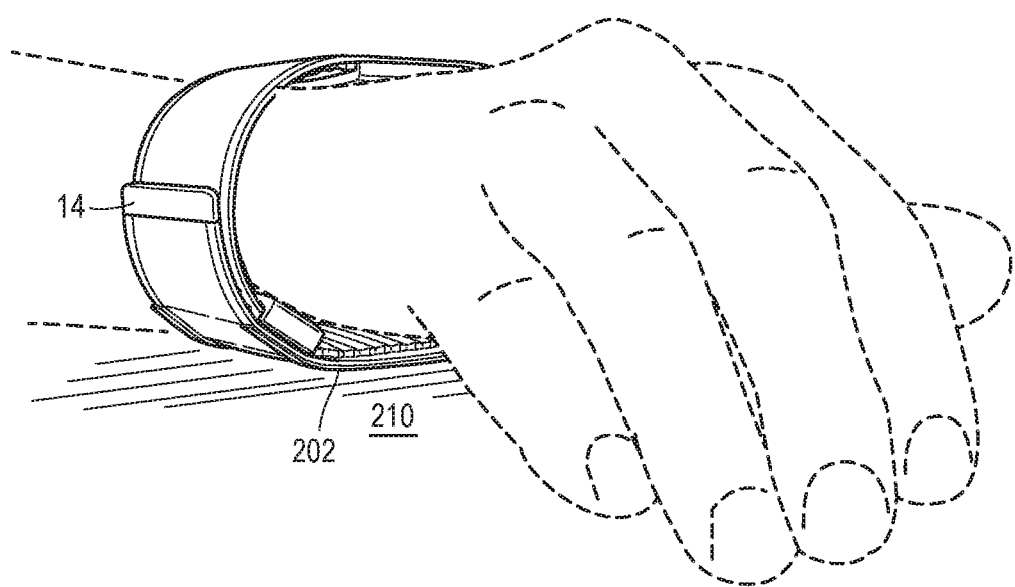

FIG. 29 depicts a perspective view of the band 10 of FIGS. 27A-27C having the ends 14 coupled together to form a circular band, and illustrating the placement of the raised edge elements 202 with respect to the other elements of the band 10, including the electronics module 19, the ends 14 of the band 10, the top surface of the flexible display 18, etc. In addition, FIGS. 30A and 30B illustrate the band 10 of FIGS. 27A-27C configured to be disposed on and actually disposed around a user's wrist, respectively, when placed on a flat surface 210. As can be clearly seen in FIGS. 30A and 30B, the raised edges 202 of the band 10, when worn by a user, come into contact with the flat surface 210 prior to the display 18 at that location, and so help to prevent the upper or outer surface of the flexible display 18 from hitting, sliding along, etc., the flat surface 210 when the user places his or her wrist on the surface 210 or moves his or her wrist along the surface 210. Thus, the raised edges 202 function to protect the flexible display 18 from scratches, etc., that may otherwise occur when the user lays his or her wrist on a surface or moves his or her wrist across a surface.

While FIGS. 27, 29 and 30 illustrate the raised edges 202 as being separate members or pieces, these members 202 could be integrally formed with the edges 200, as illustrated in FIG. 28A. Moreover, while FIGS. 27, 29 and 30 illustrate the raised edges 202 as having ends that extend straight up from the edge portion 200 in an abrupt manner, the raised edges 202 or the portions of the band 10 defining these edges may raise or extend above the edges or edge sections 200 in a less abrupt manner, such as by having curved or sloping ends that gradually extend away from the edge 200 (in either or both of the lateral and transverse directions). Still further, while the raised edge portions 202 are illustrated in FIGS. 27-30 as being disposed along only a portion of the length of the band 10 (that is preferably the portion of the band adjacent to the bottom of the user's wrist), the portions 202 could extend along more or less of the length of the band 10, could extend along the entire length of the band 10 between the end pieces 14A and 14B, etc. Moreover, while FIGS. 27-30 illustrate the raised edges 202 as being defined as a single continuous edge section having a constant or even height, the raised edges 202 along each side of the band 10 could be defined by multiple intermittent raised portions extending above the display 18 and/or the edges 202 could have an undulating or wavy top surface (i.e., having a varying height profile) instead of a top surface with a flat or constant height profile. Of course, the additional raised portions 202 could be made of the same material (e.g., a pliable or flexible material) or of a different material then the portions 200 and/or the support 16. Additionally, the raised portions 202 could be bendable along the length of the band 10 while being incompressible or only slightly compressible in one or more directions orthogonal to the plane of the band 10 or the plane of the flexible display 18 (e.g., when the band 10 is laid out flat).

FIGS. 31-48 illustrate structures that can be used to protect the flexible display 18 and the touch screen interface 26 (if it exists) by limiting the certain flexing, bending and/or torsional movement of the flexible support 16, and thus the display 18 disposed thereon, to certain predefined bending motions or ranges. In particular, because the flexible display 18 is formed as a set of separate substrates having different electronic components formed or etched thereon, as will be described herein, certain types of movement or bending motions may cause damage to the flexible display 18 by causing these layers to delaminate or come apart from one another. In particular, while it is generally possible to flex or bend the band portion 12 in one direction (e.g. around a wrist to form a circular band such as that shown in FIGS. 2 and 4) without delaminating the separate layers of the flexible display 18, it may not be generally desirable or possible to be able to flex or bend the display 18 in the opposite direction or in multiple different directions, such as forming a circular band with the flexible display 18 facing the inside of the band, as doing may cause the layers of the flexible display to delaminate from one other and thus stop functioning.

More particularly, while it is desirable to bend the flexible support 16, as illustrated in FIGS. 2 and 4, such that the display 18 faces towards the outside of a circular ring (i.e., wherein the display surface of the flexible electronic display through which the image content is viewable is bent to be convex and the surface of the flexible electronic display disposed near or adjacent the support structure is bent to be concave), it may be disadvantageous and potentially destructive to the flexible display 18 to bend the device 10 too far in the opposite manner (referred to herein as a counter-rotational direction), i.e., with the display 18 on the inside of the ring (wherein the display surface of the flexible electronic display through which the image content is viewable is bent to be concave and the surface of the flexible electronic display disposed near or adjacent the support structure is bent to be convex). In particular, bending in the counter-rotational direction may potentially delaminate the various layers of the flexible display 18 from one another. Still further, it would be undesirable to provide too much flexing of the sides of the flexible display 18 around the longitudinal axis of the band 12 or too much torsional bending on the flexible display 18, wherein such torsional bending rotates one of the ends 14 around the longitudinal center line of the band 12 with respect to the other of the ends 14, thus forming a helical structure in the band 12. In this case, torsional rotation would occur when one end of the flexible display 18 is rotated in one direction while the other end of the flexible display 18 is rotated in the other direction, such as by rotating one of the end pieces 14 about the center longitudinal axis of the band 12 in a clockwise direction while simultaneously rotating the other end piece 14 about the center longitudinal axis of the band 12 in a counter-clockwise direction (from the same viewpoint) simultaneously. Again, as will be understood, too much of such a bending movement could delaminate the flexible display 18 and/or otherwise damage the flexible display 18.

FIGS. 31-48 illustrate various mechanisms for limiting the bending or flexing motion of the flexible support 16 of the device 10. These mechanisms can limit the bending or flexing motion of the flexible support 16 in one direction or in multiple directions (e.g., the rotational and counter-rotational directions) to limit or prevent undesirable bending motion that could damage the display 18. In particular, these or other mechanical structures can be used to limit the bending motion of the flexible support 16 beyond the minimum critical bending radius of the flexible electronic display 16. Here, the minimum critical bending radius of the flexible electronic display is the minimal or smallest bending radius at which further bending will impair or destroy the functionality of the flexible electronic display by, for example, breaking the electronic connections or other components in the flexible electronic display. Such a minimal critical bending radius may be defined by a single bend or by multiple repeated bends. In this case, the mechanical structures can limit the bending motion of the support 16 in one or more different directions to one or more minimal radii of curvature greater than or equal to the minimum critical bending radius of the flexible electronic display. Different directions can be limited to the same minimal radius of curvature of different minimal radii of curvature. For example, bending motion can be limited in the rotational direction, such as when the display surface of the flexible electronic display through which the image content is viewable is bent to be concave and the surface of the flexible electronic display disposed near or adjacent the support structure or flexible band is bent to be convex) to a minimal radius of curvature that is greater than or equal to the minimum critical bending radius of the flexible electronic display. Alternatively or additionally, bending motion can be limited in the counter-rotational direction, such as when the display surface of the flexible electronic display through which the image content is viewable is bent to be convex and the surface of the flexible electronic display disposed near or adjacent the support structure is bent to be concave, to a minimal radius of curvature that is greater than or equal to the minimal critical bending radius of the flexible electronic display. The minimal radius of curvature in the rotational direction can be the same as or different than the minimal radius of curvature in the counter-rotational direction.

Figure 31A:
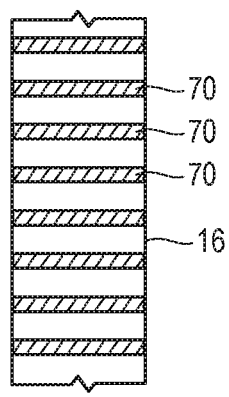
FIG. 31A illustrates a top view of a flexible support of a wristband device having a torsional and transverse bending limiting structure in the form of a number of transverse spacers.
Figure 31B:
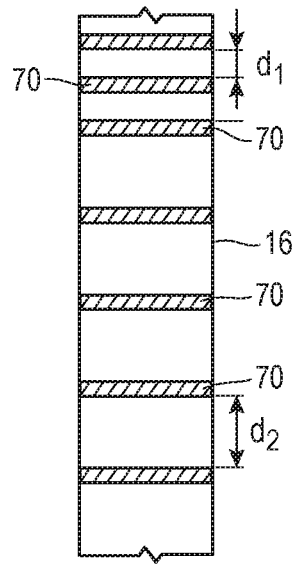
FIG. 31B illustrates a top view of a flexible support of a wristband having a torsional and transverse bending limiting structure in the form of a number of transverse spacers spaced at different distances from one another.

As shown in FIGS. 31A and 31B the support 16 can include a series of spacers or bars 70 disposed between sections of the band portion 12 from one side of the band 12 to another side of the band 12 (i.e., oriented transversely) across the band portion 12. The spacers 70 operate to limit or reduce the amount of torsional rotation that is able to be applied to the support 16 and also limit the amount of longitudinal rotation that can be applied to the band 12. More specifically, the material, size, number, and/or spacing of the spacers 70 within the flexible support 16 may be varied to define, and thus limit, the amount of torsional motion that can be applied to the support 16. To this end, the spacers 70 can be made of a material, such as a rigid or semi-rigid material like hard plastic or metal, that is stiffer or more inflexible than the material from which the band 12 is made. In other embodiments, the spacers 70 and the support 16 can be made of the same material, but the spacers 70 may comprise a thicker or denser configuration of that material. In yet other embodiments, the support 16 may be made of a bendable metal that bends easily at large radii of curvatures (i.e., small bending angles) but that increases in stiffness or non-elasticity at smaller radii of curvatures (i.e., larger bending angles). The spacers 70 may be separately formed and then disposed within or on the support 16 or may be manufactured as part of the support 16. For example, the spacers 70 can be molded on the underside of the band portion 12. In FIG. 31A, the spacers 70 are evenly spaced across the band portion 12, such that all portions of the band portion 12 are subject to the same bending or flexing limit. Alternatively, one or more of the spacers 70 can be spaced at different distances from one another across the band portion 12. In FIG. 31B, the spacers 70 are spaced at different distances across the band portion 12 (i.e., d2 is greater than d1), such that different portions of the device 10 (e.g., the sides) can be bent or flexed more than other portions of the device 10 (e.g., the top and the bottom). The spacers 70 may also operate to absorb side impacts to the band 12. For example, the support 16 can have a width that is at least slightly larger than the width of the flexible display 18, such that the spacers 70 also act as side impact protection structure.

Figure 32:
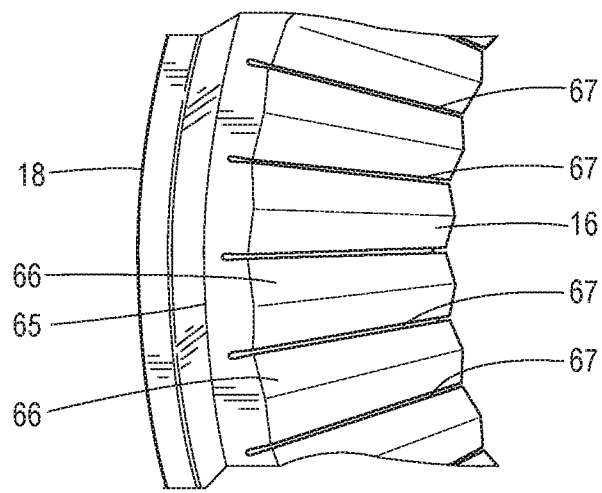
FIGS. 32 and 33 illustrate a flexible support of a wristband having a torsional, transverse and lateral bending limiting structure in the form of a plurality of grooves formed in an underside of the flexible support and evenly spaced from one another.
Figure 33:
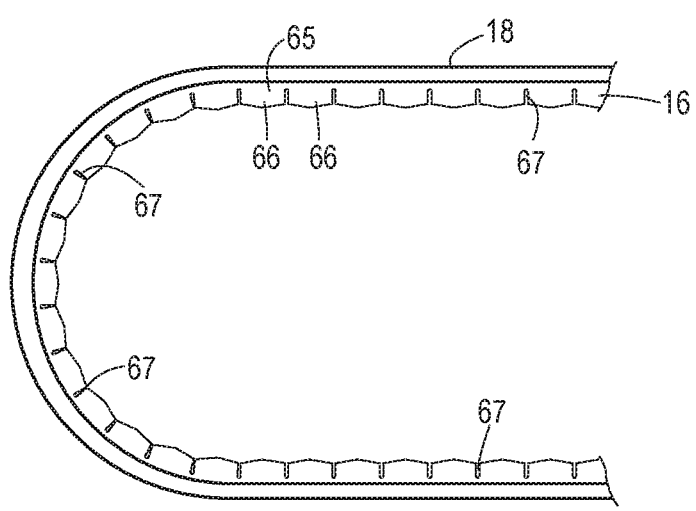

In FIGS. 32 and 33, the support 16 and the flexible display 18 are integrally formed with one another. As illustrated in FIGS. 32 and 33, a plurality of grooves 67 are formed (e.g., molded) in an underside of the support 16 of the band 12 from one side of the band 12 to another side of the band 12 (i.e., oriented transversely) across the band portion 12. As illustrated in FIG. 32, each groove 67 extends through only a portion of the thickness of the support 16, such that the support 16 includes a continuous bottom layer of material 65 immediately adjacent an underside of the flexible display 18 and a plurality of sections or islands 66 that jut or extend upward from the bottom layer 65 adjacent respective grooves 67. The grooves 67 illustrated herein each have a U-shape, but can, in other embodiments, have a different shape (e.g., a rectangular shape, can be more curved, can be flatter). So defined, each groove 67 forms a sort of "living hinge" that operates to control (e.g., limit or reduce) the amount of bending between the sections 66 of the support 16 that are adjacent to that groove 67. FIG. 33 illustrates how the grooves 67 can, when the band 12 is being bent, operate to control the amount of bending between the sections 66 of the support 16, and, in turn, control the amount of bending applied to the display 18. Because the grooves 67 are evenly spaced apart across the band portion 12, all of the sections 66 of the support 16 are subject to the same bending or flexing limit. The material forming the bottom layer of material 65 and the material forming the islands 66 may be made of the same or different material and each may be made of either compressible (such as foam, rubber, etc.) or non-compressible materials (such as hard plastic, metal, etc.) In fact, both of the layers 65 and 66 may be made of non-compressible materials, one of the layers 65 and 66 may be made of a compressible material while the other layer may be made of a non-compressible material, or the layers 65 and 66 may be both made of compressible materials with the same or different compressibility.

As with the spacers 70, the size, number, spacing and/or compressibility of the material forming the grooves 67 may be varied to define, and thus limit, the amount of torsional or other bending motion that can be applied to the support 16. For example, while the grooves 67 shown in FIG. 32 only extend through a portion of the support 16, the grooves 67 can, in other embodiments, may extend through more or less of the support 16, which would, in turn, affect the degree of curvature permitted by the grooves 67. As noted above, the grooves 67 illustrated in FIGS. 32 and 33 are evenly spaced across the band portion 12, such that all portions of the band 12 are subject to the same bending or flexing limit.

Figure 36:
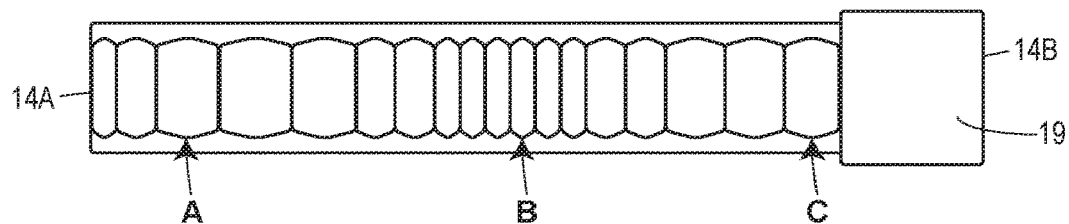
FIGS. 36 and 37 illustrate a flexible support of a wristband having a torsional, lateral and transverse bending limiting structure in the form of a plurality of grooves formed in an underside of the flexible support and spaced apart from one another at various distances.
Figure 37:
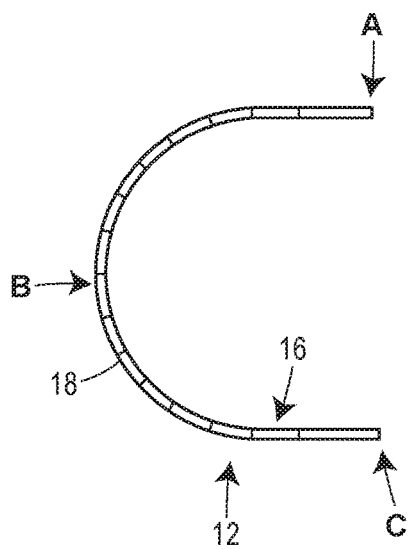

Alternatively, however, one or more of the grooves 67 can be spaced at different distances across the band 12, with the effect that different portions of the device 10 (e.g., the sides) can be bent or flexed more than other portions of the device 10 (e.g., the top and the bottom or one side versus the other side of the band). For example, in an embodiment illustrated in FIGS. 36 and 37, the grooves 67 are spaced at different distances across the longitudinal span of the band 12. As illustrated in FIG. 36, the distance between the grooves 67 near or at the end 14A is greater than the distance between the grooves 67 near or at a middle portion of the band 12, and the distance between the grooves 67 near or at the end 14B is greater than the distance between the grooves 67 near or at the middle portion. As illustrated in FIG. 37, different portions of the device 10 can thus be bent or flexed more than other portions of the device 10. Specifically, the portion of the band 12 labeled B, by virtue of having grooves 67 that are spaced closer to one another, can be bent or flexed more than the portion of the band labeled A and the portion of the band 12 labeled C, which have grooves 67 that are further apart. Moreover, the width of the grooves 67 can be varied to provide more or less flexing in the band at particular locations.

Figure 34:
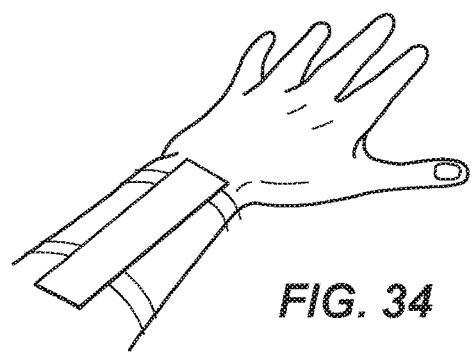
FIG. 34 illustrates the wristband disposed along an arm of a user to form an armband.

In some cases, a user of the device 10 may find it necessary (e.g., for viewing the display 18) to bend the band 12. A user of the device may, for example, find it necessary to apply a small amount of torsional rotation to portions of the flexible display 18 and/or flex the side of the flexible display 18 around the longitudinal axis of the band 12. Such motion may be necessary when, for example, the device 10 is disposed along an arm of the user, as illustrated in FIG. 34. To permit such operations, but at the same time prevent bending that may comprise the effectiveness or even destroy the flexible display 18, the article 10 can include one or more transverse grooves or spacers formed or disposed in the support 16.

Figure 38:
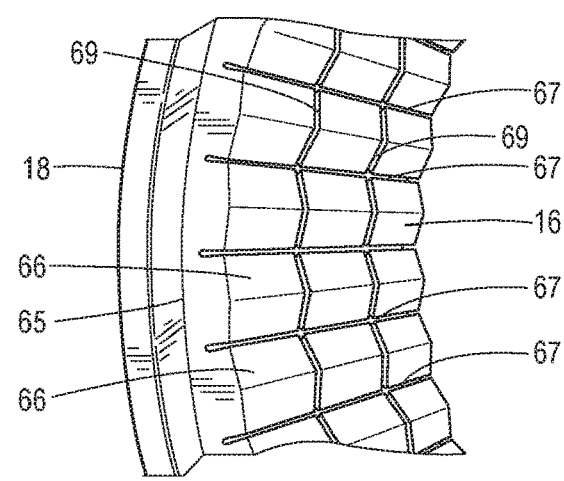
FIG. 38 illustrates a top view of a flexible support of a wristband having torsional, transverse and lateral bending limiting structure in the form of a number of longitudinal and transverse grooves formed in the flexible support.

In FIG. 38, for example, the article 10 includes a plurality of longitudinal grooves 69 formed in the support 16 between the ends 14 and along the longitudinal axis of the band 12. The grooves 69 can thus be oriented perpendicular to the grooves 67 described in FIGS. 32 and 33. The grooves 69, like the grooves 67, operate to permit a desired maximum amount of flexing and torsional rotation of the display 18. The grooves 69, however, permit a desired amount of flexing and torsional rotation in a direction perpendicular to the longitudinal axis of the band 12.

As with the transverse grooves 320, the size, width, number, and/or spacing of the longitudinal grooves 69 may be varied to adjust this maximum amount, limit flexing or rotation at certain points along the display 18, and/or facilitate flexing or rotation at certain points along the display 18. For example, the grooves 69 can be larger (e.g., wider) than what is illustrated in FIG. 38, can be formed in only a portion of the support 16, or can be more numerous (e.g., there can be a groove 69 between each of the transverse grooves) than what is illustrated in FIG. 32. Likewise, the grooves 69 can be spaced and/or positioned differently. As an example, the grooves 69 can be disposed closer to the edges of the band 12 (i.e., not on the longitudinal axis of the band 12). Of course, if desired, one or more of the spacers 70 discussed above in connection with FIGS. 31A and 31B can be disposed in a longitudinal direction (i.e., along the longitudinal axis of the band 12) in the support 16. These grooves can also be equally spaced or the same size, or may vary as they get farther from the longitudinal center of the band to allow more or less torsional bending at different points along the width of the band 12.

Figure 35:
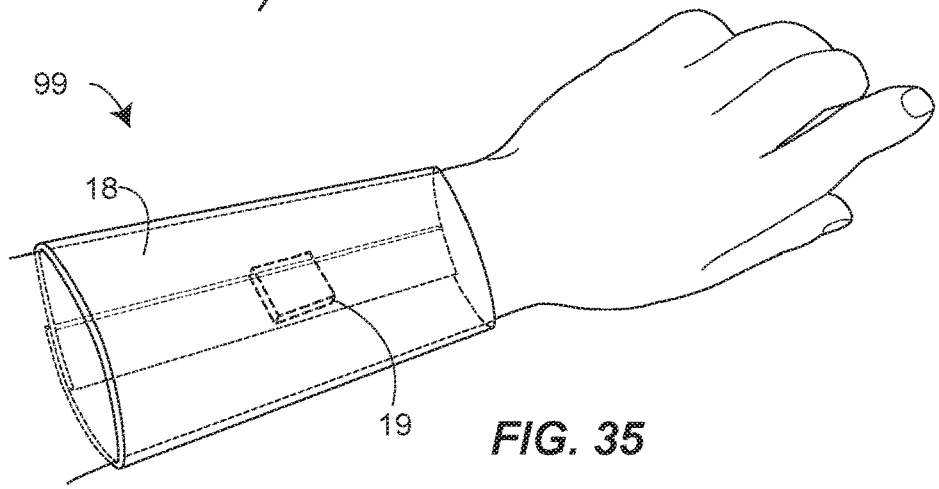
FIG. 35 illustrates an armband device disposed around the arm of a user.

Still further, while the functioning and configuration of a band and the routines performed on the band have been described with respect to a wrist band that is longer than it is wide, when laid flat, the same structure and techniques can be used for other types of bands, such as arm bands. FIG. 35, for example, illustrates an arm band 99 in which the display 18 wraps around a larger part of a user's arm, as opposed to just the wrist. In this case, the band 100 may be wider (along the transverse direction) than it is long (along the longitudinal or lateral direction) when laid flat. However, in this case, the display 18 and the electronics module 19 may be configured in any of the manners described above. In particular, the band 99 can be configured to have or provide a reference point or other reference guidance, such as the electronics module 19, a printed mark on the band 99, a weighted element attached to the band 99, reference guidance provided by the flexible display 18 (e.g., the flexible display 18 may provide the outline of a user's wrist), disposed adjacent to the top of a user's wrist while having the discontinuity in the display 18 occur at a point adjacent to the outer side of the user's wrist, as illustrated in FIG. 35. Of course, any of the methods or structures described above may be used to provide a connection between the ends of the arm band 99 at the point at which the ends of the arm band 99 overlap or meet.

There are of course other manners of limiting the counter rotational bending motion of the band 12, i.e., a bending motion that would put the flexible display 18 on the inside of a circular band as opposed to the outside of the circular band as illustrated in FIGS. 2 and 4. For example, a longitudinally spaced rigid or semi-rigid member can be disposed in or on the flexible support 16 that operates to allow bending motion as illustrated in FIGS. 2 and 4 but to limit counter-rotational bending movement to, for example, the minimal critical radius of curvature of the flexible electronic display. FIGS. 39-46 illustrate a bending limiting member 71 configured as a set of interconnected slats or bars rotatable with respect to one another around a pivot point 72. While not illustrated in FIGS. 39-46, the set of interconnected slats or bars, or portions thereof, can be disposed on, under, and/or within a soft material such as, for example, foam, cloth, rubber, leather, nylon, plastic, and/or any other suitable soft material. The soft material can, in turn, reduce the sharpness of the various slats or bars and the pivot points 72, thereby providing a more comfortable band 12 when worn.

In FIG. 39, the interconnected slats or bars have alternating flat members 74 and flat members 75 with wings or protrusions 73 on the edges thereof, wherein the wings 73 are disposed above the adjacent flat members 74. The flat members 74 are pivotally connected to the flat members 75 so that the wings 73, when disposed above a flat member 74, prevent or at least limit rotation about the pivot point 72 in one direction while allowing such rotation in the opposite direction.

Of course, if desired, the shape and/or curvature of the wings 73 can be varied to permit more or less rotation about the pivot point 72. In some cases, it may be desirable to vary the shape and/or curvature of only some of the wings 73. For example, wings 73 that permit greater bending can be used at or along sections of the band 12 (e.g., the sections disposed along the sides of the wrist) where more curvature is desirable.

In some cases, the spacing between the pivot points 72 may be adjusted to control (e.g., adjust) the minimum radius of curvature at which the band 12 can be bent, and, in turn, provide a more comfortable oval-shaped band 12 when worn (in contrast to a less comfortable circular-shaped band 12). As shown in FIG. 40, the spacing between the pivot points 72 can be different at different points along the band 12. In other words, the pivot points 72 in one section of the band 12 may be a distance of d1 apart from one another, while the pivot points 72 in another section of the band 12 may be a distance of d2 apart from one another, d2 being greater or less than d1. For example, the spacing between pivot point 72A and 72B ($S_1$ in FIGS. 40 and 41) is less than the spacing between pivot point 72C and 72D ($S_2$ in FIGS. 40 and 41). As such, different sections of the band 12 (e.g., the sections disposed along the sides of the wrist) can be bent or flexed more than other portions of the band 12 (e.g., the sections disposed along the top and the bottom of the wrist), thereby facilitating the formation of a more oval-shaped band 12, as illustrated in FIG. 41.

As shown in FIG. 42, the interconnected bars 74 and 75 can be arched or curved. As illustrated in FIG. 43, such a configuration serves to reduce, or even eliminate, the sharpness of the bending at the pivot points 72, thereby providing a more continuous shape when the band 12 is bent. In some cases, it may be desirable to arch the bars 74 and 75 so that the local display bending radii at the pivot points 72 are equal and opposite when the band 12 is both flat and bent (e.g., disposed around the wrist).

In some instances, it may be desirable to limit the number of configurations that the device 10 can take on, such as, for example, cheap-looking configurations, configurations that provide a confusing user experience, or configurations in which the device 10 is likely to be damaged. To this end, one or more of the pivot points can be connected together with or using an interconnecting wire. As shown in FIG. 44, the pivot points 72 are connected together with or using an interconnecting wire 68. In some cases, several interconnecting wires 68 may be needed to connect different groups of pivot points 72. For example, one wire 68 may be utilized to interconnect pivot points 72 disposed along one side of the band 12, while another wire 68 may be utilized to interconnect pivot points 72 disposed along the opposite side of the band 12. In any event, the interconnecting wire(s) 68 serve(s) to synchronize the movement of the pivot points 72 that are connected to one another, which, in turn, fixes the angle between interconnected bars 74 and 75 for those pivot points 72 that are connected together.

Figure 45:
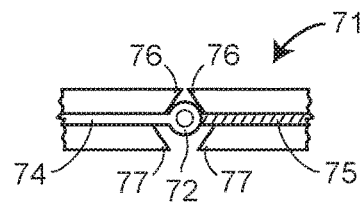

In FIG. 45, interconnected bars 74 and 75 are connected at pivot points 72 and each includes a protrusion 76 that extends at least partially above the pivot point 72. In this case, the protrusions of adjacent bars 74 and 75 contact each other very soon (in response to minimal rotation about the pivot point 72) when rotated in one direction, to thereby limit or prevent such rotation, and allow rotation in the opposite direction. Moreover, the interconnected bars 74 and 75 may additionally include protrusions 77 that extend below the pivot point 72 but that are spaced further apart and thus allow more rotation than the protrusions 76. The protrusions 77 will thus enable the member 71 to bend in one direction (i.e., the down direction in FIG. 41) more than in the other direction (i.e., the up direction in FIG. 45). However, the protrusions 77 will still prevent bending or flexing at large angles of curvature and the spacing and interaction of the protrusions 76 and 77 can be configured to limit the minimal bending radius of the support element 71 to the greater than or equal to the minimum critical bending radius of the flexible electronic display 18 disposed on the support element 71, to thereby protect the flexible electronic display 18. In any event, the spacing and size of the protrusions 76 and 77 can be adjusted to obtain the desired amount of flexing in each direction.

Figure 46:
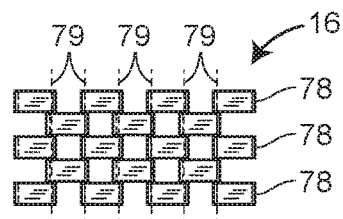
FIG. 46 illustrates a top view of a bending or flexing limiting structure forming a flexible support, formed as a series of transversely interconnected longitudinal members, each longitudinal member made up of a set of longitudinally disposed links.

Still further, FIG. 46 illustrates a top view of a bending or flexing limiting structure forming a flexible support, formed as a series of transversely interconnected longitudinal members 78, each longitudinal member made up of a set of longitudinally disposed links. Here, the various sets of rotatably interconnected links are rotatably interconnected by pivot members disposed along the dotted lines 79 of FIG. 46. The various sets of links as illustrated in FIG. 46 may be used as or may be part of the flexible support 16, and may operate to limit the bending motion of the flexible support 16 in each of the longitudinal, counter-rotational and torsional directions described above. Of course, the interconnected links illustrated in FIG. 46 could additionally have wing or protrusion structure such as that of FIGS. 39, 40, 41, 44 and 45, or other structure that limits rotation of adjacent links about the transverse pivot points 79 interconnecting the links, to provide superior bending or flexing limiting structure.

Figure 47:
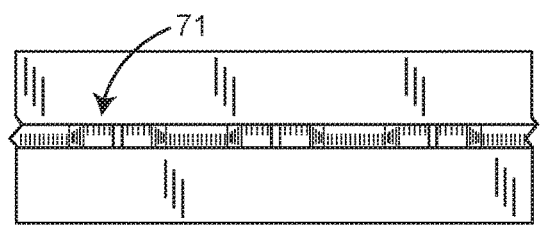
FIG. 47 illustrates a top view of a flexible support of a wristband device having bending limiting structure of any of FIGS. 39-45 disposed therein.

In any event, the configuration of the members 71 of FIGS. 39-46 allow or enable movement of the adjacent slats or flat members 74, 75 and 78 with respect to one another in one direction, e.g., the down direction in FIGS. 39 and 40, limited to a particular minimum bending radius, while limiting the rotational movement of the slats or bars 74 and 75 in the opposite direction, such as the up direction in FIGS. 39 and 40, to the same or a different minimum bending radius. In this case, the member 71 with the alternating flat members 74 and flat members 75 or the interconnected support of FIG. 46 may be disposed along a longitudinal axis or in the longitudinal direction of the support 16, as illustrated in FIG. 47, to allow the bending motion illustrated in FIGS. 2 and 4 while limiting counter rotational bending motion. While only one member 71 is illustrated in FIG. 47 as being disposed longitudinally in the center of the flexible support 16, more such members could be disposed at other locations along the length of the flat support 16, such as on either or both lateral sides of the support 16. Moreover, while only one member 71 is illustrated in FIG. 47, multiple such members could be used to limit the counter-rotational movement of the flexible support 16. Of course, if desired, a bending limiting member similar to that of FIGS. 39 and 40 could be disposed along the edge of the flexible support 16 instead of or in addition to the wire 60 of FIG. 26, so as to both protect the edge of the flexible display 18 (by providing a rigid or semi-rigid structure at the edges of the display 18) and to limit the counter-rotational movement of the flexible support 16, while allowing some rotational movement of the support 16 in the manners described herein. Thus, for example, in FIG. 26, the wire 60 could be replaced with a series of links forming a bar member 71 in accordance with the principles of FIG. 39 or 40, for example, wherein the links 74 and 75 are rotationally connected to one another and are disposed such that they allow rotation or movement in one direction a certain amount while not allowing or at least limiting movement relative to one another in the other direction. Of course, the flat interconnected longitudinal members of FIGS. 39 and 40 could be used in conjunction with the slats or bars of FIG.

31 to limit both the torsional and the counter rotational movement of the flat support 16 in the manners described above.

Figure 48:
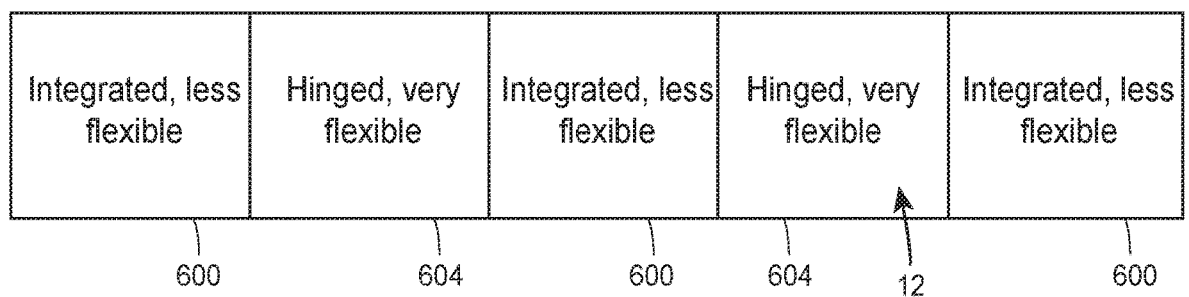
FIG. 48 illustrates a top view of a flexible support of a wristband that includes a combination of uniformly constructed portions and hinged portions with each portion have a different flexibility from an adjacent portion, to provide a support for a flexible electronic display that includes various different bending characteristics at different locations or sections of the flexible support.

In the embodiment illustrated in FIG. 48, the band 12 includes or is formed of one or more monolithically integrated, less flexible portions 600 combined with one or more hinged, more flexible portions 604. In other words, the band 12 depicted in FIG. 48 can include one or more portions constructed in accordance with different configurations of any one of the bands 12 described herein to provide generally uniformly constructed or configured bending structure at different portions or sections of the band.

Generally speaking, the position of the less flexible portions 600 corresponds to portions of the article 10 where the required amount of flexing is limited (e.g., the portions of the article 10 disposed on the top and bottom of a wrist), while the position of the more flexible portions 604 corresponds to portions of the article 10 where the required amount of flexing is greater (e.g., the portions of the article 10 disposed adjacent the sides of the wrist). In any event, as illustrated in FIG. 48, the band or support member 16 can have any number of different sections of portions that allow or enable more or less bending (e.g., that have different minimum radii of curvature in either or both the rotational and counter-rotational directions) to effectuate different degrees of bending in these directions.

Importantly, it is desirable to maximize the amount of the electronic display 18 that is continuously viewable to a user when, for example, the user has the band device 10 mounted on the user's wrist. To do so, the device 10 may be configured to cause the connection between and/or the overlap of the ends 14 of the band 12 to fall in a region that is near or adjacent to the outer side or edge of the user's wrist (i.e., the edge of the user's wrist that is on the side of the hand at which the pinky finger is located). Generally speaking, when the band 12 is disposed around a user's wrist, the flexible electronics display 18 forms a continuous display around the wrist from one end to the other end (when the ends 14 of the band 12 attach end-to-end) or from one end to a position at which one side of the band begins to overlap the other side of band (when the ends 14 of the band 12 overlap). It is desirable to place the discontinuity in the flexible electronics display 18 at the outer side of the user's wrist so that the flexible electronic display 18 is continuous through the portions of the band disposed near the top of the wrist, the inner side of the wrist and the bottom of the wrist (i.e., so that the discontinuity of the electronic display 18 caused by the connection of the ends of the band or the overlap of the ends of band falls at a position adjacent to the outer wrist of the user). When configured in this manner, the user may view a continuous display, i.e., one without a discontinuity caused by the ends of the band, as the user looks at the band at the top of his or her wrist (i.e., when the user's palm is facing downwardly), and as the user turns his or her wrist over to cause the user's palm to face upwardly. During this motion, the user views the display adjacent the top of the user's wrist, the display adjacent the inside of the user's wrist (on the index finger side of the hand), and the display adjacent the bottom of the user's wrist (on the same side of the wrist as the user's palm). As this is a natural range of motion of the user's wrist, it is desirable to provide a continuous display to the user during this motion.

To provide this maximal continuous usable display to the user, the device 10 may be configured to have a fixed position of the band that is to be placed adjacent to a fixed position of a user's wrist, such as on the top of the user's wrist. In this case, the ends of the band are sized or spaced from this fixed position to overlap or connect at a position that will end up being adjacent to the user's outer wrist when the band is disposed on or wrapped around the user's wrist. The outer wrist or outside of the wrist, in this case, may be defined by any position that is substantially within a particular quarter of the circumference of a circle, oval, or ellipse defined around a user's wrist, with the particular quarter being centered at the middle of the outer side of the user's wrist.

Figure 49A:
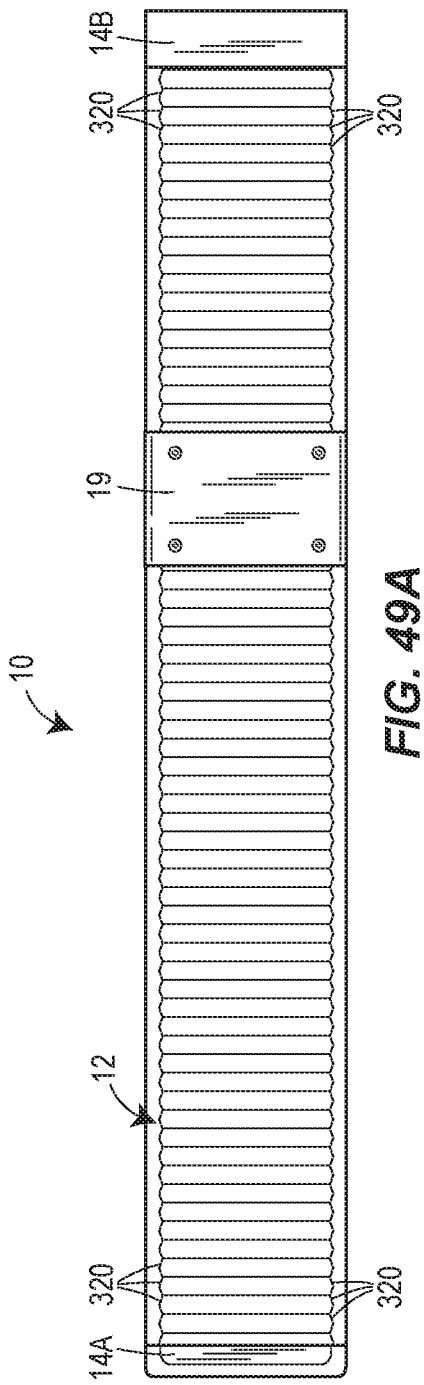
FIGS. 49A-49C illustrate a bottom view, a side view and a top view, respectively, of a wristband device configured to provide maximal continuous display surface to a user when wearing the band.
Figure 49B:
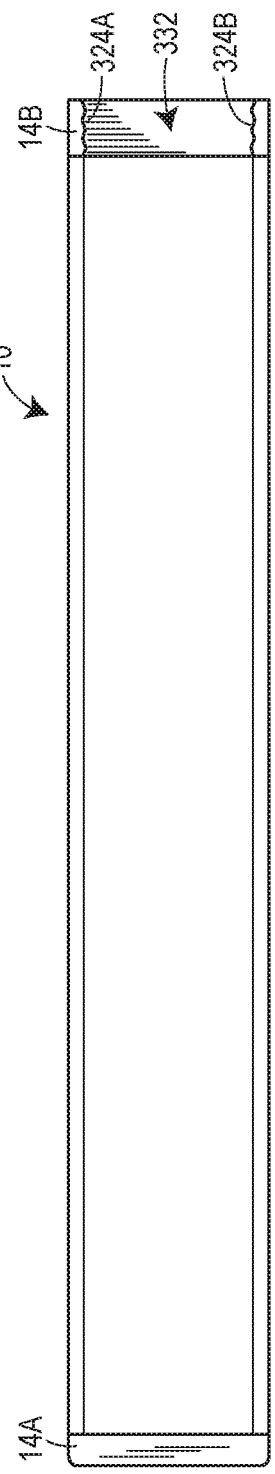
Figure 49C:
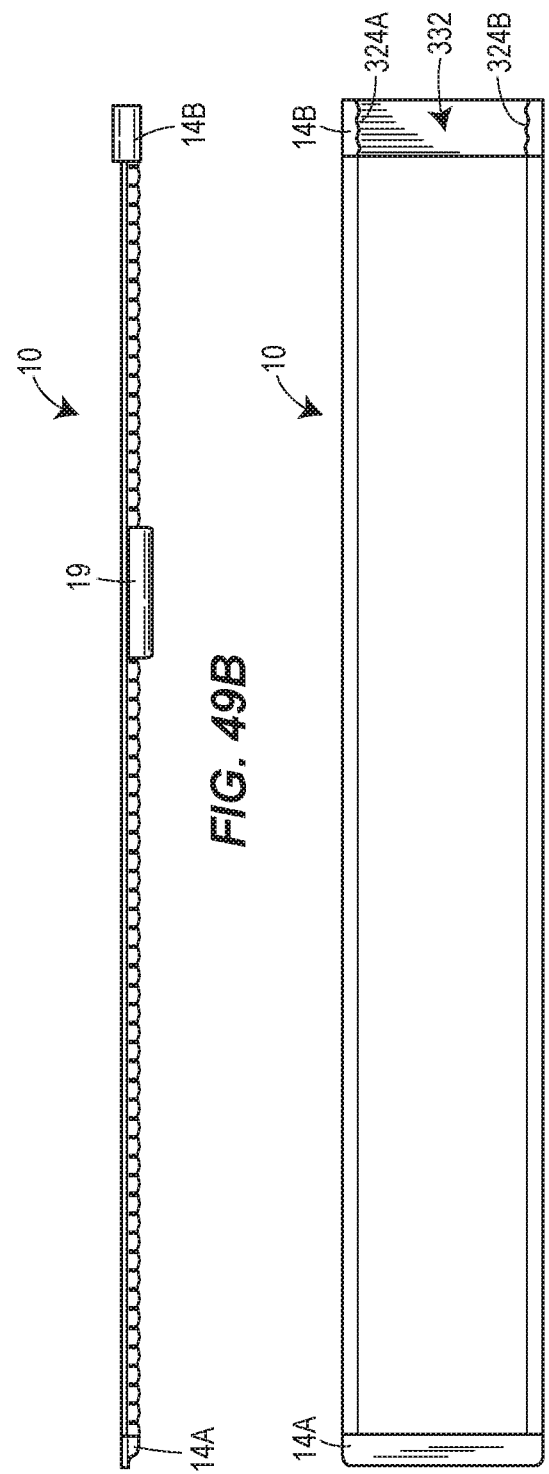

FIGS. 49A-49C, 50A, 50B, 51, 52A-52C, and 53 illustrate one embodiment of the band device 10 which provides for a maximal continuous usable display surface by assuring that the discontinuity in the electronic display falls at a position adjacent to the user's outer wrist. In particular, the device 10 illustrated in FIGS. 49A-C includes a band 12 extending between two end pieces 14A and 14B which may be metal, plastic or other material that provides a pleasing look. An electronics module 19 having an exterior casing or cover is disposed on the band 12 at a position between the two end pieces 14A and 14B, but is not centered between the two end pieces 14A and 14B. In particular, the electronics module 19 is disposed closer to one end piece 14B than the other end piece 14A. FIG. 49C illustrates a top view of the device 10 showing a continuous flexible electronic display 18 extending between the two end pieces 14a and 14B. In this configuration, the end pieces 14A and 14B form at least a portion of a connection or clasping mechanism that is similar in nature to that described with respect to FIGS. 11-14. As such, and as illustrated in FIG. 49A (depicting a bottom view of the device 10), notches or grooves 320 are formed into the transverse edges of a lower portion of the band 12 and these notches or grooves 320 are received in a mating structure 332 formed in one of the end pieces 14B (as illustrated in FIG. 49C).

Figure 50A:
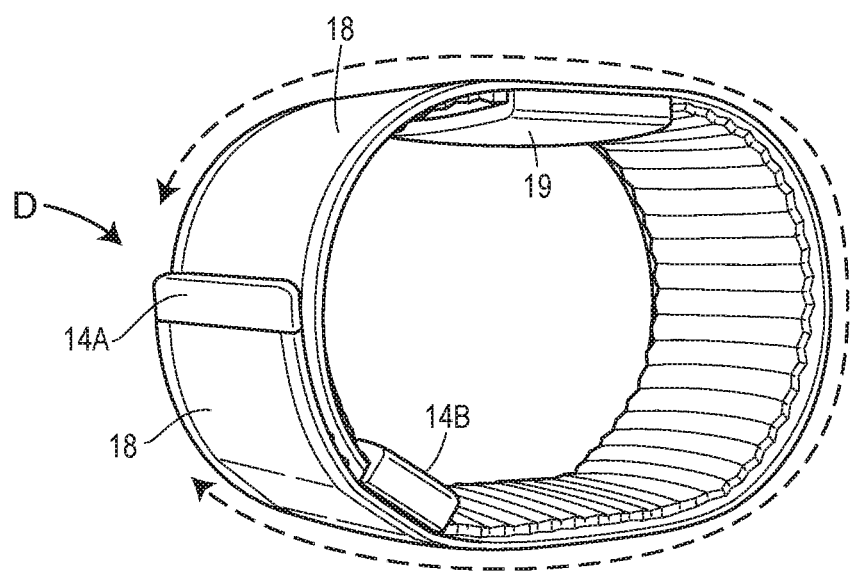
FIG. 50A illustrates the band of FIG. 49 when the ends thereof are connected together to form a maximal continuous display surface for a user.
Figure 50B:
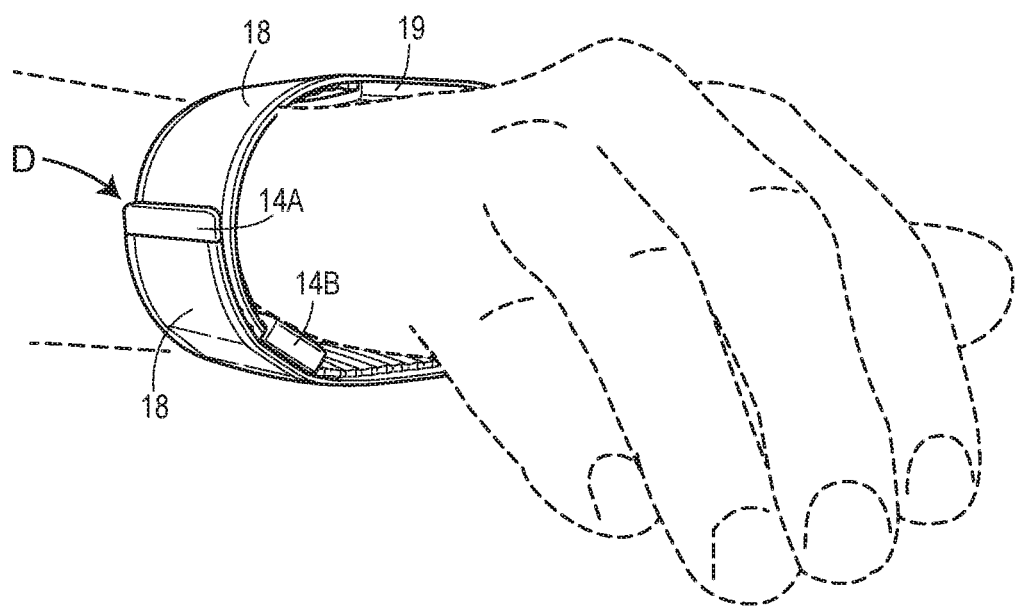
FIG. 50B illustrates the band of FIG. 50A when connected around a user's wrist.
Figure 50C:
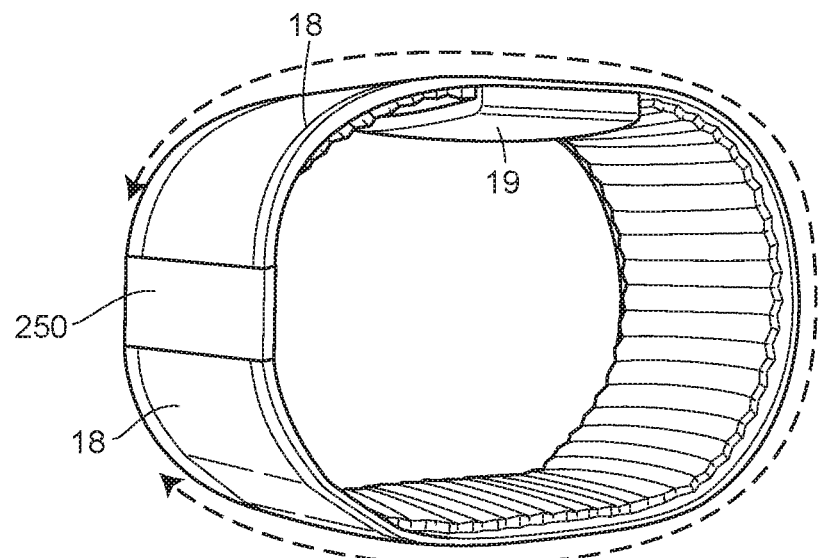
FIG. 50C illustrates a wristband device including one extender that increases a length of the device and connects the ends of the wristband device together in an end-to-end manner so as to provide maximal continuous display surface to a user when wearing the band.
Figure 50D:
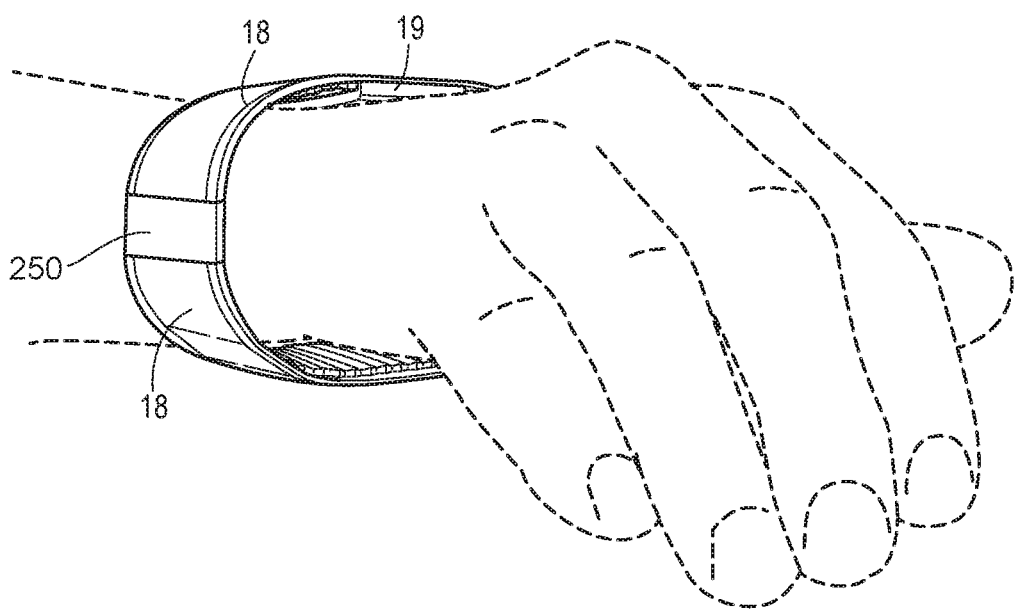
FIG. 50D illustrates the band of FIG. 50C when connected around a user's wrist.

In this case, the electronics module 19 (or the cover associated with that module) acts as a reference mark or reference location that is to be placed at a particular position on a user's wrist, in this case, on the top of a user's wrist. When so placed, the sections of the band 12 extending out from the module 19 are sized to overlap at a position adjacent to the outer side of the wrist of the user. FIGS. 50A and 50B illustrate the band device 10 of FIGS. 49A-C flexed to overlap, with the connection structure on the end 14B being used to hold or attach the ends together. Here, as illustrated by a user's wrist in dotted relief in FIG. 50B, the ends of the band 12 overlap or come together on the outer side of the user's wrist. As such, the flexible electronic display 18 forms a continuous display from the top of the wrist, through the inner side of the wrist to the bottom of the wrist as illustrated by the arrow in FIG. 50A. This continuous usable display enables a user to view a long continuous screen or multiple serial display screens disposed next to one another on the display 18 without there being any discontinuity in the display of these screens, as the user turns his or her wrist between a palm up and a palm down position or vice versa. While the illustration of FIGS. 50A and 50B depict the band device 10 on a right wrist of a user, the band device 10 could be similarly placed on the left wrist with the module 19 still adjacent to the top of the wrist and the ends of the band 12 overlapping on the outer side of the wrist. FIGS. 50C and 50D illustrate the band device 10 having one extender 250 removably coupled to the ends 14A and 14B of the band 12 and configured to connect the ends 14A, 14B of the band 12 together in an end-to-end manner, thereby eliminating the discontinuity present in FIGS. 50A and 50B. Here, as illustrated by a user's wrist in dotted relief in FIG. 50D, the position of the extender 250 corresponds (e.g., is adjacent) to the outer side of the user's wrist. As such, the flexible electronic display 18 forms a continuous display from the top of the wrist, through the inner side of the wrist to the bottom of the wrist as illustrated by the arrow in FIG. 50C. This continuous usable display enables a user to view a long continuous screen or multiple serial display screens disposed next to one another on the display 18 without there being any discontinuity in the display of these screens, as the user turns his or her wrist between a palm up and a palm down position or vice versa. While the illustration of FIGS. 50C and 50D depict the band device 10 on a right wrist of a user, the band device 10 could be similarly placed on the left wrist with the module 19 still adjacent to the top of the wrist and the ends of the band 12 connected via the extender 250 on the outer side of the wrist.

Figure 51:
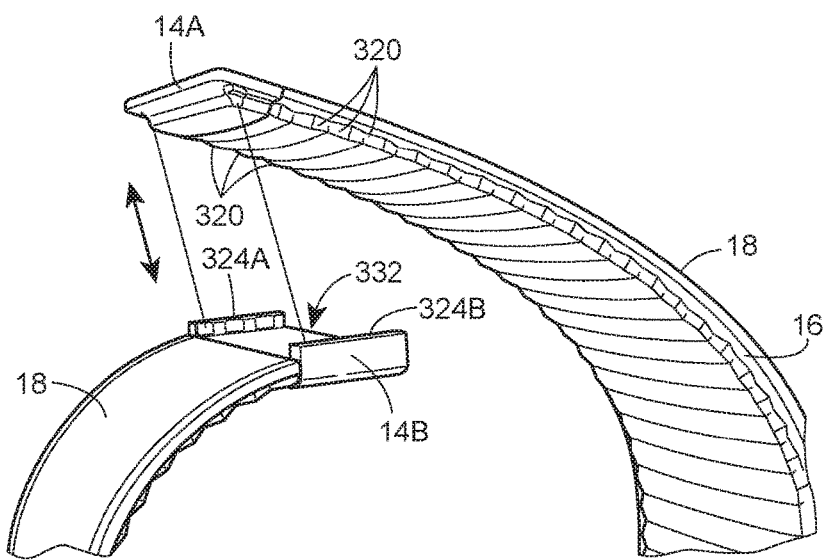
FIG. 51 illustrates in more detail the manner in which the clasp structure of the band of FIG. 49 operates.

FIG. 51 illustrates in more detail the manner in which the end pieces 14A and 14B operate to enable the opposite ends of side of the band 12 to be coupled together. In particular, as illustrated in FIG. 51, the lower end clasp 14B includes a receiving area 332 and notches or grooves 324A and 324B (as described with respect to FIG. 11) to accept a portion of the band 12 from the other end 14A of the band 12 therein. Here, the notice 320 in the band 12 or in the end piece 14A may interact with or fit into the notches 324A and 324B of the end piece 14B to provide a frictional force that holds the ends of the band 12 from moving laterally with respect to one another. Of course, the size or inner circumference of the device 10 can be adjusted by using different ones of the notches 320 on the band near the end 14A. Additionally, as described in earlier embodiments, magnets (not shown in FIGS. 49-51) may be disposed in the end pieces 14A and/or 14B and/or in the ends of the band 12 adjacent to the end pieces 14A and/or 14B to enable or provide a magnetic connection between the ends of the band 12 when the opposite ends 14A and 14B of the band 12 are disposed in an overlapping manner. The magnets may provide an attractive force between the ends of the band 12 to help prevent the ends of the band 12 from moving away from one another in the direction of the arrow in FIG. 51.

Figures 52A, 52B, 52C:
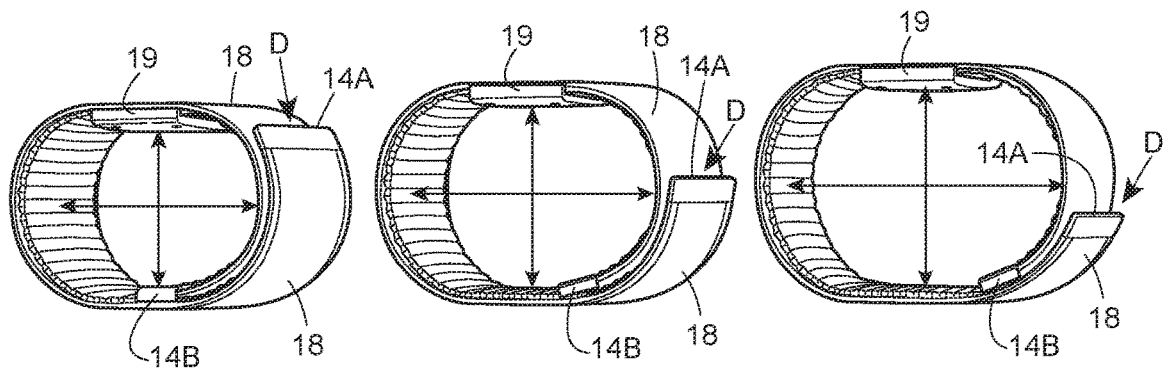
FIGS. 52A-52C depict the band of FIG. 49 adjusted to fit various different sized wrists to illustrate the positioning of the band overlap with respect to a user's wrist while providing maximal continuous useable display surface area to the user.

FIGS. 52A-52C illustrate the device 10 of FIGS. 49-51 disposed in three different overlapping band positions to illustrate that this device 10 can take on or be adjusted to various different sizes while still providing a flexible electronic display 18 with maximal continuous usable surface area. In this case, the band 12 is approximately 246 mm long, when laid out flat. As will be noted, by coupling the ends 14A and 14B of the band 12 together at different locations, the band device 10 can take on different sizes which may accommodate different sized wrists. For example, in each of the configurations of FIGS. 52A-52C, the inner side of the band device 10 generally forms an oval with different dimensions. In this example case, the smaller band device configuration of FIG. 52A includes a smaller dimension of 35.5 mm (measured from the electronics module 19 across to the band 12) and a larger dimension of 62 mm (from one inner side of the band device 10 to the other inner side of the band device 10). In similar manners, the medium sized band device configuration of FIG. 52B includes a smaller dimension of 41.5 mm and a larger dimension of 69 mm while the large sized band device configuration of FIG. 52C includes a smaller dimension of 45 mm and a larger dimension of 73 mm. In each of these cases, the discontinuity D in the band device 10 (illustrated as the point at which the end 14A of the band begins to overlap the portion of the band below it) is disposed adjacent to the side of the user's wrist and, in particular, the outer side of the user's wrist (as shown in FIG. 50B). Moreover, as can be seen, the band 12 could be adjusted further to be smaller or larger in size and, in most cases the discontinuity D in the band will lie adjacent to the outer side of the wrist.

Figures 52D, 52E, 52F:
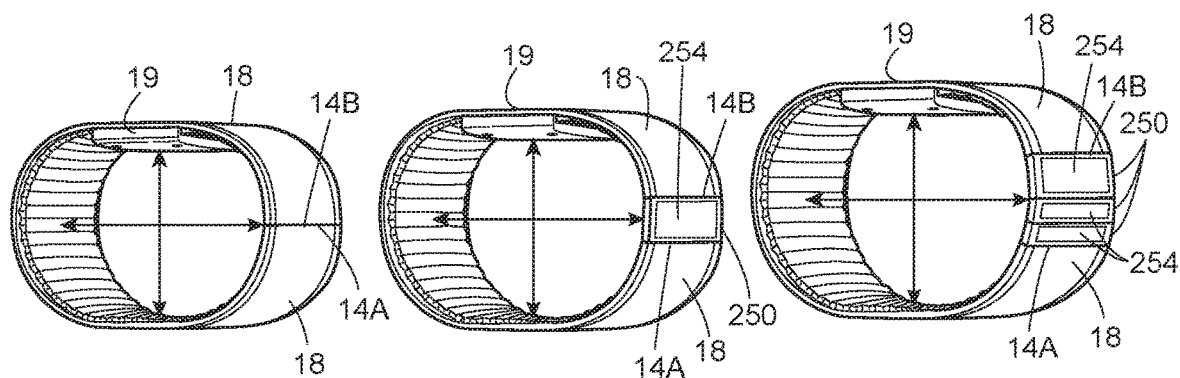
FIGS. 52D-52F illustrate a wristband device adjusted to fit various different sized wrists but still providing a maximal continuous useable display surface area to the user

FIGS. 52D-52F illustrate that a length of the device 10, and in turn the size of the device 10, can be adjusted while still providing a flexible electronic display 18 with maximal continuous usable surface area. The device 10 illustrated in FIG. 52D does not include any extenders 250, such that the device 10 has its standard or normal length. The device illustrated in FIG. 52E includes one extender 250, which serves to increase the length of the device 10 and, in turn, creates a more-oval or flatter shaped device 10 than the device 10 in FIG. 52D when in the folded position. The device illustrated in FIG. 52F includes three extenders 250, each having a different size. The two additional extenders 250 serve to further increase the length of the device 10, thereby creating an even more-oval or flatter shaped device 10 than the device 10 in FIG. 52E when in the folded position. In FIGS. 52E and 52F, the position of the extender (s) 250 substantially corresponds (e.g., is adjacent) to the side of the user's wrist and, in particular, the outer side of the user's wrist. As such, the flexible display 18 continues to provide a continuous display from the top of the wrist, through the inner side of the wrist to the bottom of the wrist, while at the same time the device 10 can be adjusted to be smaller or larger in size.

Figure 53:
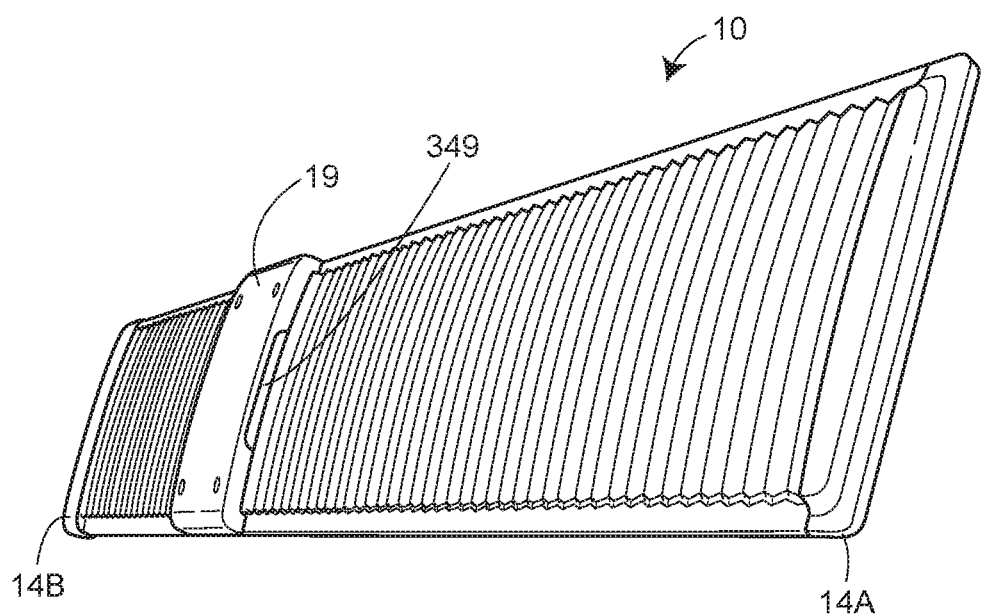
FIG. 53 is a perspective view of the band of FIG. 49 laid out in a flat configuration.

For the sake of completeness, FIG. 53 illustrates the back of the device 10 of FIGS. 49A-49C, 50A, 50B, 51, and 52A-52C, when the band 12 of the device 10 is laid out flat or straight. As can be easily seen in FIG. 53, the electronics module 19 sticks up (or down) from the surface of the band 12 and thus provides a tactile sensation to the user when the user wears the band. This feature, in turn, makes using the module 19 as the reference point for the user when placing the band on the user's wrist more natural, as the user can feel the presence of the module 19 in the correct location on the top (or bottom) of his or her wrist, and thus will know that the band is properly aligned on the wrist to provide for a maximal continuous usable display surface in the manner described above. Still further, as illustrated in FIG. 53, the electronics module 19 may have a single or multiple contact points 349 that may be used to charge a battery (not shown) disposed within the electronics module 19, or to provide other communications between the electronics module 19 and another device such as a base station or a base unit.

Figure 54:
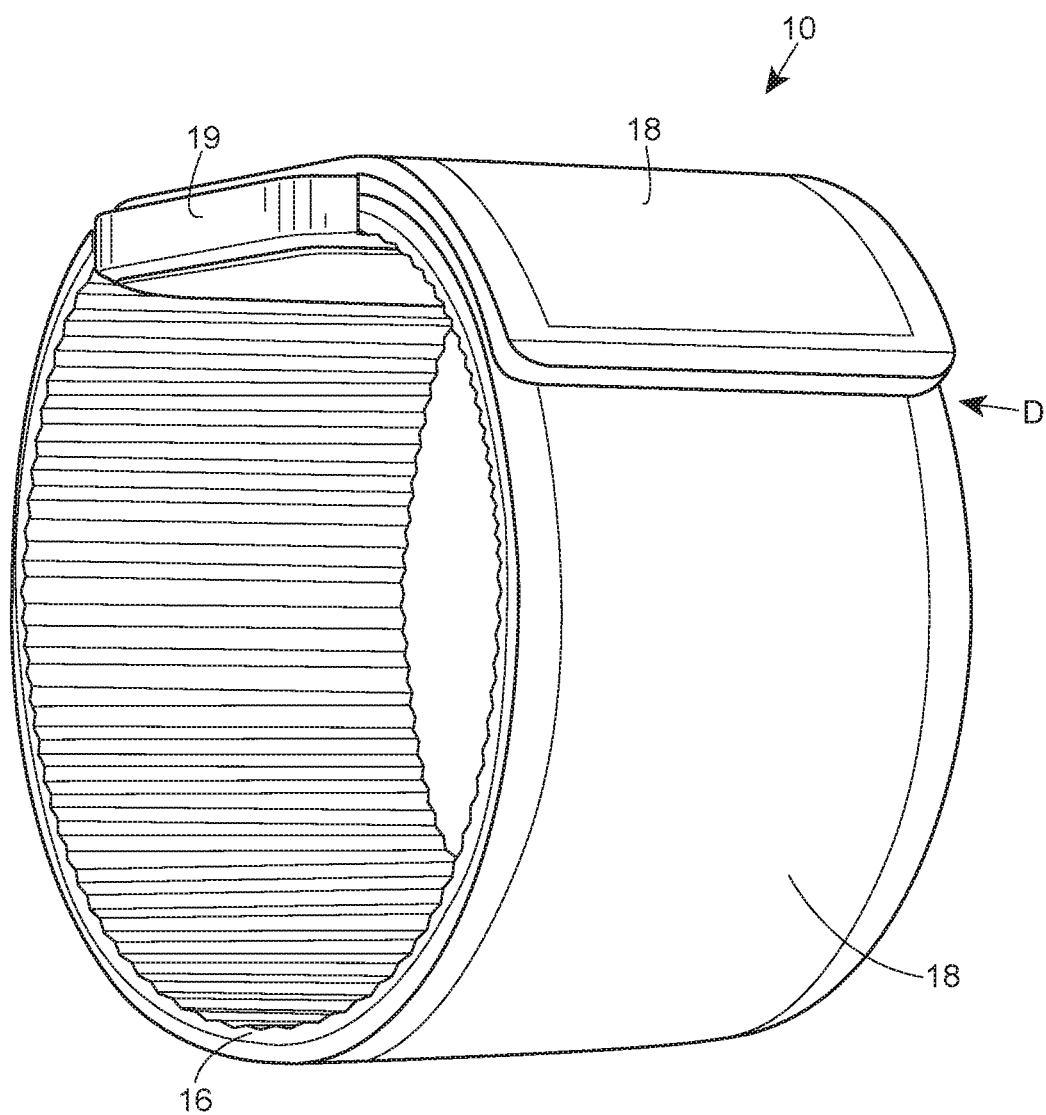
FIG. 54 depicts a further configuration of a band similar to that of FIG. 14, having an electronics module disposed on one end and that is configured to provide maximal continuous display surface to a user when wearing the band.

FIG. 54 illustrates the embodiment of FIGS. 11-14 in more detail to illustrate another example of a band device 10 configured to have a maximal continuous usable display surface by having the clasping or overlapping portions of the band 12 disposed adjacent a side of a user's wrist, such as the outer side of the user's wrist. In this case, the electronics module 19 is disposed on one end of the band 12, but still operates as a reference member or point that is to be located as a particular position on the user's wrist, such as on the top or the bottom of the user's wrist. As illustrated in FIG. 54, when so located, the ends of the band 12 overlap to create a discontinuity D on the side of the device 10 that is adjacent to the outer (or inner) side of the user's wrist. Moreover, further adjustment of the band 12 in the embodiment of FIG. 54 to make the band 12 configured to be smaller will still place the overlapping ends of the band 12 and thus the discontinuity D of the band device 10 on a side of the user's wrist.

While in FIGS. 50-54 the electronics module 19 is described as serving as a reference member or point, the device 10 can provide or have additional or different reference members, reference points, or other reference guidance. The reference guidance could, for example, take the form of a visible mark on the band 99 (e.g., a printed mark), a weighted element attached to the band 99. Further still, the reference guidance could be provided on or via the flexible display 18. For example, the flexible display 18 may provide the outline of a user's wrist as reference guidance for the user when attaching the device 10 to his/her wrist.

While the article 10 of FIGS. 1-54 is generally illustrated as having a flexible electronic display, other flexible electronic components, such as for example a flexible OLED light, a flexible electronic circuit, a sensor tag, a collapsible e-reader, a roll-out screen, a solar cell array, a sensor array, other type of flexible sheet or screen, or other flexible electronic component, could be used instead of a flexible electronic display. Further yet, while the article 10 of FIGS. 1-54 is generally illustrated as having some sort of connection mechanism or structure, the flexible electronic display or other type of flexible electronic component (e.g., the flexible OLED light) may or may not include such a connection mechanism or structure.

Figure 55:
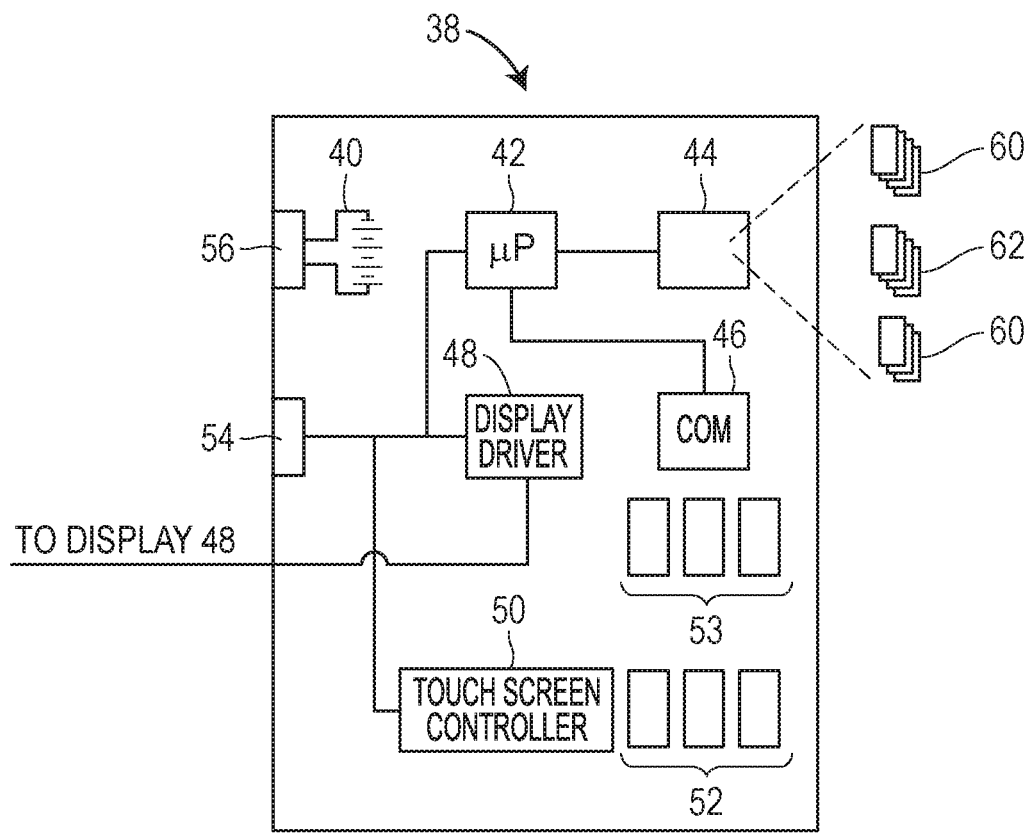
FIG. 55 is a block diagram of an electronics module associated with the attachable articles described herein.

FIG. 55 illustrates a block diagram of various electronic components, referred to herein as an electronics suite 38, that may be used in or disposed in the electronics module 19 of any of the attachable articles and/or any of the extenders described herein to drive the dynamically flexible, attachable article or device 10. In particular, the electronics suite 38 illustrated in FIG. 55 includes a battery 40 that powers a number of other modules or electronic components including a microprocessor or other processor 42, a computer readable memory 44, which may be, for example, a flash memory or other suitable type of non-transitory, tangible, data storage medium, a communication module 46, a display driver 48, a touch screen controller 50 and a number of sensors 52 and other secondary devices 53. The sensors 52 may include, for example, an impact sensor or step counter, one or more gyroscopic sensors or gyroscopes, temperature sensors, vibration sensors, pulse rate monitors, pressure sensors, strain gauges, etc. For example, the sensors 52 may include any number of any number of types of sensors, such as strain gauges, gyroscopes, accelerometers, compression sensors, tensional strain sensors, positional sensors, motion or movement sensors, pressure sensors, vibration sensors, temperature sensors, orientation sensors, gravity sensors, light sensors, and piezoelectric sensors, to name a few. The secondary electronic devices 53 may include, for example, an alarm or noise creation device, a speaker, a microphone, a vibrator the operation of which causes the clasp 14 or electronics module 19 to vibrate, etc. Although FIG. 55 illustrates the sensors 52 and the secondary electronic devices 53 as being integral with the electronics suite 38, in some cases, one or more of the sensors 52 and/or the secondary electronic devices 53 are physically disposed at one or more other locations along the band 12 separate from the remainder of the electronics suite 38. In these cases, though, the separately disposed sensors 52 and/or secondary electronic devices 53 remain in communicative connection with the remainder of the electronics suite 38 (e.g., via a wired or wireless connection).

Similarly, although FIG. 55 illustrates the display driver 48 as being integral with the electronics suite 38, in some cases, the display driver 48 is physically disposed at another location separate from the remainder of the electronics suite 38. In an example, the display driver 48 is disposed in a location that is proximate to the electrodes or connectors of the pixel elements of the flexible electronic display 18, e.g., on the backplane of the flexible display 18 or at some other suitable location. The separately located display driver 48, though, remains in communicative connection with the remainder of the electronics suite 38 (e.g., via a wired or wireless connection) despite of the remote locations.

As will be understood, the memory 44, the communication module 46, the display driver 48 and the touch screen controller 50, as well as the sensors 52 and other secondary electronic devices 53, are communicatively connected to the processor 42 and may operate to perform various functions in conjunction with applications or other programs implemented by the processor 42. Still further, each of these elements is connected to and is powered by the battery 40 in any known or desired manner. Still further, the electronics suite 38 of FIG. 55 may include one or more communication ports, such as communication port 54 (e.g., a USB or other type of digital communication port) and a power or battery charger input port 56. In this case, the power input port 56 may be connected to the battery 40 and enable charging or recharging of the battery 40 using any known or desired recharging circuitry and methodology. Alternatively or in addition, the communications input port 54 (in the form of for example, a USB input port) may be connected to the battery 40 and provide power to the battery 40 for charging battery 40, and the input port 54 may also be connected to the microprocessor 42, as well as to the communication circuit module 46, for performing wired-based communications via the input port 54. Of course, the communication input port 54, while being illustrated as a USB-type connection, could any other type of known wired or physical communication connection, including any desired serial or parallel digital communication port using any number of pins or wires, as is known in the art, an analog communication port, etc. Additionally or alternatively, the input port 54 may include a wireless input port for performing wireless communications.

In an embodiment, the power input port 56 may be a wireless input port for powering the article 10, and in this case may, for example, be part of a battery charger unit that operates to charge the battery 40 using, for example, an inductively coupled charging technique. If the battery charger unit is part of an inductively coupled charging system, it generally responds to electromagnetic waves produced by an exterior charging unit (not shown) to charge the battery 40 when the attachable article 10 is disposed near the external charging unit. In another case, the battery charger of the input port 56 may be a kinetic energy charger unit that converts motion of the device 10 (such as that associated with movement of an arm when the attachable electronic device 10 is in the form of a wristband) into electrical energy which is provided to charge the battery 40.

As will be understood, the processor 42, which may be a programmable, general-purpose processor or a specially programmed processor programmed using any desired type of hardware or firmware programming, generally coordinates and implements the operation of the display 18 and the associated electronic components as described in more detail herein. The computer readable memory 44 stores various applications, including for example the general operating system implemented by the processor 42, and various applications (illustrated as a set of applications 60 in FIG. 55) to be run on the processor 42 to implement various different types of functionality via the device 10, some of which will be described in more detail herein. The memory 44 may also store one or more data files 62, which may be, for example, image or video data files associated with various images to be displayed on the display screen 18 at various different times. Still further, the memory 44 may store application data that may be created by the various applications 60 or the microprocessor 42 as part of the operation of various applications 60 and to be used by those applications 60 either during runtime of the applications 60 or at other times. If desired, the microprocessor 42 or one of the secondary electronic components 53 may include or be a clock that tracks the current time, day, date, month, year, time zone, etc.

As an example, one or more of the applications 60 may implement various functionalities typically associated with standard computers or other types of electronic devices such as personal handheld electronic devices, including for example an e-mail application, an Internet or web-browsing application, an alarm clock application, a calendar application, a music-playing application such as an MP3 application, a video application, a digital picture slideshow application, a mapping application, an e-reading application which may provide books, notes, magazines or other types of articles, for reading by the user, etc. Still further, one or more of the applications 60 may operate on the processor 42 to turn the display 18 associated with the dynamically flexible, attachable device 10 into a slave display device that may be tied to or communicably coupled to an exterior master device that is generating content to be displayed via the flexible display 18. The master device, which may be a smart phone or a nearby computer device, may be wirelessly connected to the electronics suite 38 to provide content to be displayed on the flexible display 18 and will typically have more memory, and computing and processing power than the processor 42.

The communication module 46 of FIG. 55 may include or use any type of communication hardware/software/firmware that uses any desired types of communication techniques to enable the microprocessor 42 to communicate with exterior devices or sources. Of course, the communication module 46 could include multiple different types of communication hardware/software/firmware, including any kind of hard-wire-based communication module or wireless-based communication module. As examples, the communication module 46 may be a wired or wireless Internet-based communication module that may provide wired or wireless-based, IP protocol communications between the dynamically flexible, attachable article or device 10 and other devices or a communication network such as a LAN or a WAN to which other devices are communicatively connected. Likewise, the communication module 46 may include a near field communications (NFC) module, a radio frequency identification (RFID) communications module for communicating with, sending messages to and/or receiving messages from RFID tags stored in other devices around or close to the device 10. In this case, the communications module 46 may decode signals received from RFID tags in response to pings by the RFID communication module 46 to identify the RFID tags or tag numbers (identifiers) associated with these devices. Likewise, the communication module 46 may be a near field communication (NFC) module or a Bluetooth communication module, which may perform near field communications or Bluetooth communications in any known or desired manner with nearby NFC or Bluetooth enabled devices, thereby enabling wireless communication between the device 10 and other closely situated or closely located electronic devices. Still further, the communications module 46 may include a USB or other type of wired communication module for decoding and encoding USB-based communication signals to be sent out and received via the USB communication port 54.

As illustrated in FIG. 55, the display driver 48 is coupled to the microprocessor 42 and to the display 18, and drives the display 18 to present different images to a user and thus implement functionality via the display 18. The display driver 48 may be associated with or use any type of display driver technology associated with the various different types of flexible displays that might be used, including, for example, e-ink or other bi-stable display drivers, organic light emitting diode (OLED) display drivers, etc. Of course, it will be understood that the display driver 48 is connected to the various pixel elements or pixels of the flexible display 18 to cause the pixel elements to change their visual appearance so as to present content image on the flexible display 18. Typically, but not necessarily, each pixel element is communicatively connected to two electrodes, lead lines, connecting lines, or connectors corresponding the (x, y) coordinates of the particular pixel element on the flexible display 18. Thus, the display driver 48 provides image content (e.g., by using electrical signals or other suitable signals) to a set of connecting lines corresponding to a width of the flexible display 18 or its display area (and, in some cases, physically emanating from a width edge or transverse side of the flexible display 18 to the driver 48), and the same display driver 48 may provide image content (e.g., by using electrical signals or other suitable signals) to another set of connecting lines corresponding to a length of the flexible display 18 (and, in some cases, physically emanating from a length edge or longitudinal side of the flexible display 18 to connect to the driver 48). In an example, the display driver 48 provides image content to a set of transverse connecting lines and/or to a set of longitudinal connecting lines so that image content is presented on the display area of the flexible display. In an example, the article 10 includes multiple display drivers 48, each of which provides image content to a respective set of connecting lines.

Returning to FIG. 55, the display driver 48 illuminates or causes the pixel elements to obtain or reach a color, a lighting level, an on-off state, etc., so as to drive the display 18 to present various images and other functionality as determined by the particular application 60 being executed on the microprocessor 42. In some cases, the display driver 48 may cause various images, such as one or more artistic renditions, patterns, etc. or other types of images stored in the memory 44 to be displayed as one of the images 62 on the flexible display 18. Such an image may be any type of graphic element in the form of artwork, an indication of an association of the user with a particular university or other organization, such as a logo, a mascot, an icon, etc. In the case of a static display, and particularly when the flexible display 18 is a bi-stable type of flexible display, such as an e-ink type of display, the display 18 might display a particular image or background image whenever the device 10 is in a sleep mode, and thus in which the display driver 48 is not operating to actively drive the display 18.

Of course, the touch screen controller 50 is connected to a touch screen interface 26, if such an interface exists, and receives input signals from the touch screen interface 26. The controller 50 operates to decode these input signals to identify touch events that occur with respect to the touch screen interface 26. The touch screen interface 26 may be a capacitive touch screen interface or any other suitable type of touch screen interface disposed over the flexible display 18, and may be transparent in nature to thus enable the pixel elements of the display 18 to be viewable through the touch screen interface 26. Of course, other types of touch screen interfaces may be used instead or as well. In any event, the touch screen controller 50 operates to energize and control the touch screen interface 26, as well as to recognize and decode touch screen events to identify, for example, the location of each touch screen event, a type of a touch screen event, such as a tap or a swipe movement, etc. If desired, the touch screen controller 50 alone or in conjunction with the processor 42 may operate to determine or recognize gestures that are input via the touch screen interface 26, such gestures being, for example, a slide, a swipe, a multi-finger pinch or any other type of gesture that includes one or more finger movements coordinated with one another. Each such gesture may indicate an action to be taken on or via the device 10. Of course, the dynamically flexible, attachable article or device 10 may include other or different types of user input devices configured to detect user-generated gestures, such as interfaces that include buttons switches, roller balls, slide bars, pressure sensors, strain gauges, etc., disposed on, for example, one of the clasps 14 or elsewhere along the band 12. Such user interfaces may enable the user to perform more rudimentary functions, such as scrolling movements, on-off powering movements, mode switching, etc. that are traditionally entered via actuate-able buttons or switches. In one case, the processor may determine, based on input from the user via the touchscreen, such as a set up program, a calibration program or a stored user preference, whether the band is disposed on a left wrist or a right wrist of a user and thus determine the relative positioning or orientation of images to be displayed on the electronic display 18 so that they are best viewable by the user.

As previously discussed, the sensors 52 may include any of various different types of sensors. In an embodiment, the sensors 52 may include one or more gyroscopes which detect movement of or the orientation of the band 12, rapid shaking of the band 12, etc. One or more of these types of movements may be considered to be a particular type of input or user input, such as a gesture to reset the device 10, to change a mode of the device 10, etc. Likewise, the output of such gyroscopes can be used by the microprocessor 42 to determine the orientation or direction of the flexible display 18 to enable the microprocessor 42, or an application 60 executed on the microprocessor 42, to determine the proper orientation of the image to be displayed on the flexible display 18. In some instances, such motion detection and position detection devices might be located in two or more of the fasteners 14 or other electronics modules 19, to enable the device 10 to more accurately determine whether the device 10 is oriented around a wrist or other circular member or whether it is instead laid out flat or oriented in some other manner. The microprocessor 42 or an application executed thereon may change functionality, behavior, and/or actions of the device 10 based on the detected orientation of the band 12.

In some cases, the sensors 52 include one or more pressure or force sensors and/or strain gauges which detect pressure, strain, or similar forces that are considered to be an input to cause the functionality, behavior, and/or actions of the device 10 to change, e.g., reset the device 10, change a mode of the device 10, change a presentation displayed on the flexible display 18 of the device 10, etc. In one example, two pressure or force sensors are positioned on or attached to the band 12 (e.g., as part of the backplane of the flexible 18 or as part of the support 16 so that when the dynamically flexible device 10 is attached to itself in a generally circular or looped configuration, the pressure or force sensors are diametrically opposed to each other.

Figure 56A:
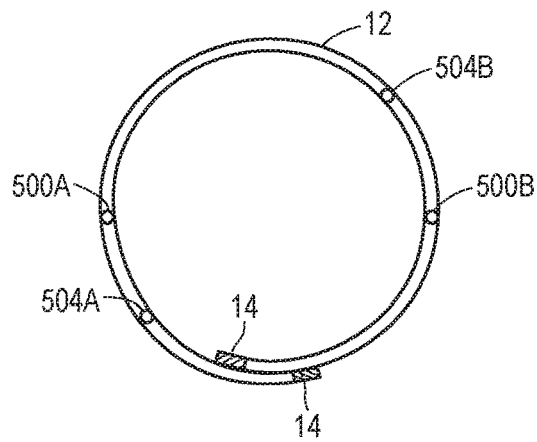
FIG. 56A is a side view of an example attachable article attached to itself in a looped configuration and including pressure sensors.
Figure 56B:
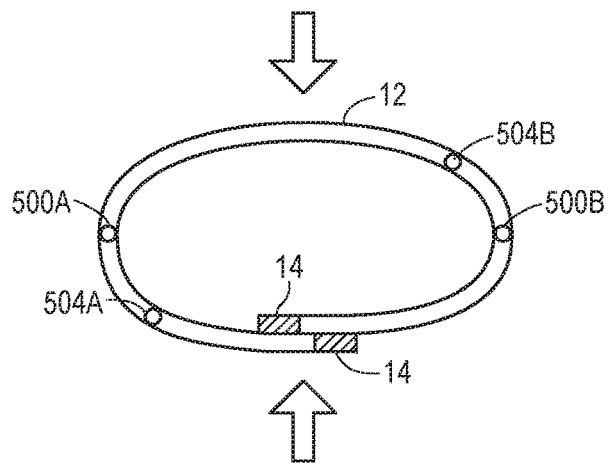
FIGS. 56B and 56C illustrate the attachable article of FIG. 56A being compressed by outside forces.
Figure 56C:
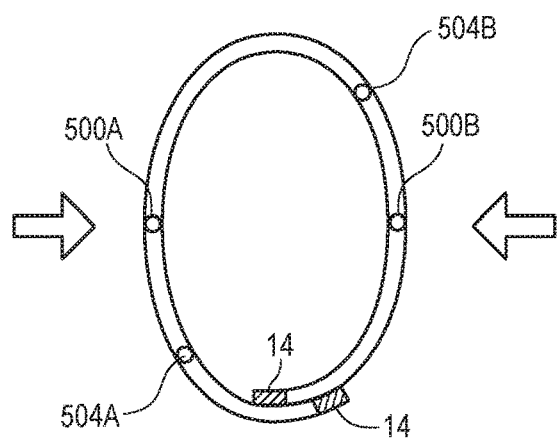

To illustrate, FIG. 56A includes an example looped configuration of a dynamically, flexible attachable device 10 including a band to which two pairs of pressure sensors 500A, 500B and 504A, 504B are attached, where the respective sensors of each pressure sensor pair 500, 504 are diametrically opposed. When a user squeezes or applies force or pressure to the band 12, for example, simultaneously at two or more points along the band 12, this action is detected by the pressure sensors 500A, 500B, 504A, 504B as an input, and the pressure sensors 500A, 500B, 504A, 504B send corresponding signals to the processor 42 (not shown in FIG. 56A-56C) in response to the detection of the input. Based on the signals received from the pressure sensors 500A, 500B, 504A, and 504B, the processor 42 determines any actions and/or behavior to be taken by the device 10 as a result of the input, and causes the resulting behavior (if any are determined) to occur, e.g., by executing one or more corresponding applications 60. FIG. 56B illustrates the band 12 of FIG. 56A being squeezed simultaneously at locations proximate to the fastener 14 and at a diametrically opposite point of the band 12, and FIG. 56C illustrates the band 12 of FIG. 56A being squeezed along an axis perpendicular to the axis of applied force in FIG. 56B. Of course, the user may squeeze the band 12 at any two or more locations along the band 12, and by judicious placement of multiple sensors along the band 12, the location(s) along the band 12 at which the user applied the squeezing force are able to be determined by the processor 42 from the outputs of the sensors.

Different locations of squeezing along the band 12 of the flexible device 10 may correspond to different desired functionality, actions, modes and/or behaviors. For example, a detected squeeze along a first diametric axis proximate to the fastener 14 may indicate that the device 10 is to be turned off, whereas a detected squeeze along another axis may indicate that a particular application 60 stored in the memory 44 is to be launched.

In some cases, for a given axis of applied force, different signals generated by a same pressure sensor correspond to different degrees of detected force, and thus to different behaviors. For example, a squeeze of a significant force (e.g., so that both sides of the loop almost touch) that is applied over a pre-defined time duration may indicate that the device 10 is to be turned off, whereas a series of less forceful squeezes at the same location(s) may control a speaker volume. In some cases, a resulting behavior of the device 10 is based on a differential between the respective magnitudes of the forces detected at multiple sensors. For instance, if one pressure sensor detects a significantly larger force than another pressure sensor, this condition may be indicative of the device 10 being dropped rather than a user intentionally squeezing the device 10 to elicit a desired behavior or action.

In an embodiment, particular actions that are to be performed by the device 10 are based on types of squeezes or applied forces to the band 12 (e.g., particular magnitudes, locations, durations, and/or numbers of squeezes or applied forces to the band 12). The mappings between type of applied forces and desired resultant device behavior or action may be configurable. For example, the user may change one or more mappings directly at the band 12 via a user interface of the device 10, or the user may cause mapping changes to be downloaded into the memory 44 of the device 10. Of course, all detection and action recognition may be performed by appropriate software running in the processor of the device based on the signals provided by the sensors 500, 504.

Figure 57:
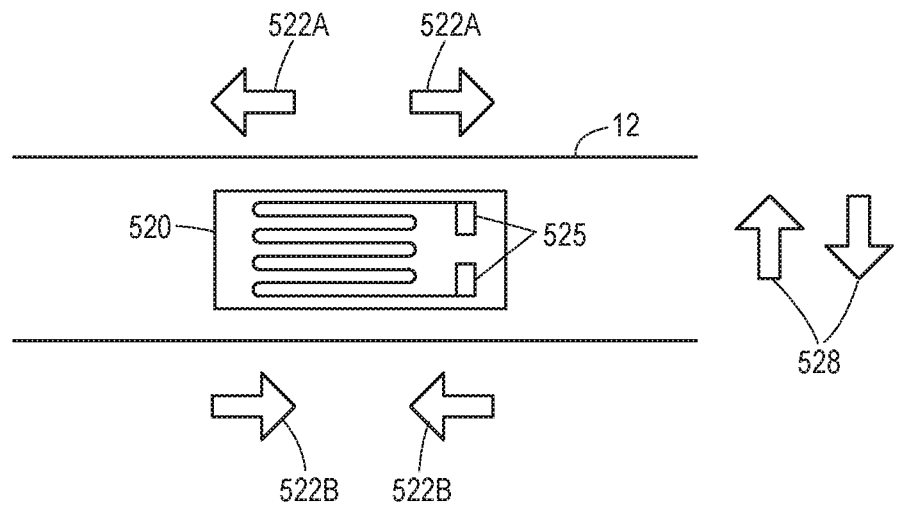
FIG. 57 is a surface view of a portion of a band of an example attachable article including a strain gauge.

FIG. 57 illustrates a surface view of a portion of an example configuration of the dynamically flexible, attachable device 10 that includes one or more strain gauges 520 attached to or included in the band 12 (e.g., on the support 16 or the backplane of the flexible display 18). In FIG. 57, the generally rectangular-shaped strain gauge 520 is oriented in parallel with the orientation of the rectangular-shaped band 12. In particular, the strain gauge 520 is positioned so that a direction or axis 522 along which forces are detected by the gauge 520 is parallel to a longitudinal axis of the band 12. Further, the strain gauge 520 is a unidirectional gauge in which forces along one dimension 522 (e.g., tension 522A or compression 522B) are detected, and signals corresponding to the detected forces (e.g., electrical signals) are transmitted via one more connection pads 525, e.g., to the processor 42 (not shown). Forces in another dimension 528 remain undetected or are ignored by the unidirectional gauge 520. In some cases, the strain gauge 520 is included in a pressure sensor included in the device 10.

Figure 58:
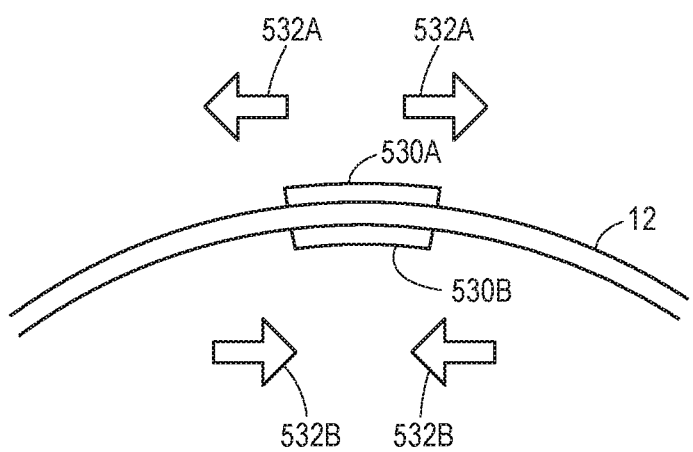
FIG. 58 is a side view of a portion of the band of an example attachable article including two strain gauges.

FIG. 58 illustrates a side view of an example configuration of the dynamically flexible, attachable device 10 that includes two strain gauges 530A, 530B positioned on opposite faces of the band 12. The example configuration of FIG. 58 may or may not be integral with the example configuration shown in FIG. 57, e.g., the gauges 530A, 530B may or may not be instances of the gauge 520. As shown in FIG. 58, the band 12 has been squeezed so that the portion of the band 12 including the strain gauges 530A, 530B is curved, and as such, gauge 530A detects tension forces 532A and gauge 530B detects compression forces 532B. The gauges 530A, 530B send signals corresponding to the magnitude of the respectively detected forces 532 to the processor 42 (not shown) so that the processor 42 may determine the appropriate action or behavior of the device 10, e.g., by executing an application 60. The device 10 may include more than one pair of gauges 530A, 530B disposed at various locations on the band 12, e.g., attached to or as part of the flexible support 16 or a substrate of the flexible display 18. In FIG. 58, the strain gauges 530A, 530B are shown as extending from the surfaces of the band 12, however, in some embodiments, the strain gauges 530A, 530B do not extend from the surfaces of the band 12, but instead are positioned within the band 12 between its surfaces.

In FIGS. 57 and 58, the strain gauges 520, 530A and 530B are illustrated as unidirectional strain gauges configured to detect and/or send signals corresponding to forces in only one direction. In some cases (not shown), a strain gauge included in the device 10 is a multi-directional strain gauge configured to detect multi-directional forces. In an example, if a user contorts the device 10 to a point that may not be tolerated by the flexible display 18 (e.g., by twisting the band torsionally, stretching the band in one or more directions, etc.), this contortion is detected by multidimensional strain gauges and reported to the processor 42, which then may cause a warning or other alert to be presented on the flexible display 18 or at another user interface (e.g., an auditory alert). On the other hand, a twisting or stretching the band to a tolerated but not excessive degree may correspond to yet another input detected by the multidimensional strain gauges to cause a respective action or behavior of the device 10. Of course, any number of strain gauges or other sensors may be disposed at any positions along the band 12 (and on either the upper surface or lower surface of the band 12 if desired) to detect pressures at any point along the band 12 or a multiple different points along the band 12.

Referring back to FIG. 55, in some devices, the sensors 52 may include step counters or an impact-sensor like and accelerometer, which might be used to count the number of steps a user takes over a particular period time. Alternatively or in addition, the sensors 52 may include one or more temperature sensors, which may detect the ambient temperature, the temperature of the skin of the user when the device 10 is being worn, etc. The sensors 52 could also include a blood-pressure sensor device, which might check blood pressure or heart rate using known exterior blood-pressure sensor device technology.

As will be understood, the various different electronic devices or components disposed in or shown in the electronic suite 38 of FIG. 55 may be used in conjunction with one another in various different manners to provide a whole host of functionality for the dynamically flexible, attachable article or device 10, which might be beneficial in various different uses of that article. However, only some of these uses are described in detail herein.

In a general sense, the flexible display 18 of any or all of the embodiments described herein may be manufactured as any type of flexible display, such as an e-paper display, an organic light emitting diode (OLED) display, etc. and this flexible display, once manufactured, may then be formed, curved or bent in various manners. Generally speaking, flexible display 18 may be made of two flexible substrates including a backplane flexible substrate and frontplane flexible substrate placed back to back, next to one another, or laminated onto each other. In the case of e-paper, an additional layer of material such as an adhesive may be included in the frontplane and disposed between the backplane and the frontplane. In some cases, such as with the use of active-matrix OLEDs, electrophoretic displays (EPDs), e-paper, electronic ink displays, e-reader displays, liquid-crystal displays (LCDs), or other active-matrix type displays, the backplane includes a plurality of semiconductor devices or elements, e.g., an array of transistors and/or other elements, disposed thereon for driving or providing energization to individual lighting, transmitting, or reflective elements disposed in a similar array on the frontplane or on top of the transistors and/or other elements. The semiconductor devices or elements may be formed on the backplane in any known or desired manner, such as by etching, dye cut forming, printing, sputtering, spin-coating, spray coating, other deposition or patterning techniques, or combinations thereof, etc. Likewise, the light emitting, transmitting, or reflective elements may be formed as any desired types of light emitting, transmitting, or reflective elements using these same or different techniques, and the elements may include light emitting diodes (LEDs), OLEDs, e-paper, liquid crystal, etc. In the case of e-paper, for example, the frontplane and the backplane may be formed with black and white, oppositely charged particles suspended in a clear fluid which, when put in an electric field, will cause the black or the white particles to drift to the top of the display to create a white state, a black state, or an intermediate grey state. In any case, the substrate of the backplane and the frontplane may be formed of the same material or of a different flexible material, such as plastic or flexible glass, and these materials may have the same or different flexibility properties, as long as both materials are able to flex to the curvature needed for bending the electronic display 18.

More particularly, the flexible displays illustrated herein, may be manufactured as a flexible display, such as an e-paper display, an organic light emitting diode (OLED) display, etc. Generally speaking, the flexible displays may be constructed on two flexible substrates, or may be constructed on one flexible substrate but having at least two flexible substrates. The flexible substrates may include a backplane display area and frontplane display area placed back to back, next to one another, or laminated onto each other. The frontplane display area comprises an array of optic elements (e.g., electro-optic elements) provided on a first flexible substrate that are capable of displaying an image, while the backplane display area comprises an array of semiconductor devices or elements (e.g., transistor elements) provided on a second flexible substrate for driving or providing energization to the optic elements on the frontplane. Materials suitable for use as the flexible substrate for either the frontplane and/or the backplane include, but are not limited to, various plastic substrates such as polyimide, polyethylene terephthalate (PET), polycarbonate, polyethersulfone, polyether ether ketone (PEEK), and polyethylene naphthalate (PEN). Metallic foils or flexible glass also may be used.

Preferably, the backplane display area comprises an array of thin film transistors (TFTs) provided on a flexible, plastic substrate such as PET. The TFT array may include switching and/or driving TFTs, and additional elements such as storage capacitors, and interconnect wiring. An individual TFT element generally is made by successive deposition and patterning of conductor (i.e., source, drain, and gate electrodes), insulator (i.e., dielectric) and semiconductor thin film layers. The active semiconductor layer can be composed of either organic (small-molecule or polymeric semiconductors) or inorganic materials (such as amorphous silicon, low-temperature polycrystalline silicon, graphene, carbon nanotube, and metal oxide semiconductors).

The TFT array may preferably comprise organic TFTs (OTFTs) based upon an organic semiconductor described in at least one of U.S. Pat. Nos. 6,585,914; 6,608,323; 6,991,749; 7,374,702; 7,528,176; 7,569,693; 7,605,225; 7,671, 202; 7,816,480; 7,842,198; 7,892,454; 7,893,265; 7,902, 363; 7,947,837; 7,982,039; 8,022,214; 8,329,855; 8,404, 844; 8,440,828; U.S. Patent Publication No. 2010/0252112; U.S. Patent Publication No. 2010/0283047; U.S. Patent Publication No. 2010/0326527; U.S. Patent Publication No. 2011/0120558; U.S. Patent Publication No. 2011/0136333; and U.S. Patent Publication No. 2013/0062598, the disclosure of each of which is incorporated by reference herein in its entirety for all purposes. While OTFTs may include metallic contacts and a dielectric layer composed of silicon oxide ($SiO_2$) or another inorganic oxide or nitride (such as $Al_2O_3$, $HfO_2$, $SiO_2$, or $Si_3N_4$), a dielectric layer composed of an electrically insulating polymer may be preferred. Exemplary polymeric dielectric materials include polyacrylates, polyimides, polyvinyl alcohol, polystyrene, polyester, polycarbonate, polyhaloethylene, epoxy resins, siloxane polymers, benzocyclobutene-based polymers. Other polymeric dielectrics are described in U.S. Pat. Nos. 7,605,394; 7,981, 989; 8,093,588; 8,274,075; 8,338,555; U.S. Patent Publication No. 2011/0175089; U.S. Patent Publication No. 2011/ 0215334; and U.S. Patent Publication No. 2012/0068314. Conductive polymers such as poly(3,4-ethylenedioxythiophene) poly(styrenesulfonate) (PEDOT:PSS) may be used as alternative materials for metallic contacts in OTFTs.

Preferably, the TFT array may comprise metal oxide TFTs based upon a metal oxide semiconductor. For example, the metal oxide semiconductor can be selected from various mixed oxides including one or more of indium, zinc, tin, and gallium such as indium zinc oxide (IZO), zinc tin oxide (ZTO), indium gallium oxide (IGO), and indium gallium zinc oxide (IGZO). In a more preferred embodiment, the TFT array may comprise IGZO TFTs. While state-of-the art IGZO TFTs usually include thick layers of inorganic materials such as $SiO_2$, $SiO_x$, $Si_3N_4$, and $SiO_xN_y$ as dielectric and passivation layers, it is preferred that if the TFT array backplane comprises metal oxide TFTs, organic materials are used in at least some of the dielectric and passivation layers, such that the thickness of the remaining inorganic layer(s) may be reduced to allow maximum flexibility of the TFT array as whole. Metal oxide TFTs incorporating one or more organic layers are described in U.S. Pat. Nos. 8,017, 458; 8,097,877; 8,395,150; and U.S. Patent Publication No. 2012/0223314, the disclosure of each of which is incorporated by reference herein in its entirety for all purposes.

In some scenarios, such as for an electrophoretic or e-reader display, the frontplane display area may be laminated, sealed to, or otherwise secured onto the backplane display area. The frontplane display area may be produced by forming a subassembly that comprises, in sequence, a flexible substrate, a conductive electrode layer, an electro-optic layer, and optionally, an adhesive layer to allow lamination to the backplane. In the case of an OLED display, the electro-optic layer is sandwiched between two electrode layers and is typically built on the TFT array. Generally, at least one of the two electrode layers is transparent, often composed of a transparent conductive oxide such as indium tin oxide (ITO). The electro-optic layer is composed of an organic material capable of emitting light when a voltage is applied across the two electrode layers. The organic light-emitting material may have a stacked structure including a plurality of different organic layers. In addition to one or more emissive layers, the stacked structure may include additional layers such as a hole-injection layer, a hole-transport layer, an electron-transport layer, a hole-blocking layer, and/or an electron-blocking layer to enhance device performance. Individual OLED elements may have different emitters (for example, a red emitter, a green emitter, or a blue emitter) in their emissive layer to provide a colored image. Exemplary OLED device structures and materials are described in U.S. Pat. Nos. 5,707,745, 5,844,363, 6,097,147, 6,303,238, and 8,334,545, the disclosure of each of which is incorporated by reference herein in its entirety for all purposes.

In the case of an e-paper display, the electro-optic layer may be composed of an encapsulated electrophoretic medium. The encapsulated electrophoretic medium generally comprises numerous small capsules, each of which itself comprises an internal phase containing electrophoretically-mobile (e.g., black and/or white) particles suspended in a liquid suspending medium, and a capsule wall surrounding the internal phase. Typically, the capsules are themselves held within a polymeric binder to form a coherent layer positioned between two electrode layers. Most commonly, one electrode layer has the form of a single continuous electrode, while the other electrode layer is patterned into a matrix of pixel electrodes, each of which defines one pixel of the display. Electronic charges are applied to the capsules to bring particles of a selected color to the surface. Electrophoretic media and related display device structures are described in, for example, U.S. Pat. Nos. 5,930,026; 6,831, 769; 6,839,158; and 7,170,670, the disclosure of each of which is incorporated by reference herein in its entirety for all purposes. In addition to electrophoretic displays, other e-paper display technologies include electrowetting displays, and electrofluidic displays as described in, for example, U.S. Pat. Nos. 7,446,945 and 8,111,465, the disclosure of each of which is incorporated by reference herein in its entirety for all purposes.

To integrate the TFT array backplane with the frontplane for a completed display system, the bottom or pixel electrode of the frontplane is (connected) to the drain or source electrode of the switching TFT in an e-paper display, and the driving TFT in an active matrix OLED (AMOLED) display.

Various organic layers on either the frontplane and/or the backplane may be formed on the flexible substrate by solution-phase deposition techniques such as spin-coating, slot coating, die coating, printing (e.g., inkjet printing, screen printing, pad printing, offset printing, gravure printing, flexographic printing, lithographic printing, mass-printing and the like), spray coating, electrospray coating, drop casting, dip coating, and blade coating. Inorganic (e.g., metallic or metal oxide) layers usually are deposited by physical or chemical vapor deposition methods (e.g., sputtering), but may be solution-processed if a soluble precursor is available. The layers may be patterned into specific elements by photolithography, either by use of the intrinsic photosensitivity of the layers (e.g., certain polymeric layers) or by use of a photoresist (e.g., metallic, metal oxide, or small-molecule organic layers).

Figure 59:
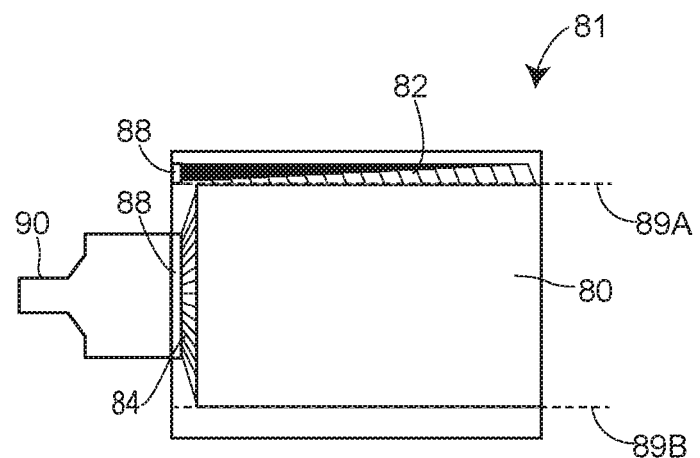
FIG. 59 illustrates a top view of a backplane layer of a flexible electronic display as formed on a flexible display element substrate.

Moreover, it may be desirable to manufacture the flexible display 18 in a manner that maximizes the amount of the display area space viewable on the top layer of the device 10, i.e., that is viewable on the band 12. In this regard, FIG. 59 illustrates a base or backplane layer of a flexible display 18 as manufactured. Generally speaking, the backplane of a flexible display 18 comprises a flat surface, or a first display substrate, and has a display area with various electrical energizing elements (e.g., transistors) formed, printed, etched or otherwise disposed thereon. As is known, the electronically energizing components on the backplane substrate of a backplane component are then operatively connected to electronically energizable components, such as organic light emitting diodes (OLEDs), encapsulated electrophoretic media (e.g., as in an e-paper display), etc., disposed on or formed on a frontplane component. Both the backplane substrate of the backplane component and the frontplane substrate of the frontplane component are flexible, and the backplane substrate and the frontplane substrate are aligned to provide a register between various energizing components and energizable components to thereby form pixels on the display area. In particular, the flexible display may be made of two or more layers including a backplane display substrate on which various display elements, such as pixel elements, associated with each pixel of the display are printed, etched or otherwise manufactured in the form of, for example, transistors or other switching elements, a secondary or frontplane display substrate on which OLEDs, e-ink microcapsules or other energizable components that form black and white or various colors on the display for each pixel, and, in some cases a further flexible substrate layer that operates as a ground layer. In some embodiments, such as in electrophoretic displays, the frontplane and backplane are laminated together as frontplane and backplane components. In some embodiments, the flexible display 48 may be built in layers, e.g., starting with the backplane and ending with attaching the frontplane substrate.

As illustrated in FIG. 59, the display area 80 formed on the backplane component of such a display 18 may be generally rectangular in shape and have a large aspect ratio, e.g., an aspect ratio where the length of the display area 80 is at least two times greater than the width of the display area 80, and, in some configurations, is at least five times greater than the width. The display area 80 includes any number of pixels or pixel elements, each of which may be connected to at least two lines (e.g., electrical lines, lead lines, electrodes, connecting lines or connectors) for energization thereof. The electrical lines or connecting lines are disposed at the pixel elements and exit from the display area 80 via various sides of the display area 80. Generally, each line services a particular row or column of pixel elements. As such, in FIG. 59, the connection lines are illustrated as a first set of connecting lines 82 coming from one of the longitudinal sides and including a line 82 for each of y columns of pixels of the display area 80 (e.g., a set of longitudinal connecting lines), and a second set of connecting lines 84 coming from one of the transverse sides of the display area 80 and including a line 84 for each of x rows of pixels of the display area 80 (e.g., a set of transverse connecting lines). As is known, energization or connection between a particular connecting line 82 of a column $y_n$ and a connecting line 84 of a row $x_m$ of the display area will energize or turn on that corresponding pixel, and, as such, the corresponding pixel may be referred to using its two-dimensional coordinates, e.g., $(x_m, y_n)$ or $(y_n, x_m)$. In any event, as illustrated in FIG. 59, the sets of connecting lines 82, 84 exit from the display area 80 along the same backplane substrate and are connected to one or more multiplexer or IC driving circuits 88, which may be formed, for example, on or near the edge of the backplane display substrate. The driving circuits 88 may be integral with the display driver 48 of the electronic suite 38, or the driving circuits 88 may be disposed separately from but nonetheless communicatively connected to the display driver 48, e.g., the driving circuits 88 are disposed on a flexible connector 90 connecting the backplane layer to the electronics module 19. Typically, the flexible connector 90 is not integral with the backplane layer, but instead is a separate element that couples to the backplane layer to communicate with the electronics module 19 and components included therein, such as the display driver 48.

Figure 60:
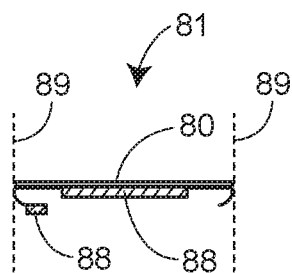
FIG. 60 illustrates a manner of bending the flexible display element substrate of FIG. 59 to form a flexible display with maximal display area on the top of a wristband device.

FIG. 60 illustrates a manner of folding or bending the substrate 81 of FIG. 59, to form a display that includes a maximum amount of display area 80 on the top thereof that is viewable to the user, so as to maximize the amount of area on the band 12 at which the display area 80 is viewable and to minimize the area of edges surrounding the display area 80 that are visible to the user. (For ease of viewing, the flexible connector 90 is not shown in FIGS. 60-54.) In FIG. 60 in particular, the bending may occur along the dotted line 89A, illustrated in FIG. 59, so as to fold over the backplane sections adjacent to the longitudinal side of the display area 80 at which the connecting lines 82 are disposed. This folding enables the connecting lines 82 to be bent down and under the display area 80, and enables the multiplexer or IC driving circuits 88 to be connected to the display driver 48 (disposed in, for example, one of electronics module 19 not shown in FIGS. 59 and 60) via separate electronics or electrical connections. Thus, as illustrated in FIG. 60, which depicts a cross-sectional end view of the flexible display 18, the flexible display 18 so formed and bent enables the separate longitudinal display lines 82 to be connected to different multiplexer or driving IC circuits 88, which are ultimately connected to the display driver 48 of FIG. 55, in order to energize the rows and columns of pixel elements of the flexible display 18 to thereby drive the display 18. As the fold 89A occurs along the edge of the display area 80, the areas of the backplane substrate of the flexible display 18 that are used to form the connecting lines 82 are disposed in a different plane than, and are disposed in some cases under the display area 80, and thus do not require the backplane substrate 81 to extend out towards the sides of the band 12 much beyond the edges of the display area 80. This configuration, in turn, enables the maximal amount of viewable display area to be disposed on the top portion of the band 12 which maximizes the viewable or usable area of the band 12 at which the display 18 can present viewable images. In some embodiments, the backplane substrate 81 may also be bent along the dotted line 89B along the opposite longitudinal side, even if the opposite longitudinal side does not support any electrodes or connectors thereon, e.g., for ease of manufacturing and/or for aesthetic considerations.

Figure 61:
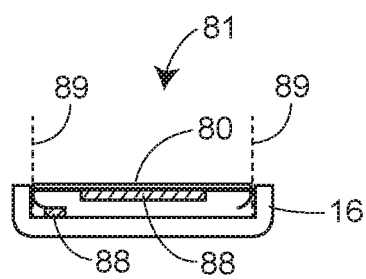
FIG. 61 illustrates an end view of a flexible display configured as provided in FIG. 60 disposed within flexible support with side protection structure.

FIG. 61 illustrates a cross-sectional view of the display 18 bent as illustrated in FIG. 60 and disposed in or on a flexible support 16 of the band 12, with the display 18 having the maximal display area 80 thereon disposed up to the edges of the band of the device 10. In this case, the flexible support 16 is illustrated as having sidewalls to form a protective barrier to protect the display 18 at the edges thereof from side impacts. Of course, other manners of manufacturing the display 18 could be used and implemented to produce the dynamically flexible, attachable article or device 10.

In some cases (for example, due to the size of the display area 80, the material composition of the flexible display 18, etc.), bending the backplane layer 81 so that the electrodes or connectors 82 are under the display area 80 may cause undesirable effects, such as interference between various electrical components of the backplane layer 81. Further, in order for the flexible display 18 to be as dynamically flexible as possible, the impact of the more rigid portions of the backplane layer 81 (e.g., the portions which support the less-flexible or rigid driving circuits 88) on the flexibility of the display area 80 is desired to be minimized. Still further, a minimum border extending from the display area 80 and viewable to a user may be necessary to seal the top and bottom layers of the flexible display 18, e.g., by using an environmental barrier material for the frontplane and backplane substrates and the seal, or by some other means. In electrophoretic displays, for instance, the required width of a border for sealing is typically around 2 to 6 mm.

As will be understood, the dynamically flexible, attachable article or device 10 as described above can be configured and operated in many different manners to perform many different functions at the same or at different times. For example, the device 10 may operate to execute any number of different types of applications including, for example, calendar applications, e-mail applications, web-browsing applications, picture, image or video display applications, stop-watch or other timing applications, alarm clock or alarming applications, location based applications including for example mapping applications, navigational applications, etc. In some cases, various different applications or functionality may be performed simultaneously, and different sections or portions of the flexible display 18 may be used to display information associated with the different applications. For example, one portion of the flexible display 18 may be used to illustrate calendar information provided by a calendar application, another portion of the flexible display 18 may be used to illustrate e-mails associated with an e-mail application and a still further portion of the flexible display 18 may be used to display a clock or stop watch associated with a timing application. Still further, the applications 60 executed on the device 10 may be executed on and display information computed solely with the electronics suite 38 of the device 10. In another case, one or more applications 60 may be executed on the processor 42 of the device 10 to interface with and display information received from external computing devices, such as a mobile phone, a laptop computer, a desktop computer, etc. In this case, the device 10 may act as a slave display device or may operate in conjunction with information received from the external computing device to provide information, graphics, etc. to a user on the flexible display 18 of the device 10. The device 10 may communicate with external devices or an external network via any desired communication hardware, software and communications protocol, including any LAN or WAN based protocol, an NFC protocol, a Bluetooth protocol, an IP protocol, an RFID protocol, etc.

FIGS. 62A-62E illustrate various different types of displays or images which may be provided on the flexible display 18 of the device 10 at various different times or even at the same time. For example, in one scenario illustrated in FIG. 62A, the display 18 may depict a pattern, an artistic rendition or other image that is particularly expressive of the wearer or user, including for example, an image provided by the user, a picture or a photo, an image of a hand-drawn sketch, a team, corporate or other organizational logo, a message of some sort, or some other image that expresses some interest or personality trait of the user. Such an image might be displayed whenever the device 10 is in a sleep mode, that is, when the device 10 is not being actively used in other modes. Moreover, such an image could be resident on the display 18 for long periods of time whenever the display 18 is not in use, if the flexible display 18 is a bi-stable display, such as an e-ink display, which requires no power to hold the image in place once image is been formed.

As illustrated in FIG. 62B, in another mode referred to herein as an office mode or a calendar mode, the device 10 displays a calendar screen and an e-mail screen or other images associated with or set up to provide office or business related functionality. Such a mode may provide images that enable the user to easily view e-mails, calendars and to use other business related applications. Thus, for example, the display 62B may provide a calendar of events, and may also display one or more e-mail icons, text messaging icons, etc., indicating e-mails or text messages that may be available and viewable to the user.

FIG. 62C illustrates the device 10 in an alarm/clock mode in which the flexible display 18 provides an alarm or clock display that may be generated by an alarm or clock application. An alarm may ring by sounding a speaker (e.g., one of the electronic devices 53 of FIG. 55) at a particular time according to a preset alarm notification and/or the device 10 might use a gyroscope or accelerometer to vibrate the device 10 to cause a vibration indicating an alarm. Still further, as illustrated FIG. 62D, the device 10 may be placed in an exercise or training mode in which the flexible display 18 displays a stopwatch, a distance traveled or other indications of various athletic parameters that have been met or associated with an exercise routine including, for example, use of the step counter to determine the number of steps that have been taken, to determine the number of lifts that have been performed when, for example, lifting weights, etc. Likewise, in such a mode, the display 18 may display a distance traveled by a runner or walker, the time since the beginning of a run or other exercise, etc. Still further, as illustrated in FIG. 62D, a portion of the display 18 may be used to indicate the current song that is playing via a music application implemented on the article 10.

In a still further mode, illustrated in FIG. 62E, the wristband device might be a slave display to another computer device, such as a navigation device within a car, a phone, a laptop computer, an e-reader. In this case, the display 18 may display, for example, a map, a route, directions, etc. on a map as provided by a navigation device to the device 10 via, for example, a Bluetooth communication module or other communication module that provides communication between the device 10 and the navigation device (not shown). Such a slave display might enable the device 10 to be more visible to the user in a driving situation. Of course, other types of visuals and displays can be provided with other types of applications stored on the device 10 or in other communicatively coupled computer devices, such as phones or computers that communicate with the device 10 to provide images or information for display to the user.

As part of one of these or other uses, the device 10 may be separately connectable to magnetic strips or other exteriorly located magnetic or metallic devices to which the magnets 20 and 22 within the end pieces 14 are magnetically attracted. In this case, the strips may have communication modules therein or associated therewith that communicate with and enable the device 10 to determine the location of the device 10 and to thus control the default functionality of the device 10. That is, the device 10 may be placed around someone's wrist and used in various different modes to provide information to the user as it is wrapped around the wrist. However, the device 10 might also be taken off the wrist and applied to other surfaces, such as on tables, desks, car dashboards, refrigerators, nightstands, or any other surface. In this case, the device 10 may automatically operate to detect its current location and provide various default or automatic functionality based on the determined location. As an example, FIG. 63A illustrates a device 10 having magnets disposed in the clasps or ends 14, which are magnetically coupled to magnetic strips 100 which are separately disposed on a different surface or surfaces to cause the device 10 to have the flexible display 18 laid out horizontally or straight along the surface. In a similar manner, FIG. 63B illustrates the device 10 disposed in a curved manner between two magnetic strips 100 to create a curved display for viewing by a user.

Here, in addition to include a metal, magnet or other magnetic material, one or more of the magnetic strips 100 may include a location detection mechanism 101 therein, such as an RFID tag, a Bluetooth or near field communication module, or any other kind of passive or active communication technology that communicates with the communication module 46 within the device 10, to indicate the location or a unique identifier of the strip 100 and thus the current location of the device 10 when the device 10 is disposed near or adjacent the strips 100. In this case, each or at least one of the strips 100 may include a unique RFID tag, NFC identifier, Bluetooth communication identifier or other identifier that identifies itself and/or its precise location. An application executed within the device 10, such as one of the applications 60 of FIG. 55, may operate to obtain, via the communication module 46 (which may be an RFID communication module, a Bluetooth communication module, an NFC module, etc.), the tag number or the identity of the strip 100 and may locate that tag number within its memory as being associated with a particular functionality. The application 60 may then configure the device 10 to operate in a default manner based on the detected strip identity or location, such as by running one or more other applications 60. Of course, the strips 100 need not be magnetic in nature but could instead be any type of device having an RFID tag, a Bluetooth module (such as Bluetooth tiles) or other communication module therein that is detectable by the device 10 whenever the device 10 is in a certain range of or near the strip 100. That is, the device 10 need not be magnetically connected to the strip 100 to perform the location detection described herein.

Once the RFID tag or other identifier of the strip 100 is determined via communication with the module 101, the device 10 and, in particular, the microprocessor 42 thereof, may execute a particular application indicating or providing certain functionality associated with the location or positioning of the device 10 at that strip 100. Thus, the strips 100 may be placed on a refrigerator, and when so used, may disclose particular information necessary or generally associated with kitchen usage, such as a shopping list, a calorie count of particular foods that the user might be eating, a clock or other type of alarm mechanism for timing the cooking or refrigeration of certain food items, etc. On the other hand, the device 10 may be removed from a strip 100 on the refrigerator, and placed next to a different strip, such as that located in bedroom, and there default to operate as alarm clock. In a still further usage, the device 10 may be removed and taken to an office and, when set on or near strips associated with or pre-identified with the office, automatically display e-mail accounts or calendar information that is typically more useful and associated with an office environment. Still further, the device 10 might be then taken off and put on a car dashboard having strips thereon which identifies the wristband device as being located on the car dashboard. In this case, the device 10 might provide information more useful within a car, such as executing an application that interfaces with a navigation device and acts as a slave display to the navigation device, to thereby display information provided by the navigation device to a user in a more easily accessible manner up on the dashboard. The device 10 may also or instead operate as a compass and show cardinal directions, as a clock, etc.

Figure 64:
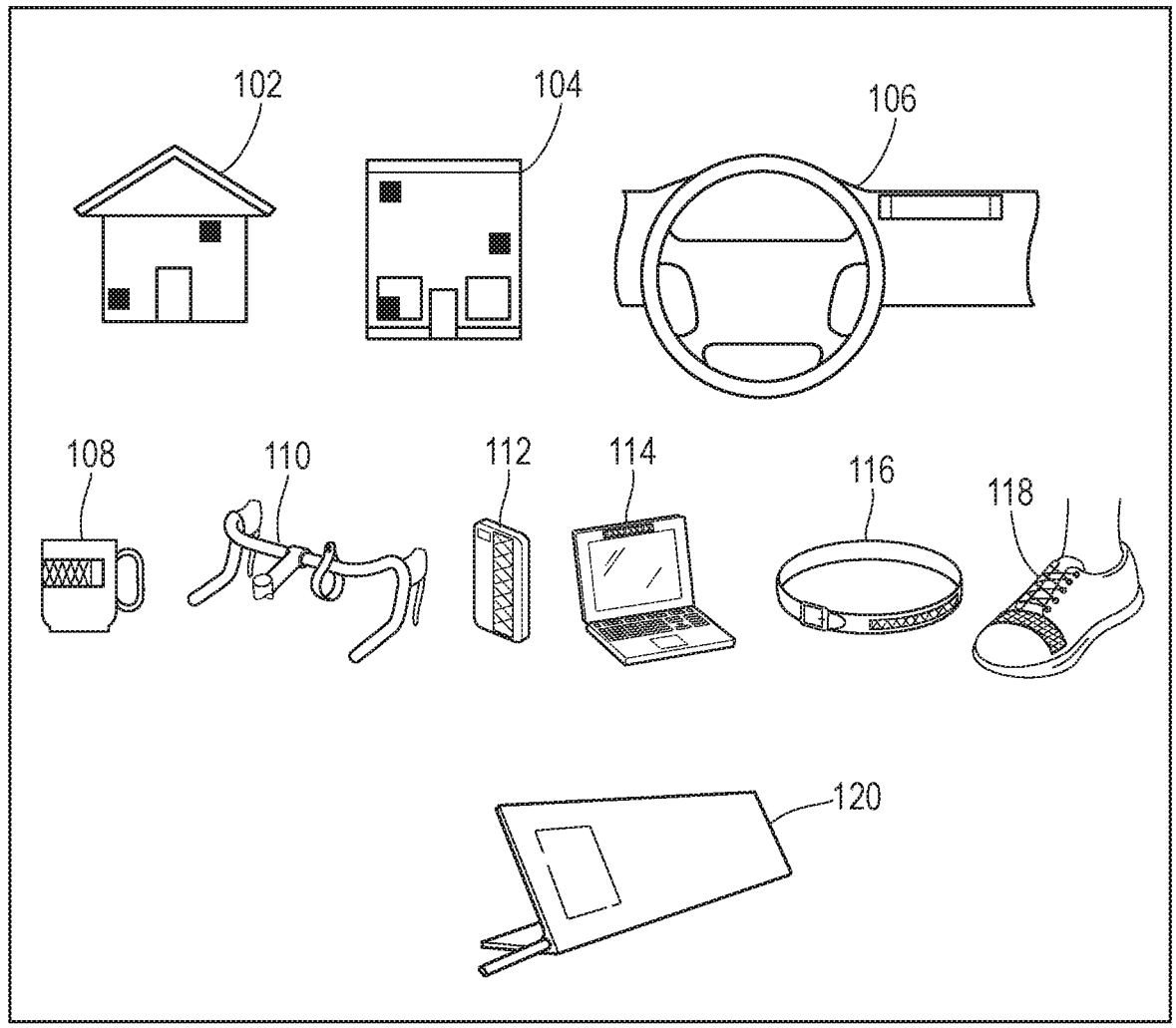
FIG. 64 illustrates the use of the wristband device detection system of FIG. 63 in various different places or attached to various different articles to change the default functionality of the wristband device.

FIG. 64 illustrates, for example, various different environments in which the device 10 may be placed and associated with different strips 100 as described above, including a home environment 102, an office environment 104, and an automobile 106 to provide different automatic or default functionality of the device 10. Additionally, as illustrated in FIG. 64, the attachable device 10 can be attached to any other devices such as a coffee cup or mug 108 or other drinking vessel, a bicycle handlebar 110, a phone case 112, a computer 114, a belt 116, a shoe 118, a docking or charging stand 120, or any other device on which or near which a strip 100 having a communication module is located. Of course, the default functionality may be provided by placement of the device 10 close to the strips and the identification of those strips. However, the user could still change the functionality of the device 10 to other functionality associated with other applications or displays that might be necessary or desirable at the time, instead of the default functionality associated with the detected location. Moreover, different default functionality might be associated with different locations within each environment. Thus, for example, FIG. 64 illustrates two different locations within the home environment 102 and three different locations within the office environment 104, with each location having a different detectable strip 100 and thus a potential different default functionality.

Of course, it will be understood, that the use of the strips 100 and the identifiers associated with the strips 100, which might communicate via, for example, RFID, NFC, Bluetooth or any other desired communication hardware and protocols, enables the device 10 to have automatic default functionality based on its location. The sensors 52 and other electronic devices 53 within the device 10 may also be used to provide default functionality. For example, the gyroscopes or accelerometers may be used to detect the orientation of the device 10, e.g., whether the device 10 is located more horizontally or vertically, and this orientation may be used to control the manner or direction in which information is displayed on the flexible display 18. The sensors 52 and devices 53 may also detect whether the device 10 is undergoing movement or acceleration, which might cause the device 10 to have different functionality or to change a display in some manner.

Figure 65:
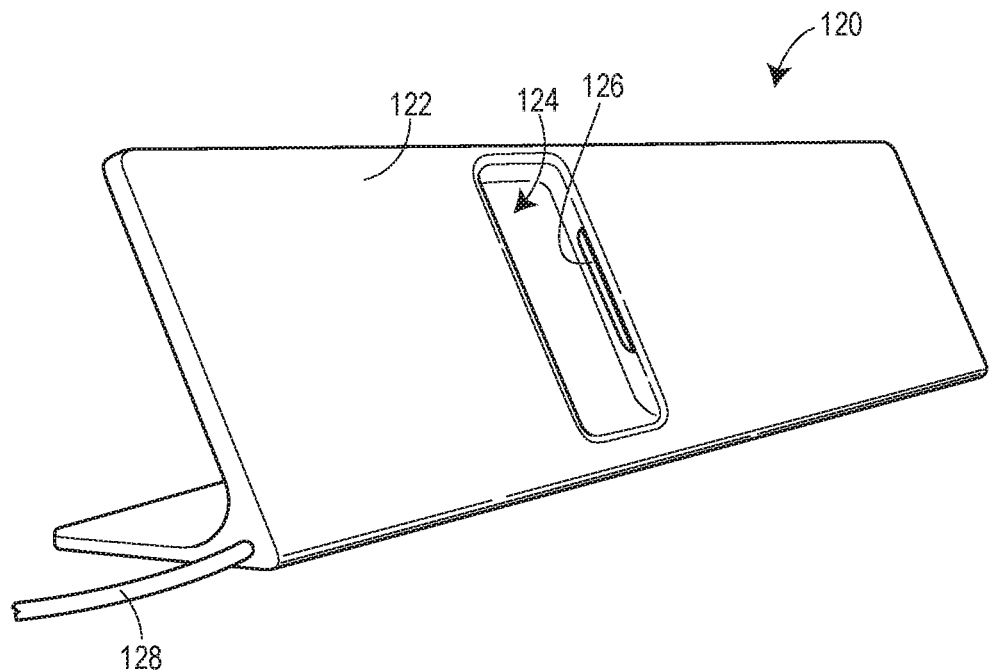
FIG. 65 illustrates a stand that may accept and hold one of the wristband devices disclosed herein, such as that of FIG. 53, when not being worn by a user.
Figure 66:
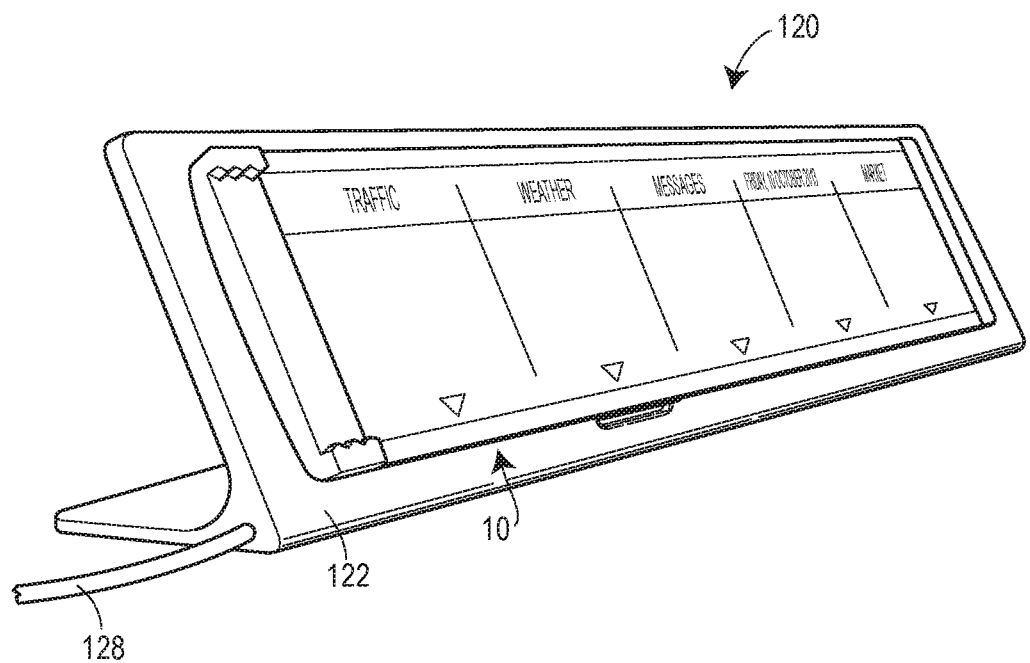
FIG. 66 illustrates the stand of FIG. 65 with the wristband device of FIG. 53 disposed thereon.

As another example, FIGS. 65 and 66 illustrate a base station (such as the charging station 120 of FIG. 64) that can be used to hold and charge a device 10, such as the device 10 illustrated in FIG. 17. As depicted in FIG. 65, the base station 120 may include a flat panel 122 having a recess, an indent or a space 124 formed therein. In this case, the device 10 of FIG. 53, when laid out flat as illustrated in FIG. 53, may be placed against the flat plate 122 so that the electronics module 19 fits within the indent, recess or space 124. Magnets within the band 12 of the device 10 may be magnetically attracted to metal or other magnetically permeable material (including magnets) within the stand 120 (not shown) and help to hold the device 10 in place on the stand 120. When so located, the charging contact 349 of the band 10 as illustrated in FIG. 53, comes into contact with or is disposed near a charging contact 126 of the stand 120, which when plugged into a source of power via a cord 128 operates to charge the battery of the device 10. As noted earlier, the charging contacts 126 and 349 may operate to provide direct charging or inductive charging to the battery within the electronics module 19. Of course, the stand 120 may include a charging unit (not shown) to provide the proper or appropriate charging signals to the charging contact 126 and this charging unit may be a direct charging unit or an inductively coupled charging unit.

Moreover, as illustrated in FIG. 66, the device 10, when disposed on the stand 120 may detect an RFID tag or other communication signal emanating from the stand 120 and operate in a preconfigured manner based on the detection of that signal. For example, as illustrated in FIG. 66, the band 10 may provide a display with various screens or sections including, for example, a traffic section, a weather section, a messages section, an alarm or clock section, etc. Each of these sections may provide information about or related to the traffic (received via a WiFi or other communication connection), weather (received via a WiFi or other communication connection), messages (received via an e-mail or text messaging services or applications), time or alarm information, etc. Of course the operation of the band device 10 when placed on the stand 120 can be configured in any desired manner by a user, for example.

Figure 67:
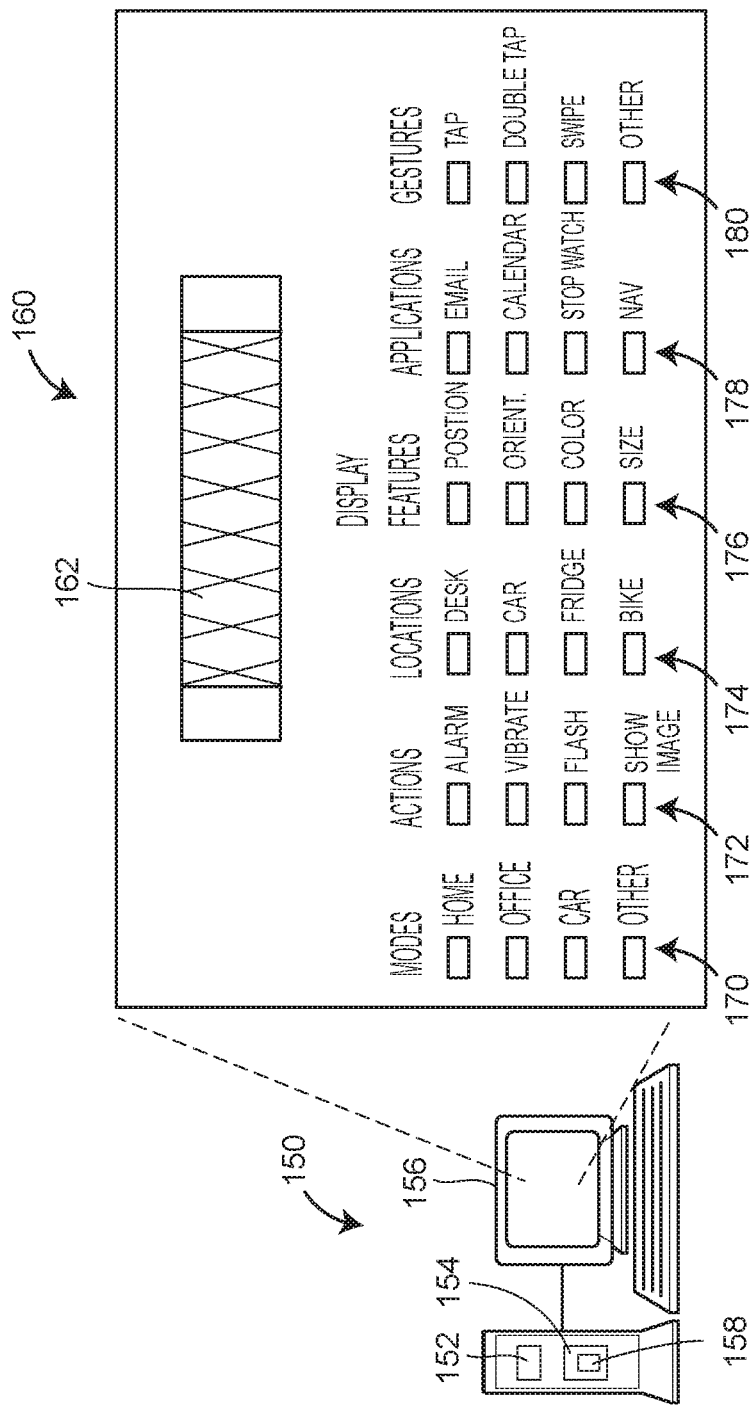
FIG. 67 illustrates an example computer system with a configuration screen that may be used to implement or specify the configuration of a wristband device having a flexible display.

More generally, the user may be able to program or configure the device 10 to operate in any desired manner, including any desired default manner, based on the detected location, position, orientation, or movement of the device 10. In this case, a configuration application may be executed in a processor of a computer device to develop or configure the operation of the device 10, including the various operational modes of the device 10, the various default settings based on the mode of the device 10, the motions or actions or locations that may trigger particular modes of the device 10, inputs or gestures associated with each mode or application of the device 10 and what those inputs or gestures may mean in the context of the device 10, etc. As an example, FIG. 67 illustrates a computer 150 having a processor 152, a memory 154 and a display 156. The memory 154 stores a configuration application 158 that may execute on the processor 152 to enable a user to configure the operation of the device 10. In particular, the configuration application 158, when executed, may produce a configuration screen such as the configuration screen 160 illustrated in FIG. 65. The configuration screen 160 may display an image of the wristband device 162 to illustrate what will be displayed on the display 18 of the device 10 at various times, and the manner in which this information will be displayed, such as the orientation, position on the display 18, etc.

In addition, as illustrated in FIG. 67, the configuration screen 160 may present a number of boxes or drop down menus, etc. which can be used to define various modes or other operational settings of the device 10 and the default operation of the device 10 during each such mode. For example, a user may select one of a set of mode boxes 170 to define the configuration of a particular mode of the device 10. The user may select a sleep mode box, an office mode box, an exercise mode box, a home mode box, a car mode, or may select an "other" box to define a new mode for which the device 10 is to be configured. Upon selecting the appropriate mode box 170, the user may be presented with information or options about the default and other operations of the device 10 during the selected mode. For example, the user may be able to define the actions 172, locations 174, e.g., as defined by the exterior strips 100 (e.g., of FIGS. 63-64) that might be used to enter a particular mode. Thereafter, another set of menus or drop down boxes or windows may be used to enable a user to define the placement, content, orientation, etc. or other display features 176 of information to be displayed on the flexible display 18. Still further, the user may select one or more applications 178 to execute during a particular mode, the placement, size and area of the screen associated with the application display, the orientation of the display on the screen, the background features, borders features or other screen indicia, etc. Likewise, the user may define one or more RFID tag ids or other ids to define exterior locations that are to be associated with or that cause the device 10 to enter or operate in a particular mode. In this manner, the configuration application 158 enables the device 10 to have default functionality based on the functions to be provided, based on the location of the device 10, based on its orientation or position around the wrist or not being connected around the wrist, based on movement of the device 10, etc.

In another case, the configuration screen 160 may enable the user to define one or more gestures 180 associated with a particular mode or a particular application on the device 10. Thus, for example, the user might define a gesture that, when detected on the touch screen interface 26 of the device 10, such as a swipe gesture, a pinch gesture, a double tap gesture, etc. causes the device 10 to operate in a certain manner, such as to switch between modes, to change orientation of the image on the display 18, to cause portions of the displayed information to move or to appear or disappear, or to cause a particular action within an application, such as to pull up new information, etc. Additionally or alternatively, the user might define one or more gestures that are detectable by one or more of the sensors 52, such as a rapid shaking, or such as a magnitude, duration, and/or a number of squeezing forces applied to the outer faces of the device 10 when the device 10 is in a looped configuration. Thus, using the configuration application screen 160, the user may define various different gestures or may preprogram various gestures to define desired device functionality, such as switching between modes, turning on and off the device or applications, switching applications, moving images or content of particular applications on the display 18, taking actions within an application, etc. As a further example, one gesture may be defined by the user to unlock the device 10 or allow operation of the device 10 such as implementing a locking or security feature. In this case, is not necessary that the device 10 display numbers or have the user pick a set of numbers but instead, gestures might enable the user to define an action that will unlock device, such as a swipe in one direction, two taps and a swipe in a particular direction, etc. Of course, the same gesture could be used for different types of operations in different modes of the device 10 or with different applications implemented by the device 10, and any combination of gestures might be used with any combination of applications or modes to enable different functionality or to enable the functionality of the device 10 be programmed in various manners. Once configured as such, the configuration data as selected by the user via the configuration application 158 on the computer 150 can be downloaded to the device 10, either wirelessly or via a wired connection, and stored in the memory 44 thereof and then be used by the operating system of the device 10 to operate.

The following additional considerations apply to the foregoing discussion. Throughout this specification, plural instances may implement components, operations, or structures described as a single instance. Although individual operations of one or more routines or methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms or units. Modules and units may constitute either software modules (e.g., code stored on a non-transitory machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

A hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. It will be appreciated that the decision to implement a hardware module in dedicated and permanently configured circuitry or in temporarily configured circuitry (e.g., configured by software) may be driven by cost and time considerations.

Accordingly, the hardware terms used herein should be understood to encompass tangible entities, be that entities that are physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits, lines and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, include processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "application," an "algorithm" or a "routine" is a self-consistent sequence of operations or similar processing leading to a desired result. In this context, applications, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values,"

"elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for implementing display features via a flexible electronic display on a dynamically flexible, attachable article as disclosed herein. Thus, while particular embodiments and applications have been illustrated and described herein, it is to be understood that the disclosed embodiments are not limited to the precise construction and components disclosed herein. Various modifications, changes and variations, which will be apparent to those skilled in the art, may be made in the arrangement, operation and details of the methods and structure disclosed herein without departing from the spirit and scope defined in the claims.

The invention claimed is:

1. An attachable article, comprising:
a flexible band having a flexible support and first and second ends;
a flexible display disposed on the flexible support; and
a flexible connection mechanism disposed proximate to one or both of the first and second ends of the flexible band to connect the first and the second ends of the flexible band together,
wherein the flexible connection mechanism comprises one or more extenders removably coupled to one or both of the first and second ends of the flexible band and configured to connect the first and second ends of the flexible band together, and
wherein one or more of the extenders includes one or more electronic components communicatively connected to an electronics module electronically connected to the flexible display, and wherein the one or more electronic components comprise a battery, a computer readable memory, a processor, a communication module, a sensor, or combinations thereof.

2. The attachable article of claim 1, further comprising:
an electronics module including a processor; and
a driver coupled to the processor of the electronics module.

3. The attachable article of claim 1, wherein the one or more extenders are removably coupled to one or both of the first and second ends of the flexible band via a bus connection and/or a magnetic connection.

4. The attachable article of claim 1, wherein the flexible connection mechanism comprises a plurality of extenders, the extenders being removably coupled to one another.

5. The attachable article of claim 4, wherein the plurality of extenders are removably coupled to one another via a bus connection and/or a magnetic connection.

6. The attachable article of claim 1, further comprising a reference element provided on the flexible band at a position such that, when the reference element is placed adjacent to a predetermined point on a user's wrist, the first and second ends of the band meet to form a discontinuity in the flexible display at a position adjacent to a side of the user's wrist.

7. The attachable article of claim 6, wherein the reference element is provided on the flexible band such that, when the reference element is placed adjacent to the predetermined point on the user's wrist comprising a top or a bottom of the user's wrist, the discontinuity in the flexible display occurs at a position adjacent to the outer side of the user's wrist.

8. The attachable article of claim 6, wherein the reference element is provided on the flexible band such that, when the reference element is placed adjacent to the predetermined point on the user's wrist, the flexible display is continuously visible on a top of the user's wrist, a bottom of the user's wrist, and an inner side of the user's wrist.

9. The attachable article of claim 1, wherein the one or more extenders are removably coupled to one or both of the first and second ends of the flexible band via a magnetic connection.

10. An attachable article comprising:
a flexible band having a flexible support and first and second ends;
a flexible display disposed on the flexible support; and
a flexible connection mechanism disposed proximate to one or both of the first and second ends of the flexible band to connect the first and the second ends of the flexible band together,
wherein the flexible connection mechanism comprises one or more extenders removably coupled to one or both of the first and second ends of the flexible band and configured to connect the first and second ends of the flexible band together, wherein the flexible support is coupled to the flexible display via an interlayer disposed therebetween, wherein the interlayer comprises a foam or rubber material, wherein one or more of the extenders includes one or more electronic components communicatively connected to an electronics module electronically connected to the flexible display, and wherein the one or more electronic components comprise a battery, a computer readable memory, a processor, a communication module, a sensor, or combinations thereof.

11. An attachable article, comprising:

a unitary, flexible band having a first end and a second end opposite to the first end on the unitary, flexible band, the unitary, flexible band comprising a flexible support;

a flexible display entirely disposed on the flexible support between the first and second ends of the unitary, flexible band; and a flexible connection mechanism disposed proximate to one or both of the first and second ends of the unitary, flexible band to connect the first and the second ends of the unitary, flexible band together, wherein the flexible connection mechanism comprises one or more extenders removably coupled to one or both of the first and second ends of the unitary, flexible band and configured to connect the first and second ends of the unitary, flexible band together, wherein one or more of the extenders includes one or more electronic components communicatively connected to an electronics module electronically connected to the flexible display, and wherein the one or more electronic components comprise a battery, a computer readable memory, a processor, a power input port, a communication module, a sensor, a display, or combinations thereof.

12. The attachable article of claim 11, wherein the one or more extenders comprise a plurality of extenders, each of the plurality of extenders having a different unique identifier indicative of the respective extender, a location of the respective extender, functionality of the respective extender, or combinations thereof.

13. The attachable article of claim 12, wherein the one or more electronic components comprise at least the communication module, the communication module being a wireless-based communication module configured to facilitate wireless communication with the electronics module, and wherein the electronics module is configured to obtain the unique identifier from each of the one or more extenders via the respective wireless-based communication module.

* * * * *